(12) United States Patent
Blattner

(10) Patent No.: US 9,256,861 B2
(45) Date of Patent: Feb. 9, 2016

(54) MODIFYING AVATAR BEHAVIOR BASED ON USER ACTION OR MOOD

(75) Inventor: Patrick D. Blattner, Sterling, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1209 days.

(21) Appl. No.: 13/035,035

(22) Filed: Feb. 25, 2011

(65) Prior Publication Data

US 2011/0148916 A1    Jun. 23, 2011

Related U.S. Application Data

(63) Continuation of application No. 11/023,983, filed on Dec. 29, 2004, now Pat. No. 7,908,554, which is a continuation-in-part of application No. 10/747,255, filed on Dec. 30, 2003, now abandoned.

(60) Provisional application No. 60/512,852, filed on Oct. 22, 2003, provisional application No. 60/450,663, filed on Mar. 3, 2003.

(51) Int. Cl.
*G06F 3/048* (2013.01)
*G06Q 10/10* (2012.01)

(52) U.S. Cl.
CPC .................... *G06Q 10/107* (2013.01)

(58) Field of Classification Search
CPC ...................................... G06T 13/40
USPC ........................................... 715/706
See application file for complete search history.

(56) References Cited

U.S. PATENT DOCUMENTS

| | | |
|---|---|---|
| 4,837,798 A | 6/1989 | Cohen et al. |
| 5,086,394 A | 2/1992 | Shapira |
| 5,276,905 A | 1/1994 | Hurst et al. |
| 5,327,486 A | 7/1994 | Wolff et al. |
| 5,388,202 A | 2/1995 | Squires et al. |
| 5,548,637 A | 8/1996 | Heller et al. |
| 5,557,659 A | 9/1996 | Hyde-Thomson |
| 5,608,786 A | 3/1997 | Gordon |
| 5,657,462 A | 8/1997 | Brouwer et al. |
| 5,659,692 A | 8/1997 | Poggio et al. |
| 5,675,752 A | 10/1997 | Scott et al. |
| 5,694,616 A | 12/1997 | Johnson et al. |

(Continued)

FOREIGN PATENT DOCUMENTS

| | | |
|---|---|---|
| EP | 0862304 | 9/1998 |
| EP | 1011248 | 1/2001 |

(Continued)

OTHER PUBLICATIONS

U.S. Appl. No. 13/035,052, Amendment and Response filed Dec. 3, 2013, 3 pages.

(Continued)

*Primary Examiner* — Namitha Pillai
(74) *Attorney, Agent, or Firm* — Danielle Johnston Holmes; Damon Rieth; Micky Minhas

(57) ABSTRACT

Techniques are described for enabling the selection of wallpaper to modify the mood projected by an avatar. The mood projected by an avatar may be modified, for example, by modifying behaviors and/or appearance of the avatar to characterize a mood to be projected. The mood projected by an avatar also may be modified based on user action, such as user input of a mood to be projected by the avatar.

18 Claims, 26 Drawing Sheets

(56) References Cited

U.S. PATENT DOCUMENTS

| | | |
|---|---|---|
| 5,710,884 A | 1/1998 | Dedrick |
| 5,721,827 A | 2/1998 | Logan et al. |
| 5,721,906 A | 2/1998 | Siefert |
| 5,740,549 A | 4/1998 | Reilly et al. |
| 5,742,905 A | 4/1998 | Pepe et al. |
| 5,745,556 A | 4/1998 | Ronen |
| 5,761,662 A | 6/1998 | Dasan |
| 5,774,670 A | 6/1998 | Montulli |
| 5,793,365 A | 8/1998 | Tang et al. |
| 5,796,948 A | 8/1998 | Cohen |
| 5,802,470 A | 9/1998 | Gaulke et al. |
| 5,812,126 A | 9/1998 | Richardson et al. |
| 5,835,722 A | 11/1998 | Bradshaw et al. |
| 5,848,396 A | 12/1998 | Gerace |
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,880,731 A * | 3/1999 | Liles et al. .................. 715/758 |
| 5,884,029 A | 3/1999 | Brush, II et al. |
| 5,889,953 A | 3/1999 | Thebaut et al. |
| 5,893,091 A | 4/1999 | Hunt et al. |
| 5,893,099 A | 4/1999 | Schreiber et al. |
| 5,894,305 A | 4/1999 | Needham |
| 5,920,692 A | 7/1999 | Nguyen et al. |
| 5,940,488 A | 8/1999 | DeGrazia et al. |
| 5,944,780 A | 8/1999 | Chase et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,963,217 A | 10/1999 | Grayson |
| 5,987,113 A | 11/1999 | James |
| 5,987,415 A | 11/1999 | Breese et al. |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,069,622 A * | 5/2000 | Kurlander .................. 715/753 |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,091,410 A | 7/2000 | Lection et al. |
| 6,115,709 A | 9/2000 | Gilmour et al. |
| 6,128,618 A | 10/2000 | Eliovson |
| 6,128,739 A | 10/2000 | Fleming, III |
| 6,134,432 A | 10/2000 | Holmes et al. |
| 6,151,571 A | 11/2000 | Pertrushin |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,185,614 B1 | 2/2001 | Cuomo et al. |
| 6,189,790 B1 | 2/2001 | Walter |
| 6,192,396 B1 | 2/2001 | Kohler |
| 6,199,103 B1 | 3/2001 | Sakaguchi et al. |
| 6,205,432 B1 | 3/2001 | Gabbard et al. |
| 6,205,478 B1 | 3/2001 | Sugano et al. |
| 6,212,550 B1 | 4/2001 | Segur |
| 6,219,045 B1 | 4/2001 | Leahy et al. |
| 6,227,974 B1 | 5/2001 | Eilat et al. |
| 6,232,966 B1 | 5/2001 | Kurlander |
| 6,247,043 B1 | 6/2001 | Bates et al. |
| 6,248,946 B1 | 6/2001 | Dwek |
| 6,249,740 B1 | 6/2001 | Ito et al. |
| 6,249,743 B1 | 6/2001 | Ohshimo |
| 6,252,588 B1 | 6/2001 | Dawson |
| 6,252,952 B1 | 6/2001 | Kung et al. |
| 6,253,202 B1 | 6/2001 | Gilmour |
| 6,256,633 B1 | 7/2001 | Dharap |
| 6,260,148 B1 | 7/2001 | Aggarwal et al. |
| 6,268,872 B1 | 7/2001 | Matsuda et al. |
| 6,269,369 B1 | 7/2001 | Robertson |
| 6,301,609 B1 | 10/2001 | Aravamudan et al. |
| 6,311,211 B1 | 10/2001 | Shaw et al. |
| 6,314,450 B1 | 11/2001 | Hachiya et al. |
| 6,324,541 B1 | 11/2001 | de l'Etraz et al. |
| 6,324,569 B1 | 11/2001 | Ogilvie |
| 6,329,986 B1 | 12/2001 | Cheng |
| 6,330,590 B1 | 12/2001 | Cotten |
| 6,331,853 B1 | 12/2001 | Miyashita |
| 6,346,952 B1 | 2/2002 | Shtivelman |
| 6,346,956 B2 | 2/2002 | Matsuda |
| 6,347,332 B1 | 2/2002 | Malet et al. |
| 6,349,327 B1 | 2/2002 | Tang et al. |
| 6,351,698 B1 | 2/2002 | Kubota et al. |
| 6,363,392 B1 | 3/2002 | Halstead et al. |
| 6,373,817 B1 | 4/2002 | Kung et al. |
| 6,374,237 B1 | 4/2002 | Reese |
| 6,374,246 B1 | 4/2002 | Matsuo |
| 6,374,290 B1 | 4/2002 | Scharber et al. |
| 6,389,028 B1 | 5/2002 | Bondarenko et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,401,085 B1 | 6/2002 | Gershman et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,434,599 B1 | 8/2002 | Porter |
| 6,446,112 B1 | 9/2002 | Bunney et al. |
| 6,449,344 B1 | 9/2002 | Goldfinger et al. |
| 6,449,634 B1 | 9/2002 | Capiel |
| 6,453,294 B1 | 9/2002 | Dutta et al. |
| 6,466,213 B2 | 10/2002 | Bickmore et al. |
| 6,466,232 B1 * | 10/2002 | Newell et al. .................. 715/700 |
| 6,480,885 B1 | 11/2002 | Olivier |
| 6,484,196 B1 | 11/2002 | Maurille |
| 6,487,584 B1 | 11/2002 | Bunney |
| 6,499,021 B1 | 12/2002 | Abu-Hakima |
| 6,501,834 B1 | 12/2002 | Milewski et al. |
| 6,507,866 B1 | 1/2003 | Barchi |
| 6,512,525 B1 | 1/2003 | Capps et al. |
| 6,525,747 B1 | 2/2003 | Bezos |
| 6,530,083 B1 | 3/2003 | Liebenow |
| 6,535,586 B1 | 3/2003 | Cloutier et al. |
| 6,539,375 B2 | 3/2003 | Kawasaki |
| 6,539,421 B1 | 3/2003 | Appelman et al. |
| 6,542,750 B2 | 4/2003 | Hendrey et al. |
| 6,545,682 B1 | 4/2003 | Ventrella et al. |
| 6,549,937 B1 | 4/2003 | Auerbach et al. |
| 6,557,027 B1 | 4/2003 | Cragun |
| 6,559,863 B1 | 5/2003 | Megiddo |
| 6,560,588 B1 | 5/2003 | Minter |
| 6,571,234 B1 | 5/2003 | Knight et al. |
| 6,580,790 B1 | 6/2003 | Henry et al. |
| 6,584,494 B1 | 6/2003 | Manabe et al. |
| 6,587,127 B1 | 7/2003 | Leeke et al. |
| 6,606,647 B2 | 8/2003 | Shah et al. |
| 6,615,241 B1 | 9/2003 | Miller et al. |
| 6,629,793 B1 | 10/2003 | Miller |
| 6,630,944 B1 | 10/2003 | Kakuta et al. |
| 6,633,850 B1 | 10/2003 | Gabbard et al. |
| 6,636,733 B1 | 10/2003 | Helferich |
| 6,640,229 B1 | 10/2003 | Gilmour et al. |
| 6,640,230 B1 | 10/2003 | Doss et al. |
| 6,654,683 B2 | 11/2003 | Jin et al. |
| 6,654,735 B1 | 11/2003 | Eichstaedt et al. |
| 6,671,682 B1 | 12/2003 | Nolte et al. |
| 6,677,968 B1 | 1/2004 | Appelman |
| 6,678,719 B1 | 1/2004 | Stimmel |

(56) References Cited

U.S. PATENT DOCUMENTS

| | | |
|---|---|---|
| 6,691,162 B1 | 2/2004 | Wick |
| 6,694,375 B1 | 2/2004 | Beddus et al. |
| 6,697,807 B2 | 2/2004 | McGeachie |
| 6,701,348 B2 | 3/2004 | Sommerer |
| 6,708,203 B1 | 3/2004 | Makar et al. |
| 6,708,205 B2 | 3/2004 | Sheldon et al. |
| 6,714,791 B2 | 3/2004 | Friedman |
| 6,714,793 B1 | 3/2004 | Carey et al. |
| 6,725,048 B2 | 4/2004 | Mao et al. |
| 6,731,307 B1 | 5/2004 | Strubbe et al. |
| 6,731,308 B1 | 5/2004 | Tang et al. |
| 6,731,323 B2 | 5/2004 | Doss et al. |
| 6,732,155 B2 | 5/2004 | Meek |
| 6,748,326 B1 | 6/2004 | Noma et al. |
| 6,748,626 B2 | 6/2004 | Maurer |
| 6,750,881 B1 | 6/2004 | Appelman |
| 6,757,365 B1 | 6/2004 | Bogard |
| 6,772,188 B1 | 8/2004 | Cloutier |
| 6,772,195 B1 | 8/2004 | Hatlelid et al. |
| 6,781,608 B1 | 8/2004 | Crawford |
| 6,784,901 B1 | 8/2004 | Harvey et al. |
| 6,785,554 B1 | 8/2004 | Amerga |
| 6,785,681 B2 | 8/2004 | Keskar et al. |
| 6,785,781 B2 | 8/2004 | Leenstra et al. |
| 6,788,769 B1 | 9/2004 | Waites |
| 6,798,426 B1 | 9/2004 | Tateishi |
| 6,799,039 B2 | 9/2004 | Wu et al. |
| 6,800,031 B2 | 10/2004 | Di Cesare |
| 6,832,245 B1 | 12/2004 | Isaacs et al. |
| 6,839,737 B1 | 1/2005 | Friskel |
| 6,839,797 B2 | 1/2005 | Calle et al. |
| 6,874,127 B2 | 3/2005 | Newell et al. |
| 6,876,728 B2 | 4/2005 | Kredo et al. |
| 6,879,994 B1 | 4/2005 | Matsliach et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,907,571 B2 | 6/2005 | Slotznick |
| 6,910,186 B2 | 6/2005 | Kim |
| 6,912,563 B1 | 6/2005 | Parker et al. |
| 6,912,564 B1 | 6/2005 | Appelman et al. |
| 6,917,965 B2 | 7/2005 | Gupta et al. |
| 6,922,685 B2 | 7/2005 | Bickmore et al. |
| 6,941,345 B1 | 9/2005 | Kapil et al. |
| 6,948,131 B1 | 9/2005 | Neven et al. |
| 6,954,902 B2 | 10/2005 | Noma et al. |
| 6,961,755 B2 | 11/2005 | Matsuda |
| 6,968,179 B1 | 11/2005 | De Vries |
| 6,976,092 B1 | 12/2005 | Daniell et al. |
| 6,979,267 B2 | 12/2005 | Leen et al. |
| 6,981,223 B2 | 12/2005 | Becker et al. |
| 6,983,305 B2 | 1/2006 | Danker et al. |
| 6,993,564 B2 | 1/2006 | Whitten, II |
| 7,006,098 B2 | 2/2006 | Bickmore et al. |
| 7,007,065 B2 | 2/2006 | Matsuda |
| 7,035,803 B1 | 4/2006 | Ostermann et al. |
| 7,035,863 B2 | 4/2006 | Kurapati et al. |
| 7,035,865 B2 | 4/2006 | Doss et al. |
| 7,039,639 B2 | 5/2006 | Brezin et al. |
| 7,039,676 B1 | 5/2006 | Day et al. |
| 7,043,530 B2 | 5/2006 | Isaacs et al. |
| 7,047,030 B2 | 5/2006 | Forsyth |
| 7,056,217 B1 | 6/2006 | Pelkey et al. |
| 7,058,036 B1 | 6/2006 | Yu et al. |
| 7,058,690 B2 | 6/2006 | Maehiro |
| 7,065,550 B2 | 6/2006 | Raghunandan |
| 7,082,047 B2 | 7/2006 | Chow |
| 7,085,259 B2 | 8/2006 | Wang et al. |
| 7,117,254 B2 | 10/2006 | Lunt et al. |
| 7,124,123 B1 | 10/2006 | Roskind et al. |
| 7,124,164 B1 | 10/2006 | Chemtob |
| 7,127,232 B2 | 10/2006 | O'Neil et al. |
| 7,127,685 B2 | 10/2006 | Canfield et al. |
| 7,133,900 B1 | 11/2006 | Szeto |
| 7,137,070 B2 | 11/2006 | Brown et al. |
| 7,143,356 B1 | 11/2006 | Shafrir et al. |
| 7,145,678 B2 | 12/2006 | Simpson et al. |
| 7,155,680 B2 | 12/2006 | Akazawa et al. |
| 7,159,008 B1 | 1/2007 | Wies et al. |
| 7,177,811 B1 | 2/2007 | Ostermann et al. |
| 7,177,880 B2 | 2/2007 | Ruvolo et al. |
| 7,181,441 B2 | 2/2007 | Mandato et al. |
| 7,181,498 B2 | 2/2007 | Zhu et al. |
| 7,181,690 B1 | 2/2007 | Leahy et al. |
| 7,185,059 B2 | 2/2007 | Daniell et al. |
| 7,188,143 B2 | 3/2007 | Szeto |
| 7,188,153 B2 | 3/2007 | Lunt |
| 7,190,956 B2 | 3/2007 | Dorenbosch et al. |
| 7,194,542 B2 | 3/2007 | Segan et al. |
| 7,200,634 B2 | 4/2007 | Mendiola et al. |
| 7,202,814 B2 | 4/2007 | Caspi et al. |
| 7,216,143 B2 | 5/2007 | Creamer et al. |
| 7,222,156 B2 | 5/2007 | Gupta et al. |
| 7,231,205 B2 | 6/2007 | Guyot et al. |
| 7,248,677 B2 | 7/2007 | Randall et al. |
| 7,249,139 B2 | 7/2007 | Chuah et al. |
| 7,257,617 B2 | 8/2007 | Brown et al. |
| 7,269,590 B2 | 9/2007 | Hull et al. |
| 7,275,215 B2 | 9/2007 | Werndorfer et al. |
| 7,313,760 B2 | 12/2007 | Grossman et al. |
| 7,343,312 B2 | 3/2008 | Capek et al. |
| 7,363,246 B1 | 4/2008 | Van Horn et al. |
| 7,386,799 B1 | 6/2008 | Clanton et al. |
| 7,395,329 B1 | 7/2008 | Holt et al. |
| 7,436,780 B2 | 10/2008 | Stephens et al. |
| 7,468,729 B1 | 12/2008 | Levinson |
| 7,484,176 B2 | 1/2009 | Blattner |
| 7,596,599 B1 | 9/2009 | Maghsoodnia et al. |
| 7,636,751 B2 | 12/2009 | Weaver et al. |
| 7,636,755 B2 | 12/2009 | Blattner et al. |
| 7,668,537 B2 | 2/2010 | De Vries |
| 7,685,237 B1 | 3/2010 | Weaver et al. |
| 7,685,518 B2 | 3/2010 | Matsuda et al. |
| 7,689,649 B2 | 3/2010 | Heikes et al. |
| 7,721,310 B2 | 5/2010 | Schaffer et al. |
| 7,779,076 B2 | 8/2010 | Heikes et al. |
| 7,908,554 B1 | 3/2011 | Blattner |
| 7,913,176 B1 | 3/2011 | Blattner et al. |
| 8,037,150 B2 | 10/2011 | Weaver et al. |
| 8,250,144 B2 | 8/2012 | Blattner et al. |
| 8,402,378 B2 | 3/2013 | Blattner et al. |
| 2001/0005861 A1 | 6/2001 | Mousseau et al. |
| 2001/0013050 A1 | 8/2001 | Shah |
| 2001/0019330 A1 | 9/2001 | Bickmore et al. |
| 2001/0030664 A1 | 10/2001 | Shulman et al. |
| 2001/0054084 A1 | 12/2001 | Kosmynin |
| 2002/0002542 A1 | 1/2002 | Ando et al. |
| 2002/0005865 A1 | 1/2002 | Hayes-Roth |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0054139 A1 | 5/2002 | Corboy et al. |
| 2002/0059425 A1 | 5/2002 | Belfiore et al. |
| 2002/0065856 A1 | 5/2002 | Kisiel |
| 2002/0065894 A1 | 5/2002 | Dalal et al. |
| 2002/0075303 A1 | 6/2002 | Thompson et al. |
| 2002/0077080 A1 | 6/2002 | Greene |
| 2002/0078150 A1 | 6/2002 | Thompson et al. |
| 2002/0078153 A1 | 6/2002 | Chung et al. |
| 2002/0080192 A1 | 6/2002 | King et al. |
| 2002/0083136 A1 | 6/2002 | Whitten, II |
| 2002/0091667 A1 | 7/2002 | Jaipuria et al. |
| 2002/0094869 A1 | 7/2002 | Harkham |
| 2002/0103801 A1 | 8/2002 | Lyons et al. |
| 2002/0104087 A1 | 8/2002 | Schaffer et al. |
| 2002/0111994 A1 | 8/2002 | Raghunandan |
| 2002/0112181 A1 | 8/2002 | Smith |
| 2002/0113809 A1 | 8/2002 | Akazawa |
| 2002/0113820 A1 | 8/2002 | Robinson et al. |
| 2002/0116458 A1 | 8/2002 | Bricklin et al. |
| 2002/0116463 A1 | 8/2002 | Hart |

(56) References Cited

U.S. PATENT DOCUMENTS

| | | |
|---|---|---|
| 2002/0116641 A1 | 8/2002 | Mastrianni |
| 2002/0119789 A1 | 8/2002 | Friedman |
| 2002/0128746 A1 | 9/2002 | Boies et al. |
| 2002/0133292 A1 | 9/2002 | Miyaki |
| 2002/0133369 A1 | 9/2002 | Johnson |
| 2002/0133535 A1 | 9/2002 | Lucovesky et al. |
| 2002/0138286 A1 | 9/2002 | Engstrom |
| 2002/0147777 A1 | 10/2002 | Hackbarth et al. |
| 2002/0165727 A1 | 11/2002 | Greene et al. |
| 2002/0171647 A1 | 11/2002 | Sterchi |
| 2002/0174010 A1 | 11/2002 | Rice, III |
| 2002/0174026 A1 | 11/2002 | Pickover et al. |
| 2002/0175953 A1 | 11/2002 | Lin |
| 2002/0178161 A1 | 11/2002 | Brezin et al. |
| 2002/0178206 A1 | 11/2002 | Smith |
| 2002/0181009 A1 | 12/2002 | Fredlund et al. |
| 2002/0181703 A1 | 12/2002 | Logan et al. |
| 2002/0184089 A1 | 12/2002 | Tsou et al. |
| 2002/0184309 A1 | 12/2002 | Danker et al. |
| 2002/0193942 A1 | 12/2002 | Odakura et al. |
| 2002/0198882 A1 | 12/2002 | Linden et al. |
| 2002/0199095 A1 | 12/2002 | Bandini et al. |
| 2003/0004774 A1 | 1/2003 | Greene et al. |
| 2003/0004855 A1 | 1/2003 | Dutta et al. |
| 2003/0004872 A1 | 1/2003 | Gardi et al. |
| 2003/0004967 A1 | 1/2003 | Calderaro et al. |
| 2003/0005058 A1 | 1/2003 | Sorotzkin |
| 2003/0009495 A1 | 1/2003 | Adjaoute |
| 2003/0009523 A1 | 1/2003 | Lindskog et al. |
| 2003/0014274 A1 | 1/2003 | Chalon |
| 2003/0018726 A1 | 1/2003 | Low et al. |
| 2003/0020749 A1 | 1/2003 | Abu-Hakima et al. |
| 2003/0023690 A1 | 1/2003 | Lohtia |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0030670 A1 | 2/2003 | Duarte et al. |
| 2003/0037112 A1 | 2/2003 | Fitzpatrick et al. |
| 2003/0041108 A1 | 2/2003 | Henrick et al. |
| 2003/0043201 A1 | 3/2003 | Abdelhadi et al. |
| 2003/0046198 A1 | 3/2003 | Knapp et al. |
| 2003/0050062 A1 | 3/2003 | Chen et al. |
| 2003/0050115 A1 | 3/2003 | Leen et al. |
| 2003/0050916 A1 | 3/2003 | Ortega et al. |
| 2003/0061239 A1 | 3/2003 | Yoon |
| 2003/0065721 A1 | 4/2003 | Roskind |
| 2003/0074409 A1 | 4/2003 | Bentley |
| 2003/0080989 A1 | 5/2003 | Matsuda et al. |
| 2003/0084103 A1 | 5/2003 | Weiner et al. |
| 2003/0088789 A1 | 5/2003 | Fenton et al. |
| 2003/0093580 A1 | 5/2003 | Thomas et al. |
| 2003/0101226 A1 | 5/2003 | Quine |
| 2003/0104830 A1 | 6/2003 | Norwood et al. |
| 2003/0105820 A1 | 6/2003 | Haims et al. |
| 2003/0105822 A1 | 6/2003 | Gusler et al. |
| 2003/0119531 A1 | 6/2003 | Patton et al. |
| 2003/0131061 A1 | 7/2003 | Newton et al. |
| 2003/0140103 A1 | 7/2003 | Szeto et al. |
| 2003/0156134 A1* | 8/2003 | Kim ......................... 345/753 |
| 2003/0160815 A1 | 8/2003 | Muschetto |
| 2003/0167324 A1 | 9/2003 | Farnham et al. |
| 2003/0179222 A1 | 9/2003 | Noma et al. |
| 2003/0182375 A1 | 9/2003 | Zhu et al. |
| 2003/0182394 A1 | 9/2003 | Ryngler et al. |
| 2003/0187813 A1 | 10/2003 | Goldman et al. |
| 2003/0191682 A1 | 10/2003 | Shepard et al. |
| 2003/0193558 A1 | 10/2003 | Doss et al. |
| 2003/0204474 A1 | 10/2003 | Capek et al. |
| 2003/0206170 A1 | 11/2003 | Bickmore |
| 2003/0210265 A1 | 11/2003 | Haimberg |
| 2003/0222907 A1 | 12/2003 | Heikes et al. |
| 2003/0225846 A1 | 12/2003 | Heikes et al. |
| 2003/0225847 A1 | 12/2003 | Heikes et al. |
| 2003/0225848 A1 | 12/2003 | Heikes et al. |
| 2003/0229722 A1 | 12/2003 | Beyda |
| 2003/0231207 A1 | 12/2003 | Huang |
| 2003/0236770 A1 | 12/2003 | Kurapati et al. |
| 2004/0003041 A1 | 1/2004 | Moore et al. |
| 2004/0015548 A1 | 1/2004 | Lee |
| 2004/0024822 A1 | 2/2004 | Werndorfer et al. |
| 2004/0034799 A1 | 2/2004 | Mikami |
| 2004/0034848 A1 | 2/2004 | Moore et al. |
| 2004/0054729 A1 | 3/2004 | Fukuizumi et al. |
| 2004/0054736 A1 | 3/2004 | Daniell et al. |
| 2004/0056901 A1 | 3/2004 | March et al. |
| 2004/0117443 A1 | 6/2004 | Barsness |
| 2004/0122681 A1 | 6/2004 | Ruvolo et al. |
| 2004/0122810 A1 | 6/2004 | Mayer |
| 2004/0122855 A1 | 6/2004 | Ruvolo et al. |
| 2004/0128353 A1 | 7/2004 | Goodman et al. |
| 2004/0128356 A1 | 7/2004 | Bernstein et al. |
| 2004/0137882 A1 | 7/2004 | Forsyth |
| 2004/0148346 A1 | 7/2004 | Weaver et al. |
| 2004/0179037 A1 | 9/2004 | Blattner |
| 2004/0179039 A1 | 9/2004 | Blattner et al. |
| 2004/0186738 A1 | 9/2004 | Reisman |
| 2004/0201624 A1 | 10/2004 | Crawford |
| 2004/0205480 A1 | 10/2004 | Moore |
| 2004/0210844 A1 | 10/2004 | Pettinati et al. |
| 2004/0215648 A1 | 10/2004 | Marshall et al. |
| 2004/0215721 A1 | 10/2004 | Szeto et al. |
| 2004/0215731 A1 | 10/2004 | Tzann-en Szeto |
| 2004/0215793 A1 | 10/2004 | Ryan et al. |
| 2004/0221224 A1 | 11/2004 | Blattner et al. |
| 2004/0260762 A1 | 12/2004 | Fish |
| 2004/0260781 A1 | 12/2004 | Shostack et al. |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0055416 A1 | 3/2005 | Heikes et al. |
| 2005/0060198 A1 | 3/2005 | Bayne |
| 2005/0060377 A1 | 3/2005 | Lo et al. |
| 2005/0076241 A1 | 4/2005 | Appelman |
| 2005/0080859 A1 | 4/2005 | Lake |
| 2005/0080863 A1 | 4/2005 | Daniell |
| 2005/0080867 A1 | 4/2005 | Malik et al. |
| 2005/0080868 A1 | 4/2005 | Malik |
| 2005/0086211 A1 | 4/2005 | Mayer |
| 2005/0091311 A1 | 4/2005 | Lund et al. |
| 2005/0108239 A1 | 5/2005 | Evans et al. |
| 2005/0108329 A1 | 5/2005 | Weaver et al. |
| 2005/0114229 A1 | 5/2005 | Ackley et al. |
| 2005/0114783 A1 | 5/2005 | Szeto |
| 2005/0153681 A1 | 7/2005 | Hanson |
| 2005/0171799 A1 | 8/2005 | Hull et al. |
| 2005/0197846 A1 | 9/2005 | Pezaris et al. |
| 2005/0216300 A1 | 9/2005 | Appelman et al. |
| 2005/0223328 A1 | 10/2005 | Ashtekar et al. |
| 2005/0227676 A1 | 10/2005 | Vries |
| 2005/0246420 A1 | 11/2005 | Little, II |
| 2005/0289147 A1 | 12/2005 | Kahn et al. |
| 2006/0028475 A1* | 2/2006 | Tobias ......................... 345/473 |
| 2006/0064645 A1 | 3/2006 | Neven et al. |
| 2006/0075044 A1 | 4/2006 | Fox et al. |
| 2006/0129678 A1 | 6/2006 | Morita |
| 2006/0143569 A1 | 6/2006 | Kinsella et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173959 A1 | 8/2006 | McKelvie et al. |
| 2006/0173963 A1 | 8/2006 | Roseway et al. |
| 2006/0182248 A1 | 8/2006 | Smith et al. |
| 2006/0184886 A1 | 8/2006 | Chung et al. |
| 2006/0212561 A1 | 9/2006 | Feng |
| 2006/0227142 A1 | 10/2006 | Brown et al. |
| 2006/0248573 A1 | 11/2006 | Pannu et al. |
| 2006/0277187 A1 | 12/2006 | Roese et al. |
| 2007/0022174 A1 | 1/2007 | Issa |
| 2007/0113181 A1 | 5/2007 | Blattner |
| 2007/0156664 A1 | 7/2007 | Norton et al. |

(56) References Cited

U.S. PATENT DOCUMENTS

| | | |
|---|---|---|
| 2007/0168863 A1 | 7/2007 | Blattner et al. |
| 2008/0228598 A1 | 9/2008 | Leff et al. |
| 2008/0255989 A1 | 10/2008 | Altberg et al. |
| 2009/0043844 A1 | 2/2009 | Zimmet et al. |
| 2009/0089316 A1 | 4/2009 | Kogan et al. |
| 2009/0158184 A1 | 6/2009 | Blattner et al. |
| 2010/0174996 A1 | 7/2010 | Heikes et al. |
| 2011/0209198 A1 | 8/2011 | Blattner et al. |
| 2012/0089924 A1 | 4/2012 | Weaver et al. |

FOREIGN PATENT DOCUMENTS

| | | |
|---|---|---|
| EP | 1176840 | 1/2002 |
| EP | 1130869 | 6/2005 |
| JP | 11355619 | 12/1999 |
| JP | 2000259514 | 9/2000 |
| JP | 2000284999 | 10/2000 |
| JP | 2001084320 | 3/2001 |
| WO | WO-9710558 | 3/1997 |
| WO | WO-9746955 | 12/1997 |
| WO | WO-9816045 | 4/1998 |
| WO | WO-9908434 | 2/1999 |
| WO | WO 00/68815 | 11/2000 |
| WO | WO-0122258 | 3/2001 |
| WO | WO 01/84461 | 11/2001 |
| WO | WO-0203216 | 1/2002 |
| WO | 0217602 | 2/2002 |
| WO | WO-02073886 | 9/2002 |

OTHER PUBLICATIONS

U.S. Appl. No. 12/722,755, Notice of Allowance mailed Dec. 19, 2013, 18 pages.
U.S. Appl. No. 12/722,755, Final Office Action mailed Aug. 8, 2013, 19 pages.
U.S. Appl. No. 12/729,797, Non-Final Office Action mailed Jul. 2, 2013, 14 pages.
U.S. Appl. No. 13/035,052, Notice of Allowance mailed May 28, 2013, 8 pages.
U.S. Appl. No. 13/035,052, Notice of Allowance mailed Jun. 26, 2013, 2 pages.
U.S. Appl. No. 13/035,052, Notice of Allowance mailed Aug. 19, 2013, 9 pages.
U.S. Appl. No. 12/729,797, Non-Final Office Action mailed Jan. 30, 2014, 15 pages.
Notice of Allowance, U.S. Appl. No. 11/017,633, Nov. 15, 2010, 6 pages.
Notice of Allowance, U.S. Appl. No. 12/266,690, (Oct. 26, 2012), 6 pages.
Stanek, Working with Active Directory Domains, Chapter 5, Microsoft Windows 2000 Administrators Pocket Consultant, (1999), 10 pages.
U.S. Appl. No. 10/334,128, Amendment and Response filed Apr. 11, 2008, 6 pages.
U.S. Appl. No. 10/334,128, Amendment and Response filed Dec. 18, 2006, 18 pages.
U.S. Appl. No. 10/334,128, Appeal Brief filed Jul. 9, 2008, 23 pages.
U.S. Appl. No. 10/334,128, Patent Board Decision mailed Aug. 18, 2010, 10 pages.
U.S. Appl. No. 10/334,128, Reply Brief filed Dec. 1, 2008, 5 pages.
U.S. Appl. No. 10/715,209, Amendment and Response filed Mar. 10, 2008, 21 pages.
U.S. Appl. No. 10/715,209, Amendment and Response filed Apr. 23, 2009, 15 pages.
U.S. Appl. No. 10/715,209, Amendment and Response filed Nov. 3, 2008, 17 pages.
U.S. Appl. No. 10/747255, Amendment and Response field Jan. 7, 2008, 19 pages.
U.S. Appl. No. 10/747,255, Amendment and Response filed Jun. 15, 2007, 16 pages.
U.S. Appl. No. 10/747,255, Amendment and Response filed Jul. 25, 2008, 20 pages.
U.S. Appl. No. 10/747,255, Amendment and Response filed Dec. 30, 2008, 7 pages.
U.S. Appl. No. 10/747,652, Amendment and Response filed Feb. 20, 2009, 20 pages.
U.S. Appl. No. 10/747,652, Amendment and Response filed Apr. 19, 2010, 18 pages.
U.S. Appl. No. 10/747,652, Amendment and Response filed Jun. 25, 2007, 22 pages.
U.S. Appl. No. 10/747,652, Amendment and Response filed Jul. 14, 2008, 8 pages.
U.S. Appl. No. 10/747,652, Amendment and Response filed Oct. 13, 2009, 6 pages.
U.S. Appl. No. 10/747,652, Amendment and Response filed Nov. 6, 2007, 10 pages.
U.S. Appl. No. 10/747,652, Amendment and Response filed Dec. 6, 2007, 27 pages.
U.S. Appl. No. 10/747,696, Amendment and Response filed Feb. 23, 2009, 19 pages.
U.S. Appl. No. 10/747,696, Amendment and Response filed Jul. 18, 2008, 18 pages.
U.S. Appl. No. 10/747,696, Notice of Allowance mailed Apr. 22, 2009, 9 pages.
U.S. Appl. No. 10/747,696, Notice of Allowance mailed Aug. 11, 2009, 4 pages.
U.S. Appl. No. 10/747,701, Amendment and Response filed Jun. 14, 2007, 14 pages.
U.S. Appl. No. 10/847,463, Amendment and Response filed Mar. 16, 2009, 23 pages.
U.S. Appl. No. 10/847,463, Amendment and Response filed Mar. 29, 2011, 34 pages.
U.S. Appl. No. 10/847,463, Amendment and Response filed Jun. 3, 2010, 7 pages.
U.S. Appl. No. 10/847,463, Amendment and Response filed Jul. 26, 2010, 10 pages.
U.S. Appl. No. 10/847,463, Amendment and Response filed Aug. 11, 2008, 24 pages.
U.S. Appl. No. 10/847,463, Amendment and Response filed Sep. 24, 2009, 4 pages.
U.S. Appl. No. 10/847,463, Amendment and Response filed Nov. 13, 2009, 23 pages.
U.S. Appl. No. 11/017,633, Amendment and Response filed Jan. 12, 2009, 14 pages.
U.S. Appl. No. 11/017,633, Amendment and Response filed Jun. 6, 2008, 14 pages.
U.S. Appl. No. 11/017,633, Amendment and Response filed Jul. 19, 2010, 20 pages.
U.S. Appl. No. 11/017,633, Amendment and Response filed Dec. 22, 2009, 13 pages.
U.S. Appl. No. 11/023,983, Amendment and Response Sep. 11, 2009, 9 pages.
U.S. Appl. No. 11/023,983, Amendment and Response filed Feb. 9, 2009, 10 pages.
U.S. Appl. No. 11/023,983, Amendment and Response filed Mar. 11, 2008, 10 pages.
U.S. Appl. No. 11/023,983, Amendment and Response filed Mar. 25, 2010, 9 pages.
U.S. Appl. No. 11/023,983, Amendment and Response filed Jun. 11, 2008, 9 pages.
U.S. Appl. No. 11/023,983, Amendment and Response filed Oct. 29, 2007, 13 pages.
U.S. Appl. No. 11/362,034, Amendment and Response filed Apr. 10, 2009, 10 pages.
U.S. Appl. No. 11/362,034, Amendment and Response filed May 7, 2010, 12 pages.
U.S. Appl. No. 11/362,034, Amendment and Response filed Aug. 29, 2008, 10 pages.
U.S. Appl. No. 11/362,034, Amendment and Response filed Sep. 25, 2009, 13 pages.
U.S. Appl. No. 11/410,323, Amendment and Response filed Sep. 29, 2008, 16 pages.

(56) References Cited

OTHER PUBLICATIONS

U.S. Appl. No. 12/266,690, Amendment and Response filed Jun. 9, 2011, 17 pages.
U.S. Appl. No. 12/266,690, Amendment and Response filed Nov. 21, 2011, 8 pages.
U.S. Appl. No. 12/266,690, Appeal Brief filed Feb. 22, 2012, 41 pages.
U.S. Appl. No. 12/644,711, Amendment and Response filed Apr. 3, 2012, 13 pages.
U.S. Appl. No. 12/644,711, Amendment and Response filed Oct. 31, 2011, 10 pages.
U.S. Appl. No. 12/722,755, Amendment and Response filed May 7, 2013, 16 pages.
U.S. Appl. No. 12/722,755, Amendment and Response filed Aug. 24, 2012, 20 pages.
U.S. Appl. No. 12/722,755, Amendment and Response filed Dec. 20, 2011, 25 pages.
U.S. Appl. No. 12/722,755, Non-Final Rejection mailed Feb. 7, 2013, 19 pages.
U.S. Appl. No. 12/729,797, Amendment and Response filed May 22, 2013, 12 pages.
U.S. Appl. No. 12/729,797, Amendment and Response filed Oct. 4, 2012, 10 pages.
U.S. Appl. No. 12/729,797, Final Rejection mailed Feb. 22, 2013, 14 pages.
U.S. Appl. No. 13/035,052, Amendment and Response filed May 6, 2013 (16 pages).
U.S. Appl. No. 13/035,052, Non-Final Rejection mailed Feb. 6, 2013 (12 pages).
""Internet Messaging" pp. 9-10 and "Instant Messaging with AIM (AOL Instant Messenger (SM)" pp. 16-18", Netscape 7.0, Preview Release 1, Reviewer's Guide, Chapter 2, May 17, 2002, 35 pages.
"About Internet directory services", Outlook 2000 SR-1 (9.0.0. 4527) Help File, on or before Aug. 10, 2001, 1 page.
"Active Directory", http://www.microsoft.com/windows2000/technologies/directory/AD/default.asp, May 13, 2003, 13 pages.
"Active Directory Features", http://www.microsoft.com/windows2000/server/evaluation/features/adlist.asp, Jun. 15, 1999, 4 pages.
"Active Directory Service Overview", http://www.microsoft.com/windows2000/server/evaluation/business/addatasheet.asp, Nov. 30, 2001, 5 pages.
"Active Directory Services Interface in the Microsoft Exchange 5.5 Environment", Microsoft Corporation; http://msdn.micorosoft.com/library/en-us/dnactdir/html/msdn_adsiexch.asp?frame=true, Sep. 1998, 12 pages.
"Advisory Action", U.S. Appl. No. 10/747,696, Mar. 5, 2009, 3 pages.
"Advisory Action", U.S. Appl. No. 10/847,463, Mar. 25, 2009, 3 pages.
"Advisory Action", U.S. Appl. No. 10/847,463, Jun. 18, 2010, 3 pages.
"Advisory Action", U.S. Appl. No. 10/305,015, Aug. 30, 2005, 3 pages.
"Advisory Action", U.S. Appl. No. 11/017,633, Jan. 12, 2010, 3 pages.
"Advisory Action", U.S. Appl. No. 10/334,129, Oct. 5, 2007, 3 pages.
"Advisory Action", U.S. Appl. No. 12/266,690, Dec. 2, 2011, 3 pages.
"Advisory Action", U.S. Appl. No. 10/334,027, Sep. 12, 2007, 4 pages.
"Advisory Action", U.S. Appl. No. 10/334,027, Nov. 21, 2007, 4 pages.
"Advisory Action", U.S. Appl. No. 10/334,128, May 20, 2008, 5 pages.
"Advisory Action", U.S. Appl. No. 10/847,463, Aug. 10, 2010, 5 pages.
"AOL Instant Messenger All New Version 2.0", Jun. 24, 1999, 2 pages.
"AOL Instant Messenger All New Version 2.0 Quick Tips for Getting Started", Jun. 24, 1999, 5 pages.
"AOL technology: turning complicated things into engaging services", 1996 Annual Report, 2 pages.
"Benefits of Active Directory in a Windows 2000 Environment", http://www.microsoft.com/windows2000/server/evaluation/business/adwin2K.asp, Sep. 20, 2001, 9 pages.
"BPAI Decision", U.S. Appl. No. 10/305,015, Mar. 24, 2010, 13 pages.
"Cerulean Studios, Trillian Help Center", Chapter 4, Section 1; printed from http://www.trillian.cc/help/sec-1.php?hchap=4&hsub=1 on Nov. 12, 2002, 2 pages.
"Cerulean Studios, Trillian Help Center, Tutorials", Chapter 10, Section 5; printed from http://www.trillian.cc/help/sec-1.php?hchap=10&hsub=5 on Nov. 12, 2002, 1 page.
"Cerulean Studios, Trillian Help Center, Tutorials", Chapter 10, Section 7; printed from http://www.trillian.cc.help/sec-1.php?hchap=10&hsub=7 on Nov. 12, 2002, 2 pages.
"Comparing Microsoft Active Directory to Novell's NDS", Microsoft Corporation; http://msdn.microsoft.com/library/en-us/dnactdir/html/msdn_activedirvsnds.asp?frame=true, Sep. 1998, 17 pages.
Cannon, "Design Guide for Directory-Enabled Applications", http://msdn.microsoft.com/library/en-us/dnactdir/html/deal.asp?frame=true, Apr. 2001, 18 pages.
"Directory Integration Can Lower Total Cost of Ownership and Increase Application Functionality", http://www.microsoft.com/presspas/press/1998/July98/ActivDPR.asp, Jul. 27, 1998, 4 pages.
"Enterprise Identity Management with Windows 2000 and Active Directory", http://www.microsoft.com/technet/prodtechno/ad/windows2000/evaluate/w2keims.asp, 1999, 16 pages.
"Examiner's Answer", U.S. Appl. No. 10/334,128, Oct. 1, 2008, 23 pages.
"Examiner's Answer to Appeal Brief", U.S. Appl. No. 10/305,015, Feb. 25, 2008, 28 pages.
"Examiner's Answer to Appeal Brief", U.S. Appl. No. 10/305,015, Jul. 5, 2006, 31 pages.
"Final Office Action", U.S. Appl. No. 10/715,209, Jul. 1, 2008, 11 pages.
"Final Office Action", U.S. Appl. No. 12/266,690, Aug. 23, 2011, 11 pages.
"Final Office Action", U.S. Appl. No. 10/981,686, Sep. 16, 2008, 12 pages.
"Final Office Action", U.S. Appl. No. 10/305,015, Jun. 20, 2005, 13 pages.
"Final Office Action", U.S. Appl. No. 11/023,999, Apr. 7, 2008, 14 pages.
"Final Office Action", U.S. Appl. No. 10/305,015, Apr. 13, 2004, 14 pages.
"Final Office Action", U.S. Appl. No. 10/747,255, Oct. 24, 2008, 14 pages.
"Final Office Action", U.S. Appl. No. 11/017,634, Dec. 15, 2008, 14 pages.
"Final Office Action", U.S. Appl. No. 10/334,128, Jan. 11, 2008, 19 pages.
"Final Office Action", U.S. Appl. No. 12/722,755, Feb. 28, 2012, 21 pages.
"Final Office Action", U.S. Appl. No. 10/305,015, Jun. 4, 2007, 21 pages.
"Final Office Action", U.S. Appl. No. 10/334,027, Jun. 28, 2007, 22 pages.
"Final Office Action", U.S. Appl. No. 10/334,027, Apr. 30, 2008, 24 pages.
"Final Office Action", U.S. Appl. No. 10/334,129, Jul. 25, 2007, 24 pages.
"Final Office Action", U.S. Appl. No. 10/718,039, Mar. 27, 2008, 31 pages.
"Final Office Action", U.S. Appl. No. 10/718,039, Aug. 19, 2009, 31 pages.
"Final Office Action", U.S. Appl. No. 10/847,463, Nov. 14, 2008, 40 pages.
"Final Office Action", U.S. Appl. No. 11/023,983, Jan. 7, 2010, 5 pages.

(56) References Cited

OTHER PUBLICATIONS

"Final Office Action", U.S. Appl. No. 10/847,463, Feb. 3, 2010, 56 pages.
Rebecca"First Look: Yahoo Messenger 5.0", Software Reviews—CNET.com; printed from http://www.cnet.com/software/0-5566362-8-7787365-1.html on Oct. 30, 2002, 2 pages.
"Frequently Asked Questions About AOL Instant Messenger", Jun. 24, 1999, 6 pages.
YOUJIal.,"IMPP: A New Instant Messaging Standard and Its Impact on Internet Business", Fujitsu Sci. Tech. Journal, vol. 36, 2, Dec. 2000, pp. 147-153.
Alan"Instant Messaging", PC Magazine, PC Labs, Apr. 13, 1999, 2 pages.
Bob"Instant Messaging Planet: Public IM: IM—The Cat's Meow", printed from http://www.instantmessagingplanet.com/public/article/0,,10817_1011011,00.html on Oct. 30, 2002, 3 pages.
Mal.,"Instant Messaging with Mobile Phones to Support Awareness", IEEE ISBN 0-7695-0942, Aug. 2001, pp. 223-230.
"Integrating Applications with Windows 2000 and Active Directory", http://www.microsoft.com/technet/prodtechnol/ad/windows2000/evaluate/adappstr.asp, Oct. 2000, 12 pages.
"Integrating Microsoft Metadirectory Services and Active Directory", http://www.microsoft.com/windows2000/server/evaluation/news/bulletins/mmsma.asp, Aug. 31, 2000, 1 page.
Davidal.,"International Conference on Computer Graphics and Interactive Techniques", Proceedings of the 23rd annual conference on Computer Graphics and Interactive Techniques; Comic Chat; printed from http://portal.acm.org/citation.cfm?id=237260&coll=portal&dl=portal&CFID=3718856&CF on Aug. 9, 2002, pp. 225-236.
"International Search Report", Application No. PCT/US03/16776, Aug. 13, 2003, 1 page.
"International Search Report", Application No. PCT/US03/16690, Nov. 19, 2003, 1 page.
"International Search Report", Application No. PCT/US03/36796, May 24, 2004, 2 pages.
"International Search Report", PCT Application PCT/US03/15715, Aug. 14, 2003, 2 pages.
"International Search Report and Written Opinion", Application No. PCT/US2007/062321, Jun. 18, 2008, 13 pages.
"International Search Report and Written Opinion", Application No. PCT/US2004/006284, Sep. 1, 2004, 13 pages.
"International Search Report and Written Opinion", Application No. PCT/US2007/066988, Apr. 19, 2007, 7 pages.
"International Search Report and Written Opinion", PCT Application No. PCT/US2007/66988, Jun. 18, 2008, 9 pages.
McKendrick,"Internet Call Centers: New Era in Customer Service", vol. 10, No. 2, Feb. 2002, 4 pages.
"Introducing the Gordano Messaging Suite", http://www.gordano.com, 1994-2003, 3 pages.
"Introduction to Active Directory Application Mode", Microsoft Corporation; Microsoft Windows Server 2003, Aug. 2002, 16 pages.
"iPlanet Instant Messenger Release 3.0", Quick Reference, Oct. 2001, pp. 1-5.
"Look up contact information from an item", Outlook 2000 SR-1 (9.0.0 4527); Help File, Aug. 10, 2001, 1 page.
"Making your own Yahoo! Messenger IMVironments", printed from http://www.xcflabs.com/~yaroslav/imvironments/instructions.html on Oct. 30, 2002, 2 pages.
"New Features in AOL Instant Messenger for Windows v. 2.01 Beta", Apr. 28, 1999, 2 pages.
"Non-Final Office Action", U.S. Appl. No. 10/305,015, Dec. 8, 2004, 10 pages.
"Non-Final Office Action", U.S. Appl. No. 12/266,690, Mar. 9, 2011, 11 pages.
"Non-Final Office Action", U.S. Appl. No. 10/305,015, Jul. 29, 2003, 11 pages.
"Non-Final Office Action", U.S. Appl. No. 11/023,983, Sep. 8, 2008, 12 pages.
"Non-Final Office Action", U.S. Appl. No. 10/715,209, Oct. 9, 2007, 12 pages.
"Non-Final Office Action", U.S. Appl. No. 12/729,797, Jun. 11, 2012, 13 pages.
"Non-Final Office Action", U.S. Appl. No. 11/017,634, Apr. 4, 2008, 14 pages.
"Non-Final Office Action", Application No. 11/017,634, Aug. 10, 2007, 15 pages.
"Non-Final Office Action", Application No. 10/334,128, Aug. 16, 2006, 15 pages.
"Non-Final Office Action", Application No. 10/305,015, 12/06/06, 17 pages.
"Non-Final Office Action", Application No. 10/334,027, 11/20/06, 20 pages.
"Non-Final Office Action", Application No. 10/981,686, Mar. 05, 2008, 21 pages.
"Non-Final Office Action", Application No. 12/722,755, 09/20/11, 21 pages.
"Non-Final Office Action", Application No. 10/334,129, Jan. 03, 2007, 22 pages.
"Non-Final Office Action", U.S. Appl. No. 12/644,711, Jan. 3, 2012, 27 pages.
"Non-Final Office Action", U.S. Appl. No. 10/334,027, Sep. 30, 2008, 27 pages.
"Non-Final Office Action", U.S. Appl. No. 10/718,039, Jul. 30, 2007, 30 pages.
"Non-Final Office Action", U.S. Appl. No. 10/847,463, Apr. 10, 2008, 31 pages.
"Non-Final Office Action", U.S. Appl. No. 10/718,039, Nov. 26, 2008, 31 pages.
"Non-Final Office Action", U.S. Appl. No. 10/847,463, Jun. 24, 2009, 42 pages.
"Non-Final Office Action", U.S. Appl. No. 10/847,463, Dec. 29, 2010, 47 pages.
"Non-Final Office Action", U.S. Appl. No. 10/715,209, Jan. 26, 2009, 6 pages.
"Non-Final Office Action", U.S. Appl. No. 12/644,711, Jul. 29, 2011, 6 pages.
"Non-Final Office Action", U.S. Appl. No. 11/023,983, Jun. 11, 2009, 9 pages.
"Notice of Allowance", U.S. Appl. No. 10/747,701, Aug. 24, 2007, 10 pages.
"Notice of Allowance", U.S. Appl. No. 10/334,027, Nov. 2, 2009, 13 pages.
"Notice of Allowance", U.S. Appl. No. 10/305,015, Apr. 6, 2010, 4 pages.
"Notice of Allowance", U.S. Appl. No. 10/715,209, Aug. 11, 2009, 4 pages.
"Notice of Allowance", U.S. Appl. No. 10/747,701, Jun. 12, 2008, 6 pages.
"Notice of Allowance", U.S. Appl. No. 11/017,240, Aug. 18, 2008, 6 pages.
"Notice of Allowance", U.S. Appl. No. 11/017,633, Nov. 15, 2010, 6 pages.
"Notice of Allowance", U.S. Appl. No. 10/747,701, Jan. 7, 2008, 7 pages.
"Notice of Allowance", U.S. Appl. No. 12/266,690, May 11, 2012, 7 pages.
"Notice of Allowance", U.S. Appl. No. 11/023,983, Apr. 12, 2010, 8 pages.
"Notice of Allowance", U.S. Appl. No. 10/847,463, Jun. 10, 2011, 8 pages.
"Notice of Allowance", U.S. Appl. No. 11/252,890, Nov. 3, 2009, 8 pages.
"Notice of Allowance", U.S. Appl. No. 12/644,711, Apr. 12, 2012, 9 pages.
Pamela"Oct. 22, 2001—New Yahoo! Messenger Incorporates Viral Marketing", printed from http://siliconvalley.internet.com/news/article.php/908221 on Oct. 30, 2002, 3 pages.
Jeff"Optimizing Linux's User Interface", Linux Journal, Issue 19, Specialized Sys. Consultants, Inc., 1995, 6 pages.
"Part I: Active Directory Operations", Active Directory Operations Guide, Microsoft Corporation, Microsoft Windows 2000, Version 1.5, Dec. 5, 2002, pp. 1-187.

(56) References Cited

OTHER PUBLICATIONS

"Part II: Tasks and Procedures", Active Directory Operations Guide, Microsoft Corporation, Microsoft Windows 2000, Version 1.5, Dec. 5, 2002, 131 pages.
"Prodigy Unveils Next Generation of Instant Messaging", Business Wire, May 5, 1999, 4 pages.
"Restriction Requirement", U.S. Appl. No. 11/017,633, Apr. 30, 2009, 6 pages.
"Restriction Requirement", U.S. Appl. No. 11/252,890, Jul. 20, 2009, 7 pages.
"Screenshot demonstration", Yahoo Messenger, sboalick—Instant Message, May 14, 2002, 1 page.
"Screenshot demonstration", karl_renner2002—Instant Message, Nov. 12, 2002, 1 page.
"Screenshot demonstration of Yahoo Messenger Help", IMVironments, Nov. 12, 2002, 1 page.
"Screenshot Menu", Yahoo! Messenger Preferences, Nov. 12, 2002, 1 page.
"Screenshot, Dream Green", printed from http://www.trillian.cc/skins/DreamGreen.jpg on May 14, 2002, 1 page.
"Screenshot, nikebball87: AIM—nikebball87", printed from http://www.trillian.cc/skins/windowsxp.gif on May 14, 2002, 1 page.
"Screenshot, Trillian 7 Skin: GoneBlue v.01", printed from http://www.trillian.cc/skins/goneblue.jpg on May 14, 2002, 1 page.
"Screenshot, Trillian chosen OS", printed from http://www.trillian.cc/skins/chosen_trill.jpg on May 14, 2002, 1 page.
"Set up LDAP directory services", Outlook 2000 SR-1 (9.0.0 4527); Help File, Aug. 10, 2001, 1 page.
Roy"Tech TV/Review: Yahoo Messenger 5.0", Software Reviews—CNET.com; printed from http://www.techtv.com/products/print/0,23102, 3351041,00.html on Oct. 30, 2002, 2 pages.
"The LP Wireless Messenger", Messenger Documentation, LP Wireless, Inc.; http://www.lpwireless.com/messengerhelp.htm, Nov. 2, 2002, 7 pages.
BARRYal.,"U.S. Appl. No. 10/718,039", filed Nov. 21, 2003, 114 pages.
Andrewal.,"U.S. Appl. No. 10/718,039", filed Oct. 19, 2005, 123 pages.
William"Using Active Directory Service", Microsoft Windows 2000 Administrator's Pocket Consultant, 1999, 6 pages.
"Using ADSI, LDAP, and Network Management Functions with Active Directory", Microsoft Corporation; http://msdn.microsoft.com/library/en-us/dnactdir/html/BuildingADApps.asp?frame-true, Feb. 2002, 9 pages.
"What is AOL Instant Messenger", Jun. 24, 1999, 3 pages.
"What's new about exchanging information over the Internet", Outlook 2000 SR-1 (9.0.0.4527) retrieved May 7, 2003, 1 page.
"Windows 2000 Directory Services", http://www.microsoft.com/windows2000/technologies/directory/default.asp, Nov. 25, 2001, 1 page.
Stanek,"Working with Active Directory Domains", Chapter 5, Microsoft Windows 2000 Administrator's Pocket Consultant, 1999, 10 pages.
"Yahoo! Messenger Makes the World a Little Smaller, More Informed", Jun. 21, 1999, 2 pages.
Staff,"Yahoo! Debuts Purina IM Skin, Eagles Tour Promo", IAR Bits and Bytes; printed from http://www.internetnews.com/IAR/article.php/1011751 on Oct. 30, 2002, Apr. 17, 2002, 3 pages.
"Yahoo! Help—IMVironments—"How do I send an IMVironment to a friend?"", printed from http://help.yahoo.com/help/us/mesg/imv/imv-04.html on Nov. 12, 2002, 1 page.
"Yahoo! Messenger—IMVironments (TM), List of Available IMVironments", printed from <http://messenger.yahoo.com/messenger/imv/index.html>on Nov. 12, 2002, 2 pages.
"Yahoo! Messenger, Instantly communicate with all of your online friends", printed from http://messenger.yahoo.com/ on May 24, 2002, 1 page.
"Yahoo! Messenger, Yahoo! Help—IMVironments", printed from http://help.yahoo.com/help/us/mesg/imv/imv-04.html on Oct. 30, 2002, 1 page.
"Yahoo! Messenger, Yahoo! Help—IMVironments", printed from http://help.yahoo.com/help/us/mesg/imv/index.html on Oct. 30, 2002, 1 page.
"Yahoo! Messenger, Yahoo! Help—IMVironments", printed from http://help.yahoo.com/help/us/mesg/imv/imv-01.html on Oct. 30, 2002, Mar. 12, 2010, 1 page.
"ZDNet: Yahoo Messenger 5.0 Review", printed from http://zdnet.com/supercenter/stories/review/0,12070,538313,00.html on Oct. 30, 2002, 3 pages.
"ZDNet: Yahoo Messenger 5.0 Overview", printed from http://www.zdnet.com/supercenter/stories/overview/0,12069,538313,00.html on Oct. 30, 2002, 3 pages.
"People Putty," http://www.haptek.com/products/peopleputty; 5 pages (Dec. 30, 2003).
"The eSniff Product Overview," eSniff: Define Your e-Boundaries, wvvw.esniff.com/product_overview.html, May 15, 2001.
Advisory Action (U.S. Appl. No. 10/747,255), dated Jan. 16, 2009, 3 pages.
Advisory Action (U.S. Appl. No. 10/747,652), dated Nov. 27, 2007, 3 pages.
Advisory Action (U.S. Appl. No. 11/017,634), dated Mar. 6, 2009, 3 pages.
Advisory Action (U.S. Appl. No. 11/023,983), dated Apr. 9, 2008, 4 pages.
Examiner's First Report on Australian Patent Application No. 2004216758, dated Oct. 30, 2008, 2 pages.
Examiner's Response to Appeal Brief (U.S. Appl. No. 11/023,999), dated Apr. 15, 2009, 15 pages.
Final Office Action (U.S. Appl. No. 11/362,034), dated Feb. 8, 2010, 32 pages.
InterCom Cartoon Chat System; http://www.nfx.com; 11 pages. (Dec. 1, 2003).
International Preliminary Report on Patentability and Written Opinion for PCT/US2004/0006284, issued Sep. 9, 2005, 10 pages.
International Preliminary Report on Patentability and Written Opinion for PCT/US2007/062321, issued Sep. 2, 2008, 8 pages.
International Preliminary Report on Patentability and Written Opinion for PCT/US2007/066988, issued Oct. 28, 2008, 7 pages.
Kerlow, Isaac V., "The Art of 3D Computer Animation and Effects," John Wiley & Sons, Inc., (2004) pp. 358-359.
Kurlander, et al., "Comic Chat," Proceedings of the 3rd Annual Conference on Computer Graphics and Interactive Techniques, ACM Press, New York, NY (1996) pp. 225-236.
Notice of Allowance (U.S. Appl. No. 11/017,633), dated Aug. 9, 2010, 6 pages.
Notice of Allowance (U.S. Appl. No. 11/023,983), dated Nov. 5, 2010, 4 pages.
Notice of Allowance (U.S. Appl. No. 11/362,034), dated Jul. 19, 2010, 10 pages.
Office Action (U.S. Appl. No. 10/747,255), dated Mar. 15, 2007, 10 pages.
Office Action (U.S. Appl. No. 10/747,255), dated Mar. 25, 2008, 13 pages.
Office Action (U.S. Appl. No. 10/747,255), dated Oct. 24, 2008, 14 pages.
Office Action (U.S. Appl. No. 10/747,255), dated Sep. 5, 2007, 14 pages.
Office Action (U.S. Appl. No. 10/747,652), dated Dec. 17, 2009, 18 pages.
Office Action (U.S. Appl. No. 10/747,652), dated Feb. 13, 2008, 16 pages.
Office Action (U.S. Appl. No. 10/747,652), dated Jun. 11, 2009, 19 pages.
Office Action (U.S. Appl. No. 10/747,652), dated Jun. 28, 2010, 17 pages.
Office Action (U.S. Appl. No. 10/747,652), dated Mar. 23, 2007, 13 pages.
Office Action (U.S. Appl. No. 10/747,652), dated Oct. 20, 2008, 15 pages.
Office Action (U.S. Appl. No. 10/747,652), dated Sep. 6, 2007, 17 pages.
Office Action (U.S. Appl. No. 10/747,696), dated Mar. 18, 2008, 68 pages.

(56) References Cited

OTHER PUBLICATIONS

Office Action (U.S. Appl. No. 10/747,696), dated Oct. 21, 2008, 9 pages.
Office Action (U.S. Appl. No. 10/747,696), dated Sep. 26, 2007, 6 pages.
Office Action (U.S. Appl. No. 10/747,701), dated Mar. 14, 2007, 9 pages.
Office Action (U.S. Appl. No. 10/847,463), dated Jun. 24, 2009, 42 pages.
Office Action (U.S. Appl. No. 11/017,240), dated May 5, 2008, 10 pages.
Office Action (U.S. Appl. No. 11/017,240), dated Oct. 5, 2007, 7 pages.
Office Action (U.S. Appl. No. 11/017,240), dated Sep. 18, 2008, 2 pages.
Office Action (U.S. Appl. No. 11/017,633), dated Apr. 26, 2010, 11 pages.
Office Action (U.S. Appl. No. 11/017,633), dated Mar. 6, 2008, 12 pages.
Office Action (U.S. Appl. No. 11/017,633), dated Sep. 10, 2008, 16 pages.
Office Action (U.S. Appl. No. 11/017,633), dated Sep. 23, 2009, 11 pages.
Office Action (U.S. Appl. No. 11/023,983), dated Jan. 11, 2008, 13 pages.
Office Action (U.S. Appl. No. 11/023,983), dated Jul. 27, 2007, 11 pages.
Office Action (U.S. Appl. No. 11/023,983), dated Sep. 8, 2008, 8 pages.
Board Decision in (U.S. Appl. No. 11/023,999), dated Jun. 17, 2010, 10 pages.
Office Action (U.S. Appl. No. 11/023,999), dated Apr. 7, 2008, 14 pages.
Office Action (U.S. Appl. No. 11/023,999), dated Aug. 24, 2007, 11 pages.
Office Action (U.S. Appl. No. 11/362,034), dated Apr. 29, 2008, 21 pages.
Office Action (U.S. Appl. No. 11/362,034), dated Dec. 12, 2008, 18 pages.
Office Action (U.S. Appl. No. 11/362,034), dated Jun. 25, 2009, 10 pages.
Office Action (U.S. Appl. No. 11/410,323), dated Dec. 11, 2008, 16 pages.
Office Action (U.S. Appl. No. 11/410,323), dated May 29, 2008, 13 pages.
Salem, B., et al., "Designing a Non-Verbal Language for Expressive Avatars," Collaborative Virtual Environments; University of Plymouth, ISBN: 1-58113-303-0; (2000) pp. 93-101.
The Early Report—The Early Show segment, "Big Brother in the Corner Office," Julie Chen, cbsnews.com/earlyshow/caught/techage/20001228e_sniff.shtml, Dec. 28, 2000:Tech Age.
The Wall Street Journal article "Esniff Ferrets Out Misbehavior 'By Reading' E-Mail, Web Visits," Katherine Lange, interactive.wsj.com, Apr. 27, 2001:TechQ&A.
Unpublished U.S. Appl. No. 11/017,634, entitled "User Profile Information to Determine an Avatar and/or Avatar Characteristics," filed Dec. 21, 2004 (67 pages).
Unpublished Application No. 11/023,983, entitled "Modifying Avatar Behavior Based on User Action Mood," filed Dec. 29, 2004 (98 pages).
Viewpoint: Viewpoint Experience Technology Getting Started, Version 1.1, pp. 1-21 (Jun. 19, 2002).
Viewpoint: Viewpoint Technology Feature Overview, Version 2.0, pp. 1-23 (Jun. 19, 2002).
Hoem, Torstein et al. "An Infrastructure for Community Walls," Norwegian University of Science and Technology, Nov. 21, 2002, 84 pgs.
U.S. Appl. No. 12/722,755, Amendment and Response filed Nov. 8, 2013, 18 pages.
U.S. Appl. No. 13/035,052, Amendment After NOA filed Nov. 19, 2013, 3 pages.
U.S. Appl. No. 12/729,797, Amendment and Response filed Oct. 2, 2013, 12 pages.
"Non-Final Office Action", U.S. Appl. No. 11/023,998, (Aug. 3, 2007), 16 pages.
"Notice of Allowance", U.S. Appl. No. 12/266,690, (Oct. 26, 2012), 6 pages.
Rosenberg, J. and Mark Day, "A Model for Presence and Instant Messaging." (2000).
U.S. Appl. No. 12/722,755, Amendment and Response filed Aug. 11, 2014, 14 pages.
U.S. Appl. No. 13/317,023, Amendment and Response filed Aug. 5, 2014, 23 pages.
U.S. Appl. No. 13/547,227, Non-Final Rejection mailed Jul. 18, 2014, 17 pages.
U.S. Appl. No. 12/722,755, Non-Final Rejection mailed Apr. 25, 2014, 18 pages.
US 8,730,631, 2/2013, Pearson (withdrawn).
U.S. Appl. No. 13/317,023, Non-Final Rejection mailed May 5, 2014, 36 pages.
U.S. Appl. No. 12/729,797, Amendment and Response filed Apr. 30, 2014, 16 pages.
U.S. Appl. No. 14/226,492, Amendment and Response filed Dec. 8, 2014, 15 pages.
U.S. Appl. No. 14/226,492, Final Office Action mailed Dec. 24, 2014, 16 pages.
U.S. Appl. No. 12/729,797, Amendment and Response filed Jan. 7, 2015, 14 pages.
U.S. Appl. No. 13/547,227, Final Office Action Dec. 19, 2014, 14 pages.
U.S. Appl. No. 13/317,023. Final Office Action mailed Oct. 16, 2014, 30 pages.
U.S. Appl. No. 12/722,755, Non-Final Office Action mailed Nov. 14, 2014, 17 pages.
U.S. Appl. No. 13/547,227, Amendment and Response filed Oct. 29, 2014, 11 pages.
U.S. Appl. No. 12/729,797, Final Office Action mailed Aug. 29, 2014, 14 pages.
U.S. Appl. No. 14/226,492, Non-Final Office Action mailed Sep. 16, 2014, 14 pages.
U.S. Appl. No. 12/722,755, Amendment and Response filed Feb. 11, 2015 18 pages.
U.S. Appl. No. 13/317,023, Amendment and Response filed Feb. 11, 2015, 19 pages.
U.S. Appl. No. 12/729,797, Non-Final Office Action mailed Feb. 26, 2015, 15 pages.
U.S. Appl. No. 13/547,227, Amendment and Response filed Mar. 19, 2015, 11 pages.
U.S. Appl. No. 12/722,755, Final Office Action mailed Apr. 9, 2015, 18 pages.
U.S. Appl. No. 13/317,023, Non-Final Rejection mailed Apr. 24, 2015, 8 pages.
U.S. Appl. No. 13/547,227, Non-Final Rejection mailed Apr. 23, 2015, 14, pages.
U.S. Appl. No. 14/226,492, Amendment and Response filed Jun. 19, 2015, 17 pages.
U.S. Appl. No. 14/226,492, Non-Final Rejection mailed Jul. 6, 2015, 17 pages.
U.S. Appl. No. 13/317,023, Amendment and Response filed Jul. 10, 2015, 11 pages.
U.S. Appl. No. 13/317,023, Notice of Allowance mailed Aug. 5, 2015, 9 pages.
U.S. Appl. No. 12/729,797, Amendment and Response filed Jun. 26, 2015, 14 pages.
U.S. Appl. No. 13/547,227, Amendment and Response filed Aug. 24, 2015, 13 pages.
U.S. Appl. No. 14/226,492, Amendment and Response filed Oct. 8, 2015, 15 pages.
U.S. Appl. No. 13/317,023, Notice of Allowance mailed Oct. 2, 2015, 6 pages.
U.S. Appl. No. 12/729,797, Final Rejection mailed Oct. 8, 2015, 15 pages.
US 8,296,663, 10/2012, Blattner (withdrawn)

* cited by examiner

500

MODIFYING AVATAR BEHAVIOR BASED ON USER ACTION OR MOOD

CROSS REFERENCE TO RELATED APPLICATIONS

This application is a continuation of U.S. application Ser. No. 11/023,983, now, U.S. Pat. No. 7,908,554, filed Dec. 29, 2004 and titled MODIFYING AVATAR BEHAVIOR BASED ON USER ACTION OR MOOD, which is a continuation-in-part of U.S. application Ser. No. 10/747,255, which application is now abandoned, filed Dec. 30, 2003 and titled USING AVATARS TO COMMUNICATE that claims the benefit of both U.S. Provisional Application No. 60/450,663, which application is now expired, filed Mar. 3, 2003, and titled PROVIDING VIDEO, SOUND, OR ANIMATED CONTENT WITH INSTANT MESSAGES, and U.S. Provisional Application No. 60/512,852, which application is now expired, filed Oct. 22, 2003, and titled PROVIDING VIDEO, SOUND, OR ANIMATED CONTENT WITH INSTANT MESSAGES, all of which are expressly incorporated herein by reference.

TECHNICAL FIELD

This description relates to projecting a graphical representation of a communications application operator (hereinafter "sender") in communications sent in a network of computers.

BACKGROUND

Online services may provide users with the ability to send and receive instant messages. Instant messages are private online conversations between two or more people who have access to an instant messaging service, who have installed communications software necessary to access and use the instant messaging service, and who each generally have access to information reflecting the online status of other users.

An instant message sender may send self-expression items to an instant message recipient. Current implementations of instant messaging self-expression enable a user to individually select self-expression settings, such as a Buddy Icon and a Buddy Wallpaper, which settings thereafter project to other users who see or interact with that person online.

DETAILED DESCRIPTION

An avatar representing an instant messaging user may be animated based on the message sent between a sender and recipient. An instant messaging application interface is configured to detect entry of predetermined or user-defined character strings, and to relate those character strings to predefined animations of an avatar. The avatar representing or selected by the sender is animated in the recipient's instant messaging application interface and, optionally, in the sender's instant messaging application interface. The avatar is rendered based on an animation model including a mesh that defines, using polygons, the form of the avatar, a texture defines an image to covers the mesh of the avatar, and a light map that defines the effect of a light source on the avatar. The animation model for the avatar includes particular geometry, including at least one thousand polygons in the underlying wire model that makes up the avatar's mesh, and at least twenty blend shapes, each of which defines a different facial expression or shape. The animation model includes multiple animations capable of being rendered for the avatar defined by the animation model and the animations being capable of association with one or more sound effects. The animation model for the avatar may include only a face and/or a face and neck of the avatar.

In another general aspect, techniques are described for enabling the animation of wallpaper objects based on triggers in an instant message, such as particular text or configuration parameters in an instant message. By using the same trigger to animate both wallpaper objects and an avatar or by using avatar animations to trigger wallpaper animations or vice-versa, the wallpaper may appear to interact with the avatar and/or vice versa in an instant messaging communications program.

In yet another general aspect, techniques are described for using an out-of-band trigger to initiate a wallpaper object animation.

In yet another general aspect, techniques are described for enabling the selection of wallpaper to modify the mood projected by an avatar. The mood projected by an avatar may be modified, for example, by modifying behaviors and/or appearance of the avatar to characterize a mood to be projected. The mood projected by an avatar also may be modified based on user action, such as user input of a mood to be projected by the avatar.

Figure 1:
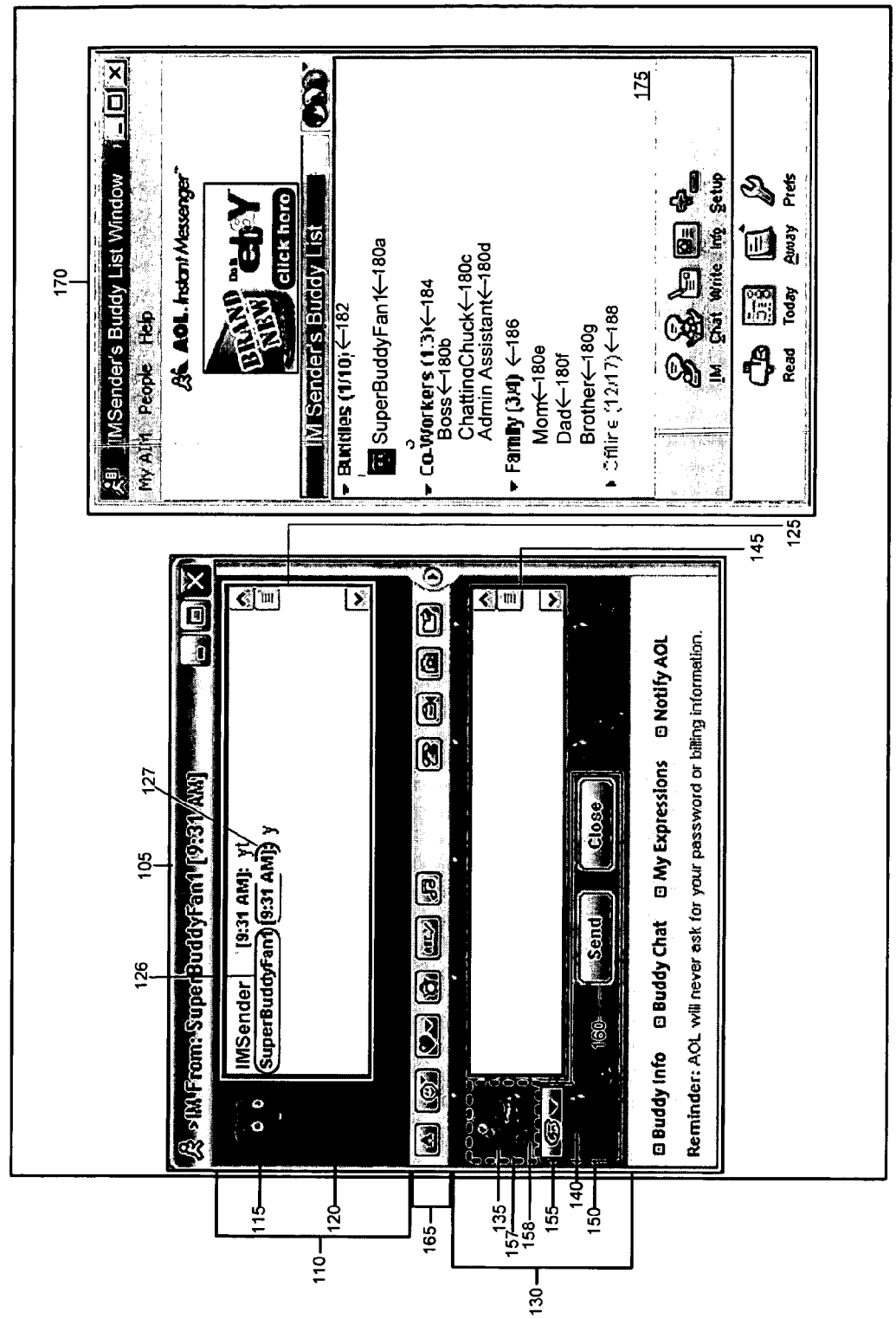
FIGS. 1, 2 and 5 are diagrams of user interfaces for an instant messaging service capable of enabling a user to project an avatar for self-expression.

FIG. 1 illustrates an exemplary graphical user interface 100 for an instant messaging service capable of enabling a user to project an avatar for self-expression. The user interface 100 may be viewed by a user who is an instant message sender and whose instant messaging communications program is configured to project an avatar associated with and used as an identifier for the user to one or more other users or user groups (collectively, instant message recipients). In particular, the user IMSender is an instant message sender using the user interface 100. The instant message sender projects a sender avatar 135 in an instant messaging communications session with an instant message recipient SuperBuddyFan1, who projects a recipient avatar 115. A corresponding graphical user interface (not shown) is used by the instant message recipient SuperBuddyFan1. In this manner, the sender avatar 135 is visible in each of the sender's user interface and the recipient's user interface, as is the recipient avatar 115. The instant messaging communications session may be conducted simultaneously, near-simultaneously, or serially.

The user interface (UI) 100 includes an instant message user interface 105 and an instant messaging buddy list window 170.

The instant message user interface 105 has an instant message recipient portion 110 and an instant message sender portion 130. The instant message recipient portion 110 displays the recipient avatar 115 chosen by the instant message recipient with whom the instant message sender is having an instant message conversation. Similarly, the instant message sender portion 130 displays the sender avatar 135 chosen by the instant message sender. The display of the sender avatar 135 in the instant message user interface 105 enables the instant message sender to perceive the avatar being projected to the particular instant message recipient with whom the instant message sender is communicating. The avatars 135 and 115 are personalization items selectable by an instant message user for self-expression.

The instant message user interface 105 includes an instant message composition area 145 for composing instant message messages to be sent to the instant message recipient and for message history text box 125 for displaying a transcript of the instant message communications session with the instant message recipient. Each of the messages sent to, or received from, the instant message recipient are listed in chronological order in the message history text box 125, each with an indication of the user that sent the message as shown at 126. The message history text box 125 optionally may include a time stamp 127 for each of the messages sent.

Wallpaper may be applied to portions of the graphical user interface 100. For example, wallpaper may be applied to window portion 120 that is outside of the message history box 125 or window portion 140 that is outside of the message composition area 145. The recipient avatar 115 is displayed over, or in place of, the wallpaper applied to the window portion 120, and the wallpaper applied to the window portion 120 corresponds to the recipient avatar 115. Likewise, the sender avatar 135 is displayed over, or in place of, the wallpaper applied to the window portion 140 and the wallpaper applied to the window portion 120 corresponds to the sender avatar 135. In some implementations, a box or other type of boundary may be displayed around the avatar, as shown by boundary 157 displayed around the sender avatar 135. A different wallpaper may be applied to window portion 158 inside the boundary 157 than the wallpaper applied to the window portion 140 outside of the message composition area 145 but not within the boundary 157. The wallpaper may appear to be non-uniform and may include objects that are animated. The wallpapers applied to the window portions 120 and 140 may be personalization items selectable by an instant message user for self-expression. The wallpaper applied to the window portion 140 and/or the window portion 158 may include one or more objects that may be animated. In some implementations, the window portion 158 may include animations that are different from the animations in the window portion 140. In one example, the window portion 158 may be animated to show weather, such as falling snow, falling rain or sunshine.

The instant message user interface 105 also includes a set of feature controls 165 and a set of transmission controls 150. The feature controls 165 may control features such as encryption, conversation logging, conversation forwarding to a different communications mode, font size and color control, and spell checking, among others. The set of transmission controls 150 includes a control 160 to trigger sending of the message that was typed into the instant message composition area 145, and a control 155 for modifying the appearance or behavior of the sender avatar 135.

The instant message buddy list window 170 includes an instant message sender-selected list 175 of potential instant messaging recipients ("buddies") 180a-180g. Buddies typically are contacts who are known to the potential instant message sender (here, IMSender). In the list 175, the representations 180a-180g include text identifying the screen names of the buddies included in list 175; however, additional or alternative information may be used to represent one or more of the buddies, such as an avatar associated with the buddy, that is reduced in size and either still or animated. For example, the representation 180a includes the screen name and avatar of the instant message recipient named SuperBuddyFan1. The representations 180a-180g may provide connectivity information to the instant message sender about the buddy, such as whether the buddy is online, how long the buddy has been online, whether the buddy is away, or whether the buddy is using a mobile device.

Buddies may be grouped by an instant message sender into one or more user-defined or pre-selected groupings ("groups"). As shown, the instant message buddy list window 170 has three groups, Buddies 182, Co-Workers 184, and Family 186. SuperBuddyFan1 185a belongs to the Buddies group 182, and ChattingChuck 185c belongs to the Co-Workers group 184. When a buddy's instant message client program is able to receive communications, the representation of the buddy in the buddy list is displayed under the name or representation of the buddy group to which the buddy belongs. As shown, at least potential instant messaging recipients 180a-180g are online. In contrast, when a buddy's instant message client program is not able to receive communications, the representation of the buddy in the buddy list may not be displayed under the group with which it is associated, but it may instead be displayed with representations of buddies from other groups under the heading Offline 188. All buddies included in the list 175 are displayed either under one of the groups 182, 184, or 186, or under the heading Offline 188.

As illustrated in FIG. 1, each of the sender avatar 135 and the recipient avatar 115 is a graphical image that represents a user in an instant message communications session. The sender projects the sender avatar 135 for self-expression, whereas the recipient projects the recipient avatar 115 also for self-expression. Here, each of the animation avatars 135 or 115 is an avatar that only includes a graphical image of a face, which may be referred to as a facial avatar or a head avatar. In other implementations, an avatar may include additional body components. By way of example, a Thanksgiving turkey avatar may include an image of a whole turkey, including a head, a neck, a body and feathers.

The sender avatar 135 may be animated in response to an instant message sent to the instant message recipient, and the recipient avatar 115 may be animated in response to an instant message sent by the instant message recipient. For example, the text of an instant message sent by the sender may trigger an animation of the sender avatar 135, and the text of an instant messages sent by the instant message recipient to the sender may trigger an animation of the recipient avatar 115.

More particularly, the text of a message to be sent is specified by the sender in the message specification text box 145. The text entered in the message specification text box 145 is sent to the recipient when the sender activates the send button 160. When the send button 160 is activated, the instant message application searches the text of the message for animation triggers. When an animation trigger is identified, the sender avatar 135 is animated with an animation that is associated with the identified trigger. This process is described more fully later. In a similar manner, the text of a message sent by the instant message recipient and received by the sender is searched for animation triggers and, when found, the recipient avatar 115 is animated with an animation associated with the identified trigger. By way of example, the text of a message may include a character string "LOL," which is an acronym that stands for "laughing out loud." The character string "LOL" may trigger an animation in the sender avatar 135 or the recipient avatar 115 such that the sender avatar 135 or the recipient avatar 115 appears to be laughing.

Alternatively or additionally, the sender avatar 135 may be animated in response to an instant message sent from the instant message recipient, and the recipient avatar 115 may be animated in response to a message sent from the instant message sender. For example, the text of an instant message sent by the sender may trigger an animation of the recipient avatar 115, and the text of an instant messages sent by the instant message recipient to the sender may trigger an animation of the sender avatar 135.

More particularly, the text of a message to be sent is specified by the sender in the message specification text box 145. The text entered in the message specification text box 145 is sent to the recipient when the sender activates the send button 160. When the send button 160 is activated, the instant message application searches the text of the message for animation triggers. When an animation trigger is identified, the recipient avatar 115 is animated with an animation that is associated with the identified trigger. In a similar manner, the text of a message sent by the instant message recipient and received by the sender is searched for animation triggers and, when found, the sender avatar 135 is animated with an animation associated with the identified trigger.

In addition, the sender avatar 135 or the recipient avatar 115 may be animated in direct response to a request from the sender or the recipient. Direct animation of the sender avatar 135 or the recipient avatar 115 enables use of the avatars as a means for communicating information between the sender and the recipient without an accompanying instant message. For example, the sender may perform an action that directly causes the sender avatar 135 to be animated, or the recipient may perform an action that directly causes the recipient avatar 115 to be animated. The action may include pressing a button corresponding to the animation to be played or selecting the animation to be played from a list of animations. For example, the sender may be presented with a button that inspires an animation in the sender avatar 135 and that is distinct from the send button 160. Selecting the button may cause an animation of the sender avatar 135 to be played without performing any other actions, such as sending an instant message specified in the message composition area 145. The played animation may be chosen at random from the possible animations of the sender avatar 135, or the played animation may be chosen before the button is selected.

An animation in one of the avatars 135 or 115 displayed on the instant messaging user interface 105 may cause an animation in the other avatar. For example, an animation of the recipient avatar 115 may trigger an animation in the sender avatar 135, and vice versa. By way of example, the sender avatar 135 may be animated to appear to be crying. In response to the animation of the sender avatar 135, the recipient avatar 115 also may be animated to appear to be crying. Alternatively, the recipient avatar 115 may be animated to appear comforting or sympathetic in response to the crying animation of the sender avatar 135. In another example, a sender avatar 135 may be animated to show a kiss and, in response, a recipient avatar 115 may be animated to blush.

The recipient avatar 115 may appear to respond to a mood of the sender communicated by the sender avatar 135. By way of example, in response to a frowning or teary animation of the sender avatar 135, the recipient avatar 115 also may appear sad. Alternatively, the recipient avatar 115 may be animated to try to cheer up the sender avatar 135, such as by smiling, exhibiting a comical expression, such as sticking its tongue out, or exhibiting a sympathetic expression.

An avatar 135 or 115 may be animated in response to a detected idle period of a predetermined duration. For example, after a period of sender inactivity, the sender avatar 135 may be animated to give the appearance that the avatar is sleeping, falling off of the instant messaging interface 105, or some other activity indicative of inactivity. An avatar 135 or 115 also may progress through a series of animations during a period of sender inactivity. The series of animations may repeat continuously or play only once in response to the detection of an idle period. In one example, the sender avatar 135 may be animated to give the appearance that the avatar is sleeping and then having the avatar appear to fall off the instant messaging user interface 105 after a period of sleeping. Animating an avatar 135 or 115 through a progression of multiple animations representative of a period of sender inactivity may provide entertainment to the sender. This may lead to increased usage of the instant messaging user interface 105 by the sender, which in turn, may lead to an increased market share for the instant message service provider.

The sender avatar 135 or the recipient avatar 115 may be animated to reflect the weather at the geographic locations of the sender and the recipient, respectively. For example, if rain is falling at the geographic location of the sender, then the sender avatar 135 may be animated to put on a rain coat or open an umbrella. The wallpaper corresponding to the sender avatar 135 also may include rain drops animated to appear to be failing on the sender avatar 135. The animation of the sender avatar 135 or the recipient avatar 115 played in response to the weather may be triggered by weather information received on the sender's computer or the recipient's computer, respectively. For example, the weather information may be pushed to the sender's computer by a host system of an instant messaging system being used. If the pushed weather information indicates that it is raining, then an animation of the sender avatar 135 corresponding to rainy weather is played.

Furthermore, the avatar may be used to audibly verbalize content other than the text communicated between parties during a communications session. For example, if the text "Hi" appears within a message sent by the sender, the sender avatar 135 may be animated to verbally say "Hello" in response. As another example, when the text "otp" or the text "on the phone" appears within a message sent by the recipient, the recipient avatar 115 may be animated to verbally say "be with you in just a minute" in response. As another example, in response to an idle state, an avatar may audibly try to get the attention of the sender or the recipient. For example, when the recipient sends a message to the sender that includes a question mark and the sender is determined to be idle, the recipient avatar 115 may audibly say "Hello? You there?" to try to elicit a response from the sender regarding the recipient's question.

The sender may mute the recipient avatar 115 or the sender avatar 135 to prevent the recipient avatar 115 or the sender avatar 135 from speaking further. By way of example, the sender may prefer to mute the recipient avatar 115 to prevent the recipient avatar 115 from speaking. In one implementation, to show that an avatar is muted, the avatar may appear to be wearing a gag.

The voice of an avatar may correspond to the voice of a user associated with the avatar. To do so, the characteristics of the user's voice may be extracted from audio samples of the user's voice. The extracted characteristics and the audio samples may be used to create the voice of the avatar. Additionally or alternatively, the voice of the avatar need not correspond to the voice of the user and may be any generated or recorded voice.

The sender avatar 135 may be used to communicate an aspect of the setting or the environment of the sender. By way of example, the animation and appearance of the sender avatar 135 may reflect aspects of the time, date or place of the sender or aspects of the circumstances, objects or conditions of the sender. For example, when the sender uses the instant messaging user interface 105 at night, the sender avatar 135 may appear to be dressed in pajamas and have a light turned on to illuminate an otherwise dark portion of the screen on which the avatar is displayed and/or the sender avatar 135 may periodically appear to yawn. When the sender uses the instant messaging user interface 105 during a holiday period, the sender avatar 135 may be dressed in a manner illustrative of the holiday, such as appearing, as Santa Claus during December, a pumpkin near Halloween, or Uncle Sam during early July. The appearance of the sender avatar 135 also may reflect the climate or geographic location of the sender. For example, when rain is falling in the location of the sender, wallpaper corresponding the sender avatar 135 may include falling raindrops and/or the sender avatar 135 may wear a rain hat or appear under an open umbrella. In another example, when the sender is sending instant message from a tropical location, the sender avatar 135 may appear in beach attire.

The sender avatar 135 also may communicate an activity being performed by the sender while the sender is using the instant messaging user interface 105. For example, when the sender is listening to music, the avatar 135 may appear to be wearing headphones. When the sender is working, the sender avatar 135 may be dressed in business attire, such as appearing in a suit and a tie.

The appearance of the sender avatar 135 also may communicate the mood or an emotional state of the sender. For example, the sender avatar 135 may communicate a sad state of the sender by frowning or shedding a tear. The appearance of the sender avatar 135 or the recipient avatar 115 may resemble the sender or the recipient, respectively. For example, the appearance of the sender avatar 135 may be such that the sender avatar 135 appears to be of a similar age as the sender. In one implementation, as the sender ages, the sender avatar 135 also may appear to age. As another example, the appearance of the recipient avatar 115 may be such that the recipient avatar 115 has an appearance similar to that of the recipient.

In some implementations, the wallpaper applied to the window portion 120 and/or the wallpaper applied to the window portion 140 may include one or more animated objects. The animated objects may repeat continuously or periodically on a predetermined or random basis a series of animations. Additionally or alternatively, the wallpapers applied to the window portions 120 and 140 may be animated to in response to the text of messages sent between the sender and the recipient. For example, the text of an instant message sent by the sender may trigger an animation of the animated objects included in the wallpaper corresponding to the sender avatar 135, and the text of an instant messages sent by the instant message recipient to the sender may trigger an animation of the animated objects included in the wallpaper corresponding to the recipient avatar 115. The animated objects included in the wallpapers may be animated to reflect the setting or environment, activity and mood of the recipient and the sender, respectively.

An avatar may be used as a mechanism to enable self-expression or additional non-text communication by a user associated with the avatar. For example, the sender avatar 135 is a projection of the sender, and the recipient avatar 115 is a projection of the recipient. The avatar represents the user in instant messaging communications sessions that involve the user. The personality or emotional state of a sender may be projected or otherwise communicated through the personality of the avatar. Some users may prefer to use an avatar that more accurately represents the user. As such, a user may change the appearance and behavior of an avatar to more accurately reflect the personality of the user. In some cases, a sender may prefer to use an avatar for self-expression rather than projecting an actual image of the sender. For example, some people may prefer using an avatar to sending a video or photograph of the sender.

Figure 2:
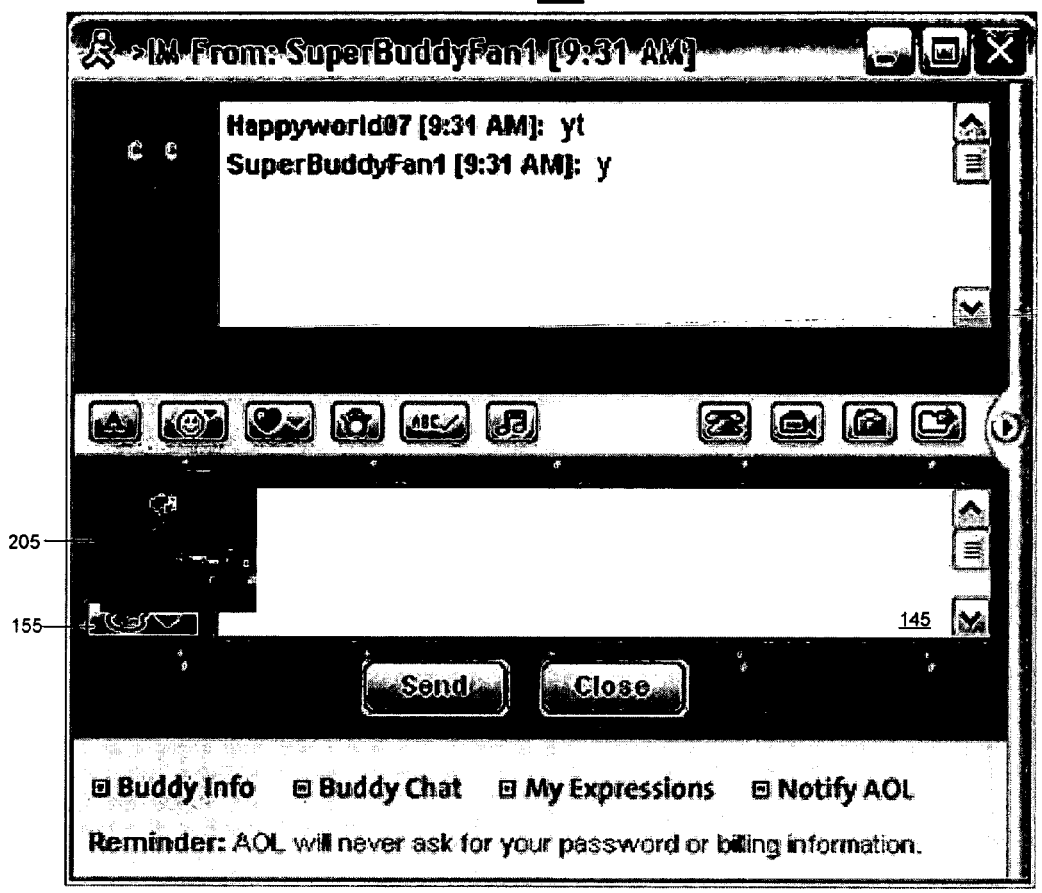

Referring to FIG. 2, the animation of an avatar may involve resizing or repositioning the avatar such that the avatar occupies more or different space on the instant message user interface 105 than the original boundary of the avatar. In the illustration of FIG. 2, the size of sender avatar 205 has been increased such that the avatar 205 covers a portion of the message instant message composition area 145 and the control 155. In addition, elements of the user interface 100 other than an avatar also may be displayed using additional space or using different space on the user interface 100. For example, a sender avatar may depict a starfish with an expressive face and may be displayed on wallpaper that includes animated fish. The animated fish included in the wallpaper may be drawn outside the original boundary around the sender avatar 135 and appear to swim outside the original boundary area.

Figure 3:
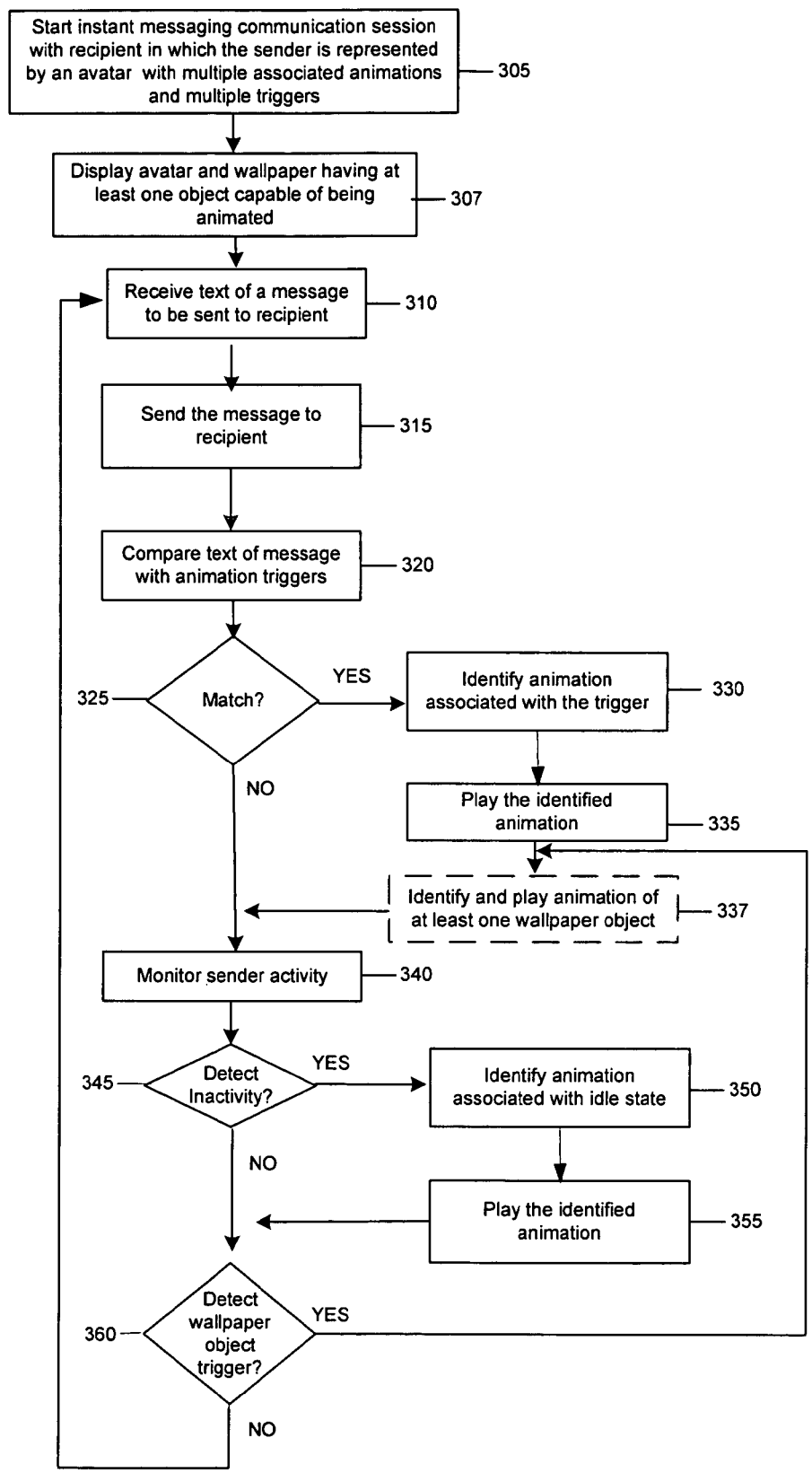
FIG. 3 is a flow chart of a process for animating an avatar based on the content of an instant message.

Referring to FIG. 3, a process 300 is illustrated for animating an avatar for self-expression based on the content of an instant message. In particular, an avatar representing an instant message sender is animated in response to text sent by the sender. The wallpaper of the avatar also is animated. The process 300 is performed by a processor executing an instant messaging communications program. In general, the text of a message sent to an instant message recipient is searched for an animation trigger and, when a trigger is found, the avatar that represents the instant message sender is animated in a particular manner based on the particular trigger that is found. The wallpaper displayed for the avatar includes an animated object or animated objects. The object or objects may be animated based on the content of the instant message sent or may be animated based on other triggers, including (but not limited to) the passing of a predetermined amount of time, the occurrence of a particular day or time of day, any type of animation of the sender avatar, a particular type of animation of the sender avatar, any type of animation of the recipient avatar, or a particular type of the animation of the recipient avatar. Also, when the sender is inactive for a predetermined duration, the avatar sequentially displays each of multiple animations associated with an idle state.

The process 300 begins when an instant message sender who is associated with an avatar starts an instant messaging communications session with an instant message recipient (step 305). To do so, the sender may select the name of the recipient from a buddy list, such as the buddy list 170 from FIG. 1. Alternatively, the name of the recipient may be entered into a form that enables instant messages to be specified and sent. As another alternative, the sender may start an instant messaging application that may be used to sign on for access to the instant messaging system and specify the recipient as a user of the instant messaging system with which a communications session is to be started. Once the recipient has been specified in this manner, a determination is made as to whether a copy of avatars associated with the sender and the recipient exist on the instant message client system being used by the sender. If not, copies of the avatars are retrieved for use during the instant message communications session. For example, information to render an avatar of the recipient may be retrieved from an instant message host system or the instant message recipient client. In some cases, a particular avatar may be selected by the sender for use during the instant messaging communications session. Alternatively or additionally, the avatar may have been previously identified and associated with the sender.

The processor displays a user interface for the instant messaging session including the avatar associated with the sender and wallpaper applied to the user interface over which the avatar is displayed (step 307). The avatar may be displayed over, for example, wallpaper applied to a portion of a window in which an instant message interface is displayed. In another example, the avatar is displayed over a portion or portions of an instant message interface, such as window portions 120 or 140 and FIG. 1. In the example of FIG. 3, the wallpaper corresponding to avatar may include an object or objects that are animated during the instant message communications session.

The processor receives text of a message entered by the sender to be sent to the instant message recipient (step 310) and sends a message corresponding to the entered text to the recipient (step 315). The processor compares the text of the message to multiple animation triggers that are associated with the avatar projected by the sender (step 320). A trigger may include any letter, number, or symbol that may be typed or otherwise entered using a keyboard or keypad. Multiple triggers may be associated with an animation.

Figure 4:
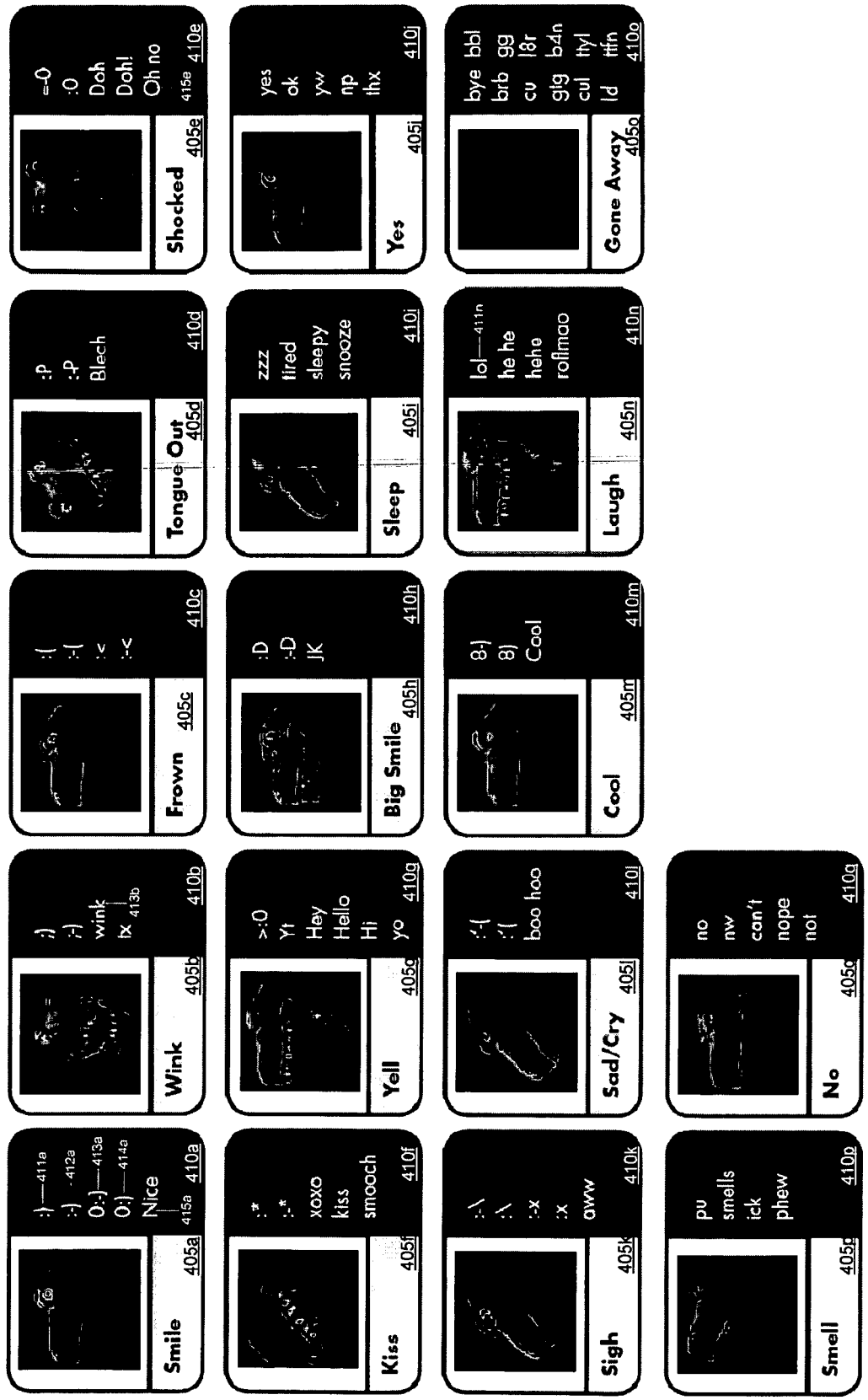
FIG. 4 is a block diagram illustrating exemplary animations of an avatar and textual triggers for each animation.

Referring also to FIG. 4, examples 400 of triggers associated with animations 405a-405q of a particular avatar model are shown. Each of the animations 405a-405q has multiple associated triggers 410a-410q. More particularly, by way of example, the animation 405a, in which the avatar is made to smile, has associated triggers 410a. Each of the triggers 410a includes multiple character strings. In particular, triggers 410a include a ":)" trigger 411a, a ":-)" trigger 412a, a "0:-)" trigger 413a, a "0:)" trigger 414a, and a "Nice" trigger 415a. As illustrated, a trigger may be an English word, such as 415a, or an emoticon, such as 411a-414a. Other examples of a trigger include a particular abbreviation, such as "lol" 411n, and an English phrase, such as "Oh no" 415e. As discussed previously, when one of the triggers is included in an instant message, the avatar is animated with an animation that is associated with the trigger. In one example, when "Nice" is included in an instant message, the avatar is made to smile. In one implementation, one or more of the triggers associated with an animation is modifiable by a user. For example, a user may associate a new trigger with an animation, such as by adding "Happy" to triggers 410a to make the avatar smile. In another example, a user may delete a trigger associated with an animation (that is, disassociate a trigger from an animation), such as by deleting "Nice" 415a. In yet another example, a user may change a trigger that is associated with an animation, such as by changing the "wink" trigger 413b to "winks."

In some implementations, a particular trigger may be associated with only one animation. In other implementations, a particular trigger may be permitted to be associated with multiple animations. In some implementations, only one of the multiple animations may be played in response to a particular trigger. The single animation to be played may be chosen randomly or in a pre-determined manner from the multiple animations. In other implementations, all of the multiple animations may be played serially based on a single trigger. In some implementations, a user may be permitted to delete a particular animation. For example, the user may delete the yell animation 405g. In such a case, the user may delete some or all of the triggers associated with the yell animation 405g or may chose to associate some or all of the triggers 410g with a different animation, such as a smile animation 405a.

Referring again to FIG. 3, the processor determines whether a trigger is included within the message (step 325). When the message includes a trigger (step 325), the processor identifies a type of animation that is associated with the identified trigger (step 330). This may be accomplished by using a database table, a list, or a file that associates one or more triggers with a type of animation for the avatar to identify a particular type of animation. Types of animation include, by way of example, a smile 405a, a wink 405b, a frown 405c, an expression with a tongue out 405d, a shocked expression 410d, a kiss 405f, a yell 405g, a big smile 405h, a sleeping expression 405i, a nodding expression 405j, a sigh 405k, a sad expression 405l, a cool expression 405m, a laugh 405n, a disappearance 405o, a smell 405p, or a negative expression 405q, all of FIG. 4. The identified type of animation for the avatar is played (step 335).

Optionally, the processor may identify and play an animation of at least one wallpaper object based on the match of a trigger with the text of the message sent (step 337).

The processor monitors the communications activity of the sender for periods of inactivity (step 340) to detect when the sender is in an idle state or an idle period of communications activity (step 345). The sender may be in an idle state after a period during which no messages were sent. To detect an idle state, the processor may determine whether the sender has not typed or sent an instant message or otherwise interacted with the instant message communications application for a predetermined amount of time. Alternatively, an idle state may be detected by the processor when the sender has not used the computer system in which the processor operates for a predetermined amount of time.

When the processor detects inactivity (which may be referred to an idle state), a type of animation associated with the idle state is identified (step 350). This may be accomplished by using a database table, list or file that identifies one or more types of animations to play during a detected idle period. The type of animations played during a detected idle state may be the same as or different from the types of animations played based on a trigger in an instant message. The identified type of animation is played (step 355). In one implementation, multiple types of animation associated with the idle state may be identified and played. When the processor detects that the sender is no longer idle, such as by receiving an input from the sender, the processor may immediately stop playing the animation event (not shown). In some implementations, a user may select types of animations to be played during an idle period and/or select the order in which the animation are played when multiple animations are played during an idle period. A user may configure or otherwise determine the duration of time during which no messages are sent that constitutes an idle period for the user.

In some implementations, the processor may detect a wallpaper object trigger that is different than the trigger used to animate the sender avatar (step 360). For example, the processor may detect the passage of a predetermined amount of time. In another example, the processor may detect that the content of the instant message includes a trigger for a wallpaper object animation that is different from the trigger used to animate the sender avatar. Other wallpaper object triggers may include (but are not limited to) the occurrence of a particular day or a particular time of day, the existence of any animations by the sender avatar, the existence of a particular type of animation by the sender avatar, the existence of animations by the recipient avatar, and/or the existence of a particular type of the animation of the recipient avatar. The triggers for the animation of wallpaper objects also may be user-configurable such that a user selects whether a particular type of animation is to be included, any animations are to be played, and triggers for one or more of the wallpaper objects. A trigger for a type of animation of a wallpaper object or objects may be the same as, or different from, one of the triggers associated with animating the avatar.

When the processor detects a wallpaper object trigger (step 360), the processor identifies and plays an animation of at least one wallpaper object (step 337).

The process of identifying and playing types of animations during a sent instant message (steps 310-335) is performed for every instant message that is sent and for every instant message that is received by the processor. The process of identifying and playing types of animation events during periods of inactivity (steps 340-355) may occur multiple times during the instant messaging communications session. Steps 310-355 may be repeated indefinitely until the end of the instant messaging communications session.

The process of identifying and playing the types of animations that correspond to a sent instant message or that are played during a period of sender inactivity (steps 320-355) also are performed by the processor of the instant message communications application that received the message. In this manner, the animation of the sender avatar may be viewed by the sender and the recipient of the instant message. Thus, the animation of the avatar conveys information from the sender to the recipient that is not directly included in the instant message.

Figure 5:
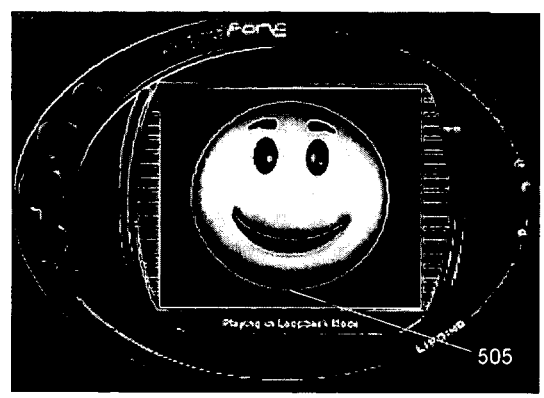

Referring to FIG. 5, an instant messaging interface 500 may be used by a sender of a speech-based instant messaging system to send and receive instant messages. In the speech-based instant messaging system, instant messages are heard rather than read by users. The instant messages may be audio recordings of the users of the speech-based instant messaging system, or the instant messages may include text that is converted into audible speech with a text-to-speech engine. The audio recordings or the audible speech are played by the users. The speech-based instant messaging interface 500 may display an avatar 505 corresponding to a user of the instant messaging system from which speech-based instant messages are received. The avatar 505 may be animated automatically in response to the received instant messages such that the avatar 505 appears to be speaking the contents of the instant message. The recipient may view the animation of the avatar 505 and gather information not directly or explicitly conveyed in the instant message. Depending on the animation played, the recipient may be able to determine, for example, the mood of the sender or whether the sender is being serious or joking.

More particularly, the audio message may be processed in the same or similar manner as a textual instant message is processed with respect to the animation process 300 of FIG. 3. In such a case, types of animations are triggered by audio triggers included in an instant message.

In some implementations, the avatar 505 may appear to be speaking the instant message. For example, the avatar 505 may include animations of mouth movements corresponding to phonemes in human speech to increase the accuracy of the speaking animations. When the instant message includes text, a text-to-speech process may be generate sounds spoken by the avatar 505, animations corresponding to phonemes in the text may be generated, and a lip synchronization process may be used to synchronize the playing of the audio with the lip animation such that the phonemes are heard at the same time that the corresponding animation of the mouth of the avatar 505 is seen. When the instant message includes an audio recording, animations corresponding to phonemes in the audio recording may be generated, and a lip synchronization used to synchronize the playing of the audio recording with the lip animation.

In another example, a sender may record an audio portion to be associated with one or more animations of the avatar 505. The recording then may be played when the corresponding animation of the avatar 505 is played.

Figure 6:
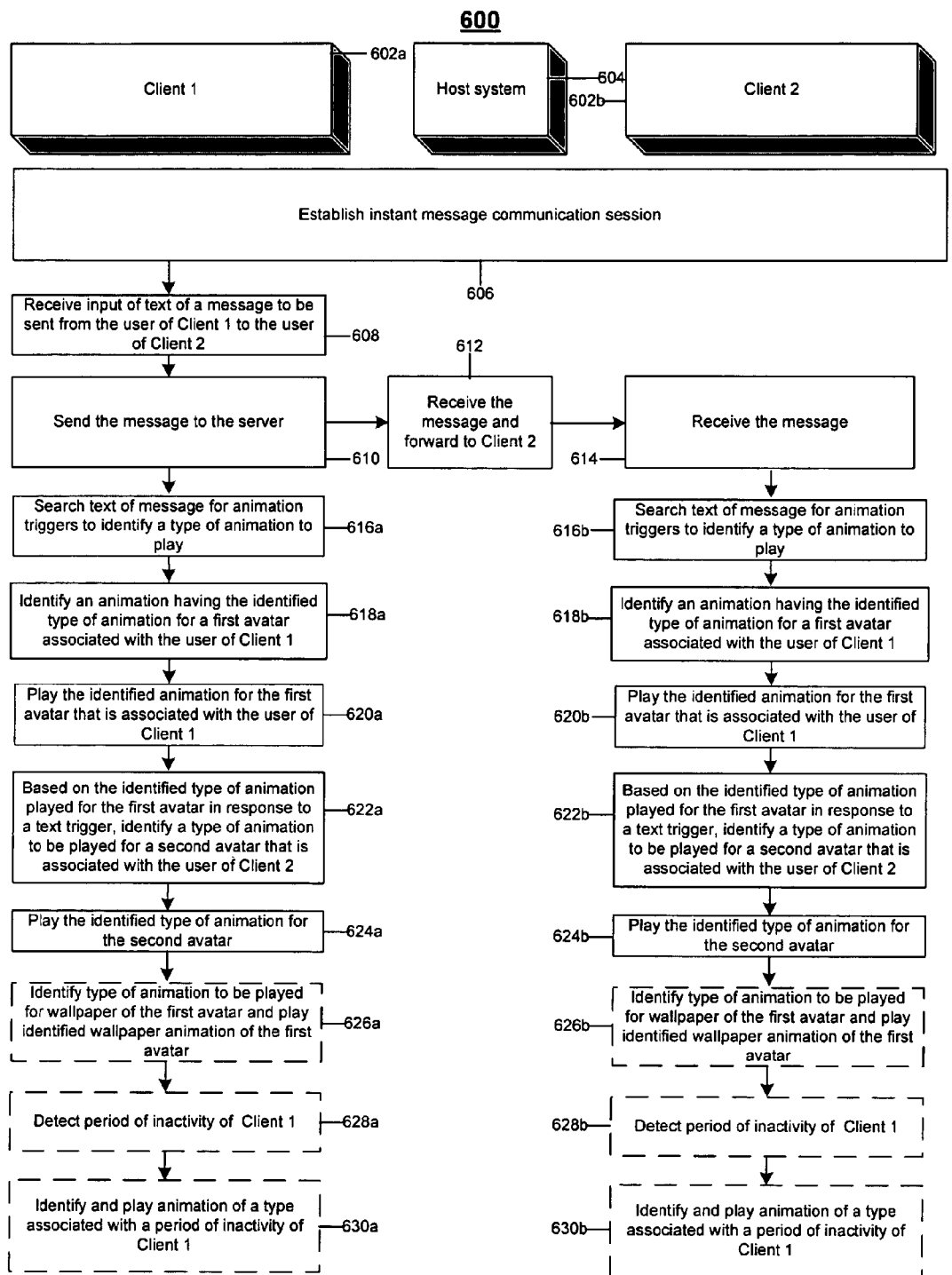
FIG. 6 is a diagram illustrating an exemplary process involving communications between two instant messaging client systems and an instant message host system, whereby an avatar of a user of one of the instant message client systems is animated based on the animation of an avatar of a user of the other of the instant message client systems.

FIG. 6 illustrates an example process 600 for communicating between instant message clients 602a and 602b, through an instant message host system 604, to animate one avatar in response to an animation played in a different avatar. Each of the users using client 602a or client 602b is associated with an avatar that represents and projects the user during the instant message session. The communications between the clients 602a and 602b are facilitated by an instant messaging host system 604. In general, the communications process 600 enables a first client 602a and a second client 602b to send and receive communications from each other. The communications are sent through the instant messaging host system 604. Some or all of the communications may trigger an animation or animations in an avatar associated with the user of the first client 602a and an animation or animations in an avatar associated with the user of the second client 602b.

An instant messaging communications session is established between the first client 602a and the second client 602b in which communications are sent through the instant messaging server host system 604 (step 606). The communications session involves a first avatar that represents the user of the first client 602a and a second avatar that represents the user of the second client 602b. This may be accomplished, for example, as described previously with respect to step 305 of FIG. 3. In general, both the user of the first client 602a and the user of the second client 602b may use a user interface similar to the user interface 100 of FIG. 1 in which the sender avatar and the recipient avatar are displayed on the first client 602a and on the second client 602b.

During the instant messaging communications session, a user associated with the first client 602a enters text of an instant message to be sent to a user of the second client 602b, which is received by the processor on the client 602a executing the instant messaging communications application (step 608). The entered text may include a trigger for one of the animations from the first avatar model. The processor executing the instant messaging communications application sends the entered text to the second client 602b in the instant message by way of the host system 604 (step 610). Specifically, the host system 604 receives the message and forwards the message from the first client 602a to the second client 602b (step 612). The message then is received by the second client 602b (step 614). Upon receipt of the message, the second client 602b displays the message in a user interface in which messages from the user of the first client 602a are displayed. The user interface may be similar to the instant messaging user interface 105 from FIG. 1, in which avatars corresponding to the sender and the recipient are displayed.

Both the first client 602a and the second client 602b have a copy of the message, and both the first client 602a and the second client 602b begin processing the text of the message to determine if the text of the message triggers any animations in the respective copies of the first and second avatar models. When processing the message, the first client 602a and the second client 602b may actually process the message substantially concurrently or serially, but both the first client 602a and the second client 602b process the message in the same way.

Specifically, the first client 602a searches the text of the message for animation triggers to identify a type of animation to play (step 616a). The first client 602a then identifies an animation having the identified type of animation for a first avatar associated with the user of the first client 602a (step 618a). The first client 602a plays the identified animation for the first avatar that is associated with the user of the first client 602a (step 620a). The first avatar model is used to identify the animation to be played because the first avatar model is associated with the first client 602a, which sent the message. The first client 602a and the second client 602b use identical copies of the first avatar model to process the message, so the same animation event is seen on the first client 602a and the second client 602b.

The animation from the first avatar model triggers an animation from the second avatar model. To do so, the first client 602a identifies, based on the identified type of animation played for the first avatar in response to the text trigger, a type of animation to be played for a second avatar that is associated with the user of the second client 602b (step 622a). The first client 602b plays the identified type of animation for the second avatar (step 624a).

The first client also may identify a type of animation to be played for wallpaper corresponding to the first avatar and plays the identified wallpaper animation of the first avatar (step 626a). The wallpaper of the avatar may include an object or objects that are animated during the instant message communications session. The animation of the object or objects may occur based on, for example, a trigger in an instant message or the passage of a predetermined amount of time. The animation of wallpaper objects also may be user-configurable such that a user selects whether a particular type animation, or any animations, are played, and the triggers for one or more of the wallpaper objects. A trigger for a type of animation of a wallpaper object or objects may be the same as, or different from, one of the triggers associated with animating the avatar. After the message has been sent and processed, the user of the first client 602a may not send any additional messages for a period of time. The first client 602a detects such a period of inactivity (step 628a). The first client 602a identifies and plays an animation of a type associated with a period of inactivity of detected by the first client 602a (step 630a). This may be accomplished by using a database table, list or file that identifies one or more types of animations to play during a detected idle period.

The second client 602b processes the instant message in the same was as the first client 602a. Specifically, the second client 602b processes the message with steps 616b through 630b, each of which are substantially the same as parallel the message processing steps 616a through 630a performed by the first client 602a. Because each of the first client 602a and the second client 602b have copies of the avatars corresponding to the users of the first client 602a and the second client 602b, the same animations that were played on the first client 602a as a result of executing steps 616a through 630a are played on the second client 602b as a result of executing the similar steps 616b through 630b.

During the communications process 600, a text-based message indicates the types of animations that occur. However, messages with different types of content also may trigger animations of the avatars. For example, characteristics of an audio signal included in an audio-based message may trigger animations from the avatars.

Figure 7:
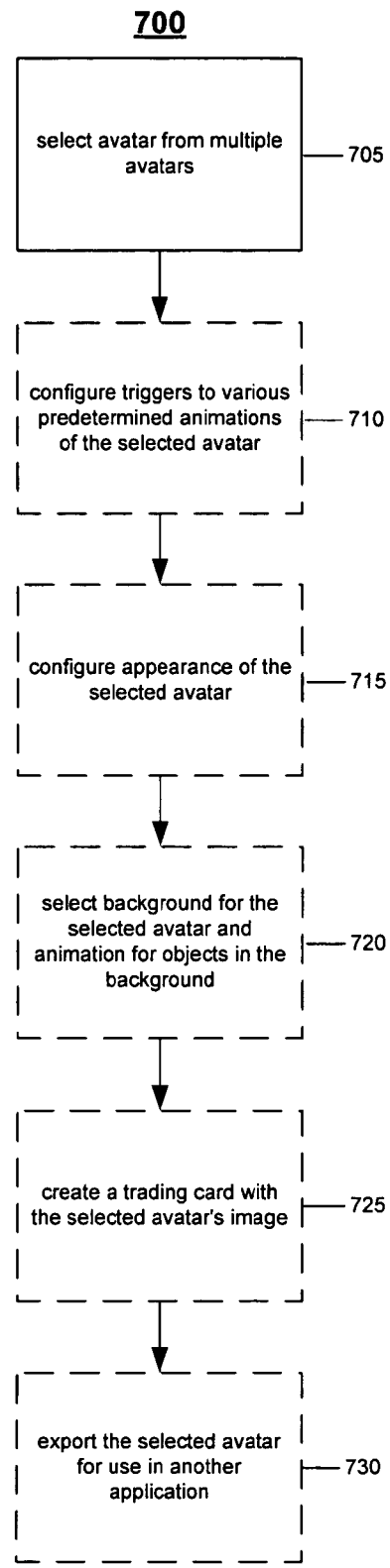
FIG. 7 is a flow chart of a process for selecting and optionally customizing an avatar.

Referring to FIG. 7, a process 700 is used to select and optionally customize an avatar for use with an instant messaging system. An avatar may be customized to reflect a personality to be expressed or another aspect of self-expression of the user associated with the avatar. The process 700 begins when a user selects an avatar from multiple avatars and the selection is received by the processor executing the process 700 (step 705). For example, a user may select a particular avatar from multiple avatars such as the avatars illustrated in FIG. 8. Each of the avatars 805a-805r is associated with an avatar model that specifies the appearance of the avatar. Each of the avatars 805a-805r also includes multiple associated animations, each animation identified as being of a particular animation type. The selection may be accomplished, for example, when a user selects one avatar from a group of displayed avatars. The display of the avatars may show multiple avatars in a window, such as by showing a small representation (which in some implementations may be referred to as a "thumbnail") of each avatar. Additionally or alternatively, the display may be a list of avatar names from which the user selects.

Figure 8:
FIG. 8 is a block diagram depicting examples of avatars capable of being projected by a user for self-expression.

FIG. 8 illustrates multiple avatars 805a-805r. Each avatar 805a-805r includes an appearance, name, and personality description. In one example, avatar 805a has an appearance 810a, a name 810b and a personality description 810c. The appearance of an avatar may represent, by way of example, living, fictional or historical people, sea creatures, amphibians, reptiles, mammals, birds, or animated objects. Some avatars may be represented only with a head, such as avatars

805a-805r. In one example, the appearance of the avatar 805b includes a head of a sheep. The appearance of other avatars may include only a portion or a specific part of a head. For example, the appearance of the avatar 805l resembles a set of lips. Other avatars may be represented by a body in addition to a head. For example, the appearance of the avatar 805n includes a full crab body in addition to a head. An avatar may be displayed over wallpaper that is related in subject matter to the avatar. In one example, the avatar 805i is displayed over wallpaper that is indicative of a swamp in which the avatar 805j lives.

Each of the avatars 805a-805r has a base state expression. For example, the avatar 805f appears to be happy, the avatar 805j appears to be sad, and the avatar 805m appears to be angry. Avatars may have other base state expressions, such as scared or bored. The base state expression of an avatar may influence the behavior of the avatar, including the animations and the sounds of the avatar. In one example, the avatar 805f has a happy base state expression and consequently has a generally happy behavior, whereas the avatar 805m has a creepy base state expression and consequently has a generally scary, creepy and spooky demeanor. In another example, a happy avatar may have upbeat sounds while an angry avatar may appear to be shouting when a sound is produced. The base state expression of an avatar may be changed as a result of the activities of a user associated with the avatar. By way of example, the degree of happiness expressed by the avatar may be related to the number of messages sent or received by the user. When the user sends or receives many messages in a predetermined period of time, the avatar may appear happier than when the user sends or receives fewer messages in the predetermined period of time.

One of multiple avatars 805a-805r may be chosen by a user of the instant messaging system. Each of the avatars 805a-805r is associated with an appearance, characteristics and behaviors that express a particular type of personality. For example, an avatar 805f, which has appearance characteristics of a dolphin, may be chosen.

Each of the avatars 805a-805r is a multi-dimensional character with depth of personality, voice, and visual attributes. In contrast to representing a single aspect of a user through the use of an unanimated, two-dimensional graphical icon, an avatar of the avatars 805a-805r is capable of indicating a rich variety of information about the user projecting the avatar. Properties of the avatar enable the communication of physical attributes, emotional attributes, and other types of context information about the user that are not well-suited (or even available) for presentation through the use of two-dimensional icons that are not animated. In one example, the avatar may reflect the user's mood, emotions, and personality. In another example, the avatar may reflect the location, activities and other context of the user. These characteristics of the user may be communicated through the appearance, the visual animations, and the audible sounds of the avatar.

In one example of an avatar personality, an avatar named SoccerBuddy (not shown) is associated with an energetic personality. In fact, the personality of the SoccerBuddy avatar may be described as energetic, bouncy, confidently enthusiastic, and youthful. The SoccerBuddy avatar's behaviors reflect events in soccer matches. For example, the avatar's yell animation is an "ole, ole, ole" chant, his big-smile animation is "goooooooaaaaaalllll," and, during a frown animation or a tongue-out animation, the avatar shows a yellow card. Using wallpaper, the SoccerBuddy is customizable to represent a specific team. Special features of the Soccer-Buddy avatar include cleated feet to represent the avatar's base. In general, the feet act as the base for the avatar. The SoccerBuddy avatar is capable of appearing to move about by pogo-sticking on his feet. In a few animations, such as when the avatar goes away, the avatar's feet may become large and detach from the SoccerBuddy. The feet are able to be animated to kick a soccer ball around the display.

In another example, a silent movie avatar is reminiscent of silent film actor in the 1920's and 1930's. A silent movie avatar is depicted using a stove-pipe hat and a handle-bar moustache. The silent movie avatar is not associated with audio. Instead of speaking, the silent movie avatar is replaced by, or displays, placards having text in a manner similar to how speech was conveyed in a silent movie.

In other examples, an avatar may be appropriate to current events or a season. In one example, an avatar may represent a team or a player on a team involved in professional or amateur sport. An avatar may represent a football team, a baseball team, or a basketball team, or a particular player of a team. In one example, teams engaged in a particular playoff series may be represented. Examples of seasonal avatars include a Santa Claus avatar, an Uncle Sam avatar, a Thanksgiving turkey avatar, a Jack-o-Lantern avatar, a Valentine's Day heart avatar, an Easter egg avatar, and an Easter bunny avatar.

Animation triggers of the avatar may be modified to customize when various types of animations associated with the avatar are to occur (step 710). For example, a user may modify the triggers shown in FIG. 4 to indicate when an avatar is to be animated, as described previously with respect to FIG. 3. The triggers may be augmented to include frequently used words, phrases, or character strings. The triggers also may be modified such that the animations that are played as a result of the triggers are indicative of the personality of the avatar. Modifying the triggers may help to define the personality expressed by the avatar and used for user self-expression.

Figure 9:
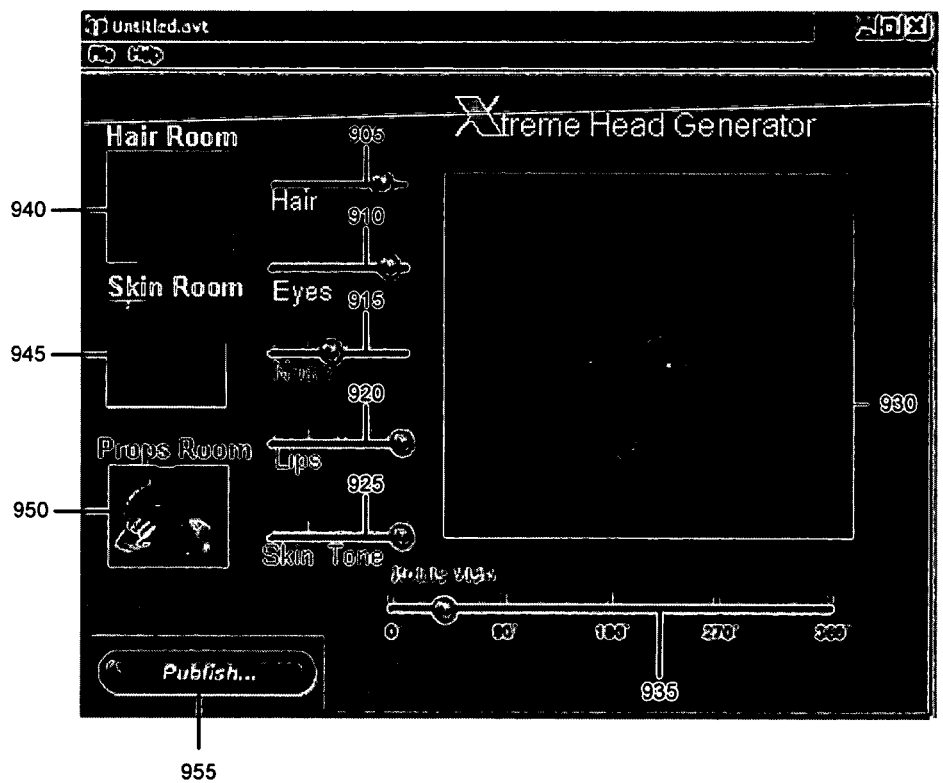
FIG. 9 is a diagram of a user interface for customizing the appearance of an avatar.

A user also may configure the appearance of an avatar (step 715). This also may help define the personality of the avatar, and communicate a self-expressive aspect of the sender. For example, referring also to FIG. 9, an appearance modification user interface 900 may be used to configure the appearance of an avatar. In the example of FIG. 9, the appearance modification user interface 900 enables the user to modify multiple characteristics of a head of an avatar. For example, hair, eyes, nose, lips and skin tone of the avatar may be configured with the appearance modification user interface 900. For example, a hair slider 905 may be used to modify the length of the avatar's hair. The various positions of the hair slider 905 represent different possible lengths of hair for the avatar that correspond to different representations of the hair of the avatar included in the avatar model file associated with the avatar being configured. An eyes slider 910 may be used to modify the color of the avatar's eyes, with each position of the eyes slider 910 representing a different possible color of the avatar's eyes and each color being represented in the avatar model file. A nose slider 915 may be used to modify the appearance of the avatar's nose, with each position of the nose slider 915 representing a different possible appearance of the avatar's nose and each possible appearance being represented in the avatar model file. In a similar manner, a lips slider 920 may be used to modify the appearance of the avatar's lips, with each position of the lips slider 920 representing a different possible appearance of the avatar's lips and associated with a different lip representation in the avatar model file. The avatar's skin tone also may be modified with a skin tone slider 925. Each of the possible positions of the skin tone slider 925 represents a possible skin tone for the avatar with each being represented in the avatar model file.

The appearance of the avatar that is created as a result of using the sliders 905-925 may be previewed in an avatar viewer 930. The values chosen with the sliders 905-925 are reflected in the avatar illustrated in the avatar viewer 930. In one implementation, the avatar viewer 930 may be updated as each of the sliders 905-925 is moved such that the changes made to the avatar's appearance are immediately visible. In another implementation, the avatar viewer 930 may be updated once after all of the sliders 905-925 have been used.

A rotation slider 935 enables the rotation of the avatar illustrated in the avatar viewer 930. For example, the avatar may be rotated about an axis by a number of degrees chosen on the rotation slider 935 relative to an unrotated orientation of the avatar. In one implementation, the axis extends vertically through the center of the avatar's head and the unrotated orientation of the avatar is when the avatar is facing directly forward. Rotating the avatar's head with the rotation slider 930 enables viewing of all sides of the avatar to illustrate the changes to the avatar's appearance made with the sliders 905-925. The avatar viewer 930 may be updated as the rotation slider 930 is moved such that changes in the orientation of the avatar may be immediately visible.

The appearance modification user interface 900 also includes a hair tool button 940, a skin tool button 945, and a props tool button 950. Selecting the hair tool button 940 displays a tool for modifying various characteristics of the avatar's hair. For example, the tool displayed as a result of selecting the hair tool button 940 may enable changes to, for example, the length, color, cut, and comb of the avatar's hair. In one implementation, the changes made to the avatar's hair with the tool displayed as a result of selecting the hair tool button 940 are reflected in the illustration of the avatar in the avatar viewer 930.

Similarly, selecting a skin tool button 945 displays a tool for modifying various aspects of the avatar's skin. For example, the tool displayed as a result of selecting the skin tool button 945 may enable, for example, changing the color of the avatar's skin, giving the avatar a tan, giving the avatar tattoos, or changing the weathering of the avatar's skin to give appearances of the age represented by the avatar. In one implementation, the changes made to the avatar's skin with the tool displayed as a result of selecting the skin tool button 945 are reflected in the illustration of the avatar in the avatar viewer 930.

In a similar manner, selecting the props tool button 950 displays a tool for associating one or more props with the avatar. For example, the avatar may be given eyeglasses, earrings, hats, or other objects that may be worn by, or displayed on or near, the avatar through use of the props tool. In one implementation, the props given to the avatar with the tool displayed as a result of selecting the props tool button 950 are shown in the illustration of the avatar in the avatar viewer 930. In some implementations, all of the props that may be associated with the avatar are included in the avatar model file. The props controls whether each of the props is made visible when the avatar is displayed. In some implementations, a prop may be created using and rendered by two-dimensional animation techniques. The rendering of the prop is synchronized with animations for the three-dimensional avatar. Props may be generated and associated with an avatar after the avatar is initially created.

Once all desired changes have been made to the avatar's appearance, the user may accept the changes by selecting a publish button 955. Selecting the publish button 955 saves the changes made to the avatar's appearance. In addition, when copies of the avatar are held by other users of the instant messaging system to reflect the change made, the other users are sent updated copies of the avatar that reflect the changes made by the user to the avatar. The copies of the avatar may be updated so that all copies of the avatar have the same appearance such that there is consistency among the avatars used to send and receive out-of-band communications. The appearance modification user interface 900 may be used by the user to change only copies of the avatar corresponding to the user. Therefore, the user is prevented from making changes to other avatars corresponding to other users that may be overwritten he user is sent updated copies of the other avatars because the other users made changes to the other avatars. Preventing the user from modifying the other avatars ensures that all copies of the avatars are identical.

The avatar illustrated in the avatar viewer 930 may have an appearance that does not include one of hair, eyes, a nose, lips, or skin tone that are modified with the sliders 905-925. For example, the appearance of the avatar 8051 from FIG. 8 does not include hair, eyes, a nose, or skin tone. In such a case, the appearance modification user interface 900 may omit the sliders 905-925 and instead include sliders to control other aspects of the appearance of the avatar. For example, the appearance modification user interface 900 may include a teeth slider when the appearance of the avatar 8051 is being modified. Moreover, the interface 900 may be customized based on the avatar selected, to enable appropriate and relevant visual enhancements thereto.

In another example of configuring the appearance of an avatar, a configurable facial feature of an avatar may be created using blend shapes of the animation model corresponding to the avatar. A blend shape defines a portion of the avatar that may be animated. In some implementations, a blend shape may include a mesh percentage that may be modified to cause a corresponding modification in the facial feature. In such a case, a user may be able to configure a facial feature of an avatar by using a slider or other type of control to modify the mesh percentage of the blend shapes associated with the facial feature being configured.

In addition to modifying the appearance of the avatar with the appearance modification user interface 900, the color, texture, and particles of the avatar may be modified. More particularly, the color or shading of the avatar may be changed. The texture applied to avatar may be changed to age or weather the skin of the avatar. Furthermore, the width, length, texture, and color of particles of the avatar may be customized. In one example, particles of the avatar used to portray hair or facial hair, such as a beard, may be modified to show hair or beard growth in the avatar.

Referring again to FIG. 7, wallpaper over which the avatar is illustrated and an animation for objects in the wallpaper may be chosen (step 720). This may be accomplished by, for example, choosing wallpaper from a set of possible wallpapers. The wallpapers may include animated objects, or the user may choose objects and animations for the chosen objects to be added to the chosen wallpaper.

A trading card that includes an image of the avatar, a description of the avatar may be created (step 725). In some implementations, the trading card also may include a description of the user associated with the avatar. The trading card may be shared with other users of the instant messaging system to inform the other users of the avatar associated with the user.

Figure 10:
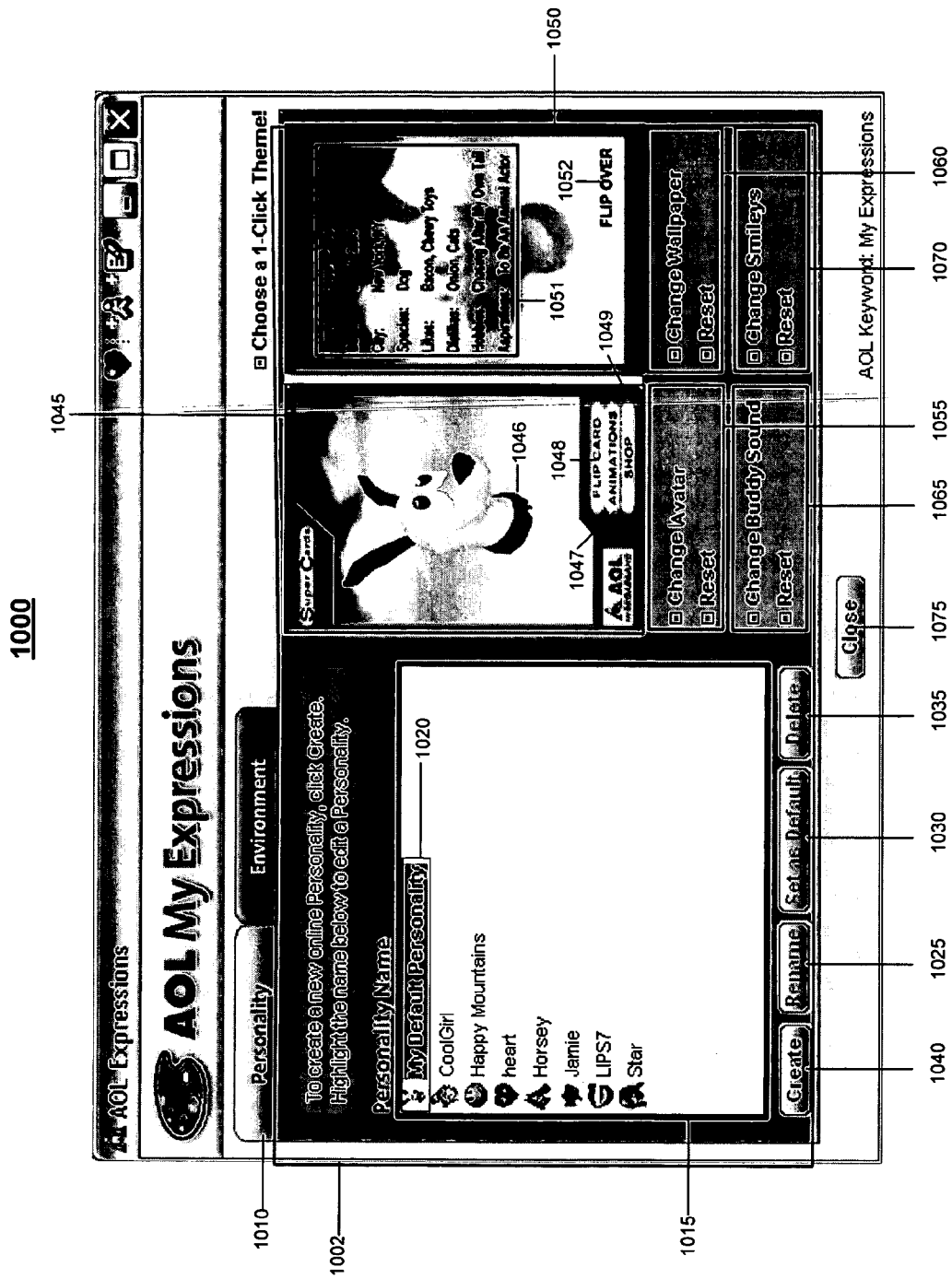
FIG. 10 is a diagram of a user interface used to present a snapshot description of an avatar.

Referring also to FIG. 10, one example of a trading card is depicted. The front side 1045 of the trading card shows the avatar 1046. The animations of the avatar may be played by selecting the animations control 1047. The back side 1050 of the trading card includes descriptive information 1051 about the avatar, including the avatar's name, date of birth, city, species, likes, dislikes, hobbies, and aspirations. As illustrated in FIG. 10, both the front side 1045 and the back side 1050 of the trading card is shown. In some implementations, only one side 1045 or 1050 of the trading card is able to be displayed at one time. In such a case, a user may be able to control the side of the trading card that is displayed by using one of the flip controls 1048 or 1052. A store from which accessories for the avatar 1046 illustrated in the trading card may be accessed by selecting a shopping control 1049.

Referring again to FIG. 7, the avatar also may be exported for use in another application (step 730). In some implementations, an avatar may be used by an application other than a messaging application. In one example, an avatar may be displayed as part of a user's customized home page of the user's access provider, such as an Internet service provider. An instant message sender may drag-and-drop an avatar to the user's customized home page such that the avatar is viewable by the user corresponding to the avatar. In another example, the avatar may be used in an application in which the avatar is viewable by anyone. An instant message sender may drag-and-drop the sender's avatar to the sender's blog or another type of publicly-accessible online journal. The user may repeat one or more of the steps in process 700 until the user is satisfied with the appearance and behavior of the avatar. The avatar is saved and made available for use in an instant messaging communications session.

Referring again to FIG. 10, the avatar settings user interface 1000 includes a personality section 1002. Selecting a personality tab 1010 displays a personality section of the avatar settings interface 1000 for modifying the behavior of the one or more avatars. In one implementation, the avatar settings user interface 1000 may be used with the process 700 of FIG. 7 to choose the wallpaper of an avatar and/or to create a trading card for an avatar.

The personality section 1002 of the avatar settings interface 1000 includes an avatar list 1015 including the one or more various avatars corresponding to the user of the instant messaging system. Each of the one or more avatars may be specified to have a distinct personality for use while communicating with a specific person or in a specific situation. In one implementation, an avatar may change appearance or behavior depending on the person with which the user interacts. For example, an avatar may be created with a personality that is appropriate for business communications, and another avatar may be created with a personality that is appropriate for communications with family members. Each of the avatars may be presented in the list with a name as well as a small illustration of each avatar's appearance. Selection of an avatar from the avatar list 1015 enables the specification of the behavior of the selected avatar. For example, the avatar 1020, which is chosen to be the user's default avatar, has been selected from the avatar list 1015, so the behavior of the avatar 1020 may be specified.

Names of the avatars included in the avatar list may be changed through selection of a rename button 1025. Selecting the rename button displays a tool for changing the name of an avatar selected from the avatar list 1015. Similarly, an avatar may be designated as a default avatar by selecting a default button 1030 after selecting the avatar from the avatar list 1015. Avatars may be deleted by selecting a delete button 1035 after selecting the avatar from the avatar list 1015. In one implementation, a notification is displayed before the avatar is deleted from the avatar list 1015. Avatars also may be created by selecting a create button 1040. When the create button 1040 is pressed, a new entry is added to the avatar list 1015. The entry may be selected and modified in the same way as other avatars in the avatar list 1015.

The behavior of the avatar is summarized in a card front 1045 and a card back 1050 displayed on the personality section. The card front 1045 includes an illustration of the avatar and wallpaper over which the avatar 1020 is illustrated. The card front 1045 also includes a shopping control 1049 to a means for purchasing props for the selected avatar 1020. The card back 1050 includes information describing the selected avatar 1020 and a user of the selected avatar. The description may include a name, a birth date, a location, as well as other identifying and descriptive information for the avatar and the user of the avatar. The card back 1050 also may include an illustration of the selected avatar 1020 as well as the wallpaper over which the avatar 1020 is illustrated. The trading card created as part of the avatar customization process 700 includes the card front 1045 and the card back 1050 automatically generated by the avatar settings interface 1000.

The personality section 1002 of the avatar settings interface 1000 may include multiple links 1055-1070 to tools for modifying other aspects of the selected avatar's 1020 behavior. For example, an avatar link 1055 may lead to a tool for modifying the appearance of the selected avatar 1020. In one implementation, selecting the avatar link 1055 may display the appearance modification user interface 900 from FIG. 9. In another implementation, the avatar link 1055 may display a tool for substituting or otherwise selecting the selected avatar 1020. In yet another example, the avatar link 1055 may allow the appearance of the avatar to be changed to a different species. For example, the tool may allow the appearance of the avatar 1020 to be changed from that of a dog to that of a cat.

A wallpaper link 1060 may be selected to display a tool for choosing the wallpaper over which the selected avatar 1020 is drawn. In one implementation, the wallpaper may be animated.

A sound link 1065 may be selected to display a tool with which the sounds made by the avatar 1020 may be modified. The sounds may be played when the avatar is animated, or at other times, to get the attention of the user.

An emoticon link 1070 may be selected to display a tool for specifying emoticons that are available when communicating with the selected avatar 1020. Emoticons are two-dimensional non-animated images that are sent when certain triggers are included in the text of an instant message. Changes made using the tools that are accessible through the links 1055-1070 may be reflected in the card front 1045 and the card back 1050. After all desired changes have been made to the avatars included in the avatar list 1015, the avatar settings interface 1000 may be dismissed by selecting a close button 1075.

It is possible, through the systems and techniques described herein, particularly with respect to FIGS. 11A-14, to enable users to assemble multiple self-expression items into a collective "online persona" or "online personality," which may then be saved and optionally associated with one or more customized names. Each self-expression item is used to represent the instant message sender or a characteristic or preference of the instant message sender, and may include user-selectable binary objects. The self-expression items may be made perceivable by a potential instant message recipient ("instant message recipient") before, during, or after the initiation of communications by a potential instant message sender ("instant message sender"). For example, self-expression items may include an avatar, images, such as wallpaper, that are applied in a location having a contextual placement on a user interface. The contextual placement typically indicates an association with the user represented by the self-expression item. For instance, the wallpaper may be applied in an area where messages from the instant message sender are displayed, or in an area around a dialog area on a user interface. Self-expression items also include sounds, animation, video clips, and emoticons (e.g., smileys). The personality may also include a set of features or functionality associated with the personality. For example, features such as encrypted transmission, instant message conversation logging, and forwarding of instant messages to an alternative communication system may be enabled for a given personality.

Users may assign personalities to be projected when conversing with other users, either in advance of or "on-the-fly" during a communication session. This allows the user to project different personalities to different people on-line. In particular, users may save one or more personalities (e.g., where each personality typically includes groups of instant messaging self-expression items such as, for example avatars, Buddy Sounds, Buddy Wallpaper, and Smileys, and/or a set of features and functionalities) and they may name those personalities to enable their invocation, they may associate each of different personalities with different users with whom they communicate or groups of such users so as to automatically display an appropriate/selected personality during communications with such other users or groups, or they may establish each of different personalities during this process of creating, adding or customizing lists or groups of users or the individual users themselves. Thus, the personalities may be projected to others in interactive online environments (e.g., Instant Messaging and Chat) according the assignments made by the user. Moreover, personalities may be assigned, established and/or associated with other settings, such that a particular personality may be projected based on time-of-day, geographic or virtual location, or even characteristics or attributes of each (e.g., cold personality for winter in Colorado or chatting personality while participating in a chat room).

In many instances, an instant message sender may have multiple online personas for use in an instant message communications session. Each online persona is associated with an avatar representing the particular online persona of the instant message sender. In many cases, each online persona of a particular instant message sender is associated with a different avatar. This need not be necessarily so. Moreover, even when two or more online personas of a particular instant message sender include the same avatar, the appearance or behavior of the avatar may be different for each of the online personas. In one example, a starfish avatar may be associated with two online personas of a particular instant message sender. The starfish avatar that is associated with one online persona may have different animations than the other starfish avatar that is associated with the other online persona. Even when both of the starfish avatars include the same animations, one of the starfish avatars may be animated to display an animation of a particular type based on different triggers than the same animation that is displayed for the other of the starfish avatars.

Figure 11A:
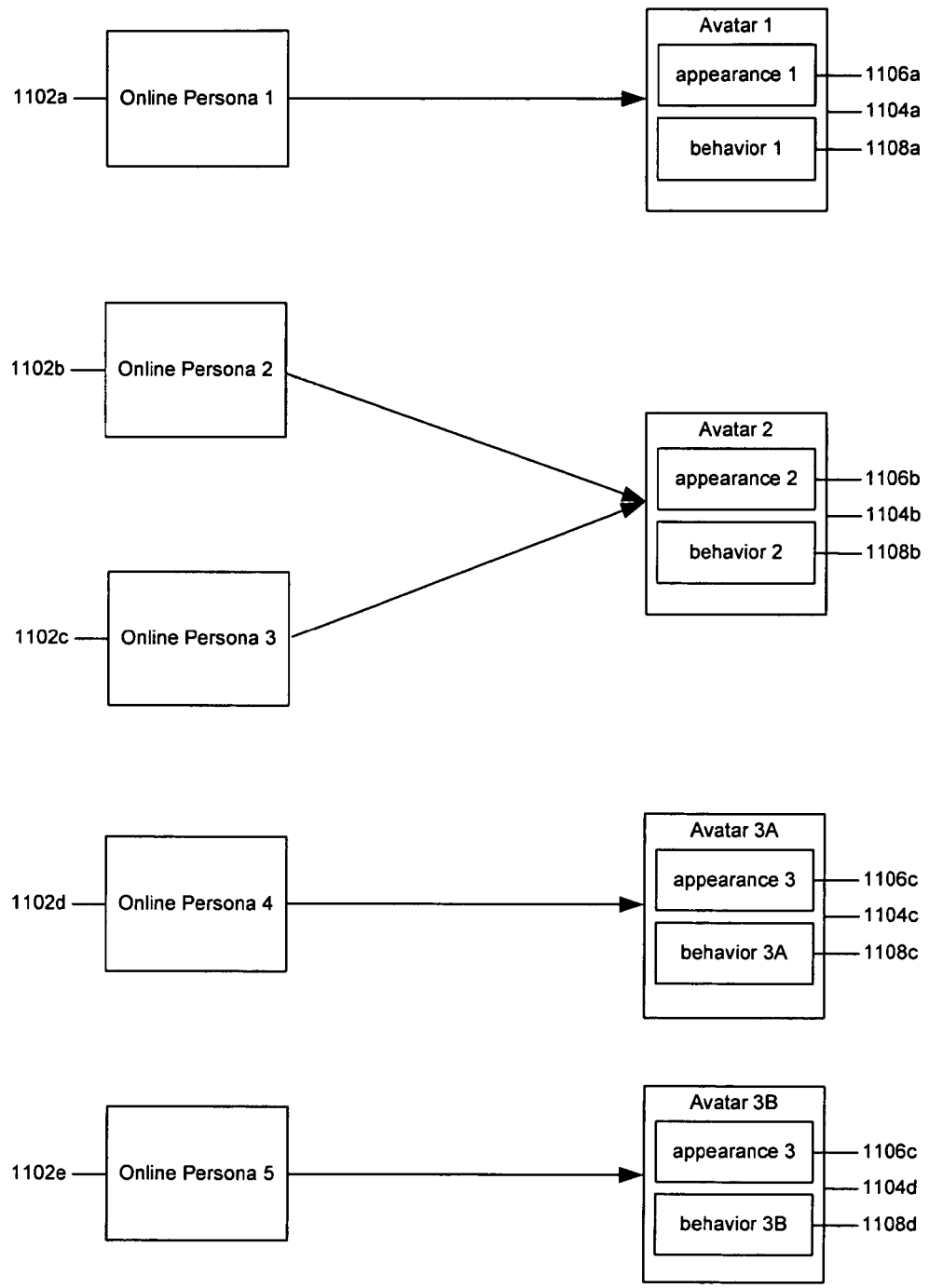
FIG. 11A is a block diagram illustrating relationships between online personas, avatars, avatar behaviors and avatar appearances.

FIG. 11A shows relationships between online personas, avatars, avatar behaviors and avatar appearances. In particular, FIG. 11A shows online personas 1102a-1102e and avatars 1104a-1104d that are associated with the online personas 1102a-1102e. Each of the avatars 1104a-1104d includes an appearance 1106a-1106c and a behavior 1108a-1108d. More particularly, the avatar 1104a includes an appearance 1106a and a behavior 1108a; the avatar 1104b includes an appearance 1106b and a behavior 1108b; the avatar 1104c includes the appearance 1106c and a behavior 1108c; and the avatar 1104d includes an appearance 1106c and a behavior 1108d. The avatars 1104c and 1104d are similar in that both include the appearance 1106c. However, the avatars 1104c and 1104d differ in that the avatar 1104c includes the behavior 1108c while the avatar 1104d includes the behavior 1108d.

Each of the online personas 1102a-1102e is associated with one of the avatars 1104a-1104d. More particularly, the online persona 1102a is associated with the avatar 1104a; the online persona 1102b is associated with the avatar 1104b; the online persona 1102c also is associated with the avatar 1104b; the online persona 1102d is associated with the avatar 1104c; and the online persona 1102e is associated with the avatar 1104d. As illustrated by the online persona 1102a that is associated with the avatar 1104a, an online persona may be associated with an avatar that is not also associated with a different online persona.

Multiple online personas may use the same avatar. This is illustrated by the online personas 1102b and 1102c that are both associated with the avatar 1104b. In this case, the appearance and behavior exhibited by avatar 1104b is the same for both of the online personas 1102b and 1102c. In some cases, multiple online personas may use similar avatars that have the same appearance by which exhibit different behavior, as illustrated by online personas 1102d and 1102e. The online personas 1102d and 1102e are associated with similar avatars 1104c and 1104d that have the same appearance 1106c. The avatars 1102d and 1102e, however, exhibit different behavior 1108c and 1108d, respectively.

In creating personalities, the instant message sender may forbid a certain personality to be shown to designate instant message recipients and/or groups. For example, if the instant message sender wants to ensure that the "Casual" personality is not accidentally displayed to the boss or to co-workers, the instant message sender may prohibit the display of the "Casual" personality to the boss on an individual basis, and may prohibit the display of the "Casual" personality to the "Co-workers" group on a group basis. An appropriate user interface may be provided to assist the instant message sender in making such a selection. Similarly, the instant message sender may be provided an option to "lock" a personality to an instant message recipient or a group of instant message recipients to guard against accidental or unintended personality switching and/or augmenting. Thus, for example, the instant message sender may choose to lock the "Work" personality to the boss on an individual basis, or to lock the "Work" personality to the "Co-workers" group on a group basis. In one example, the Casual personality will not be applied to a locked personality.

Figure 11B:
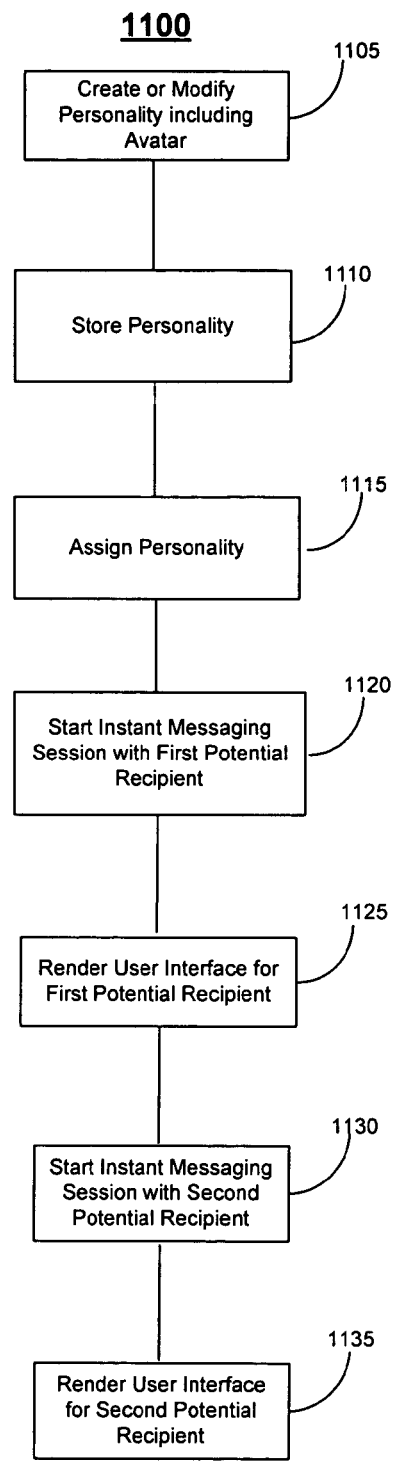
FIG. 11B is a flow chart of a process for using a different online personality to communicate with each of two instant message recipients.

FIG. 11B shows an exemplary process 1100 to enable an instant message sender to select an online persona to be made perceivable to an instant message recipient. The selected online persona includes an avatar representing the online persona of the instant message sender. The process 1100 generally involves selecting and projecting an online persona that includes an avatar representing the sender. The instant message sender creates or modifies one or more online personalities, including an avatar representing the sender (step 1105). The online personalities may be created or modified with, for example, the avatar settings user interface 1000 of FIG. 10. Creating an online persona generally involves the instant message sender selecting one or more self-expression items and/or features and functionalities to be displayed to a certain instant message recipient or group of instant message recipients. A user interface may be provided to assist the instant message sender in making such a selection, as illustrated in FIG. 12.

Figure 12:
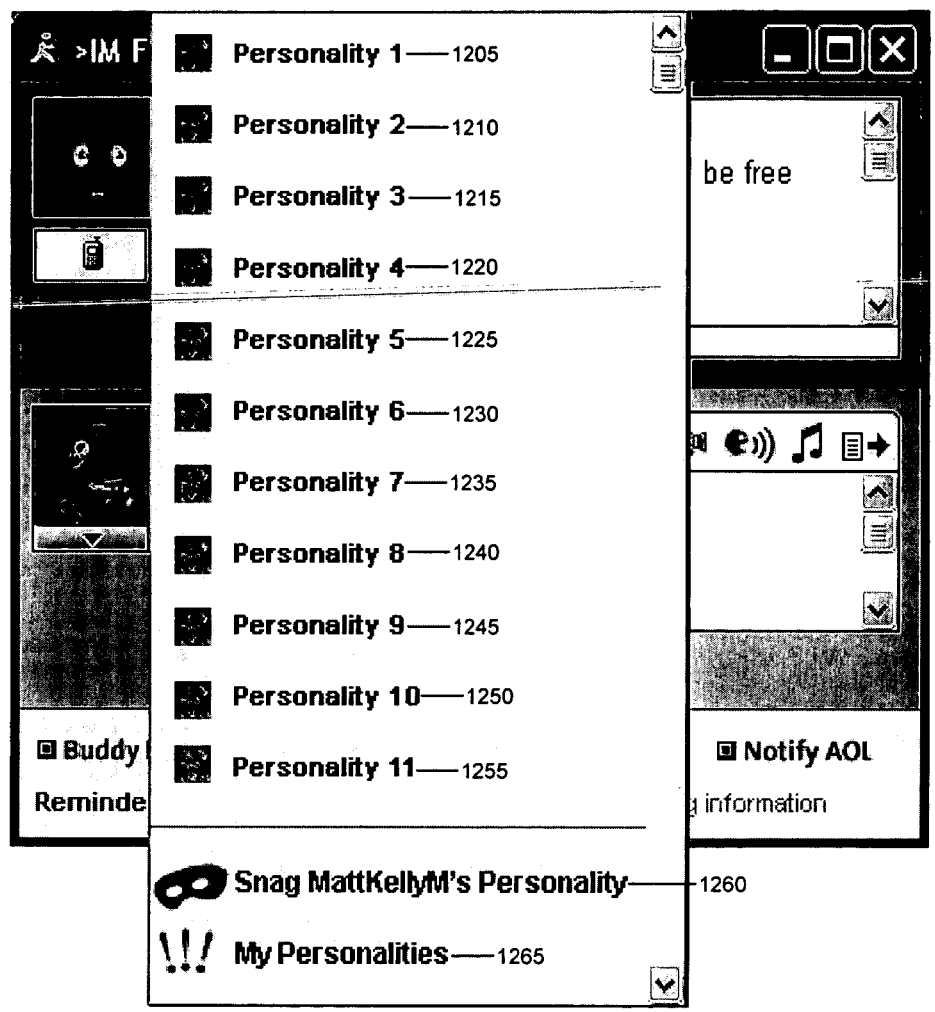
FIG. 12 is a diagram of a user interface that enables an instant message sender to select among available online personas.

FIG. 12 shows a chooser user interface 1200 that enables the instant message sender to select among available personalities 1205, 1210, 1215, 1220, 1225, 1230, 1235, 1240, 1245, 1250, and 1255. The user interface 1200 also has a control 1260 to enable the instant message sender to "snag" the personality of another user, and a control 1265 to review the personality settings currently selected by the instant message sender. Through the use of the avatar settings interface 1000, the user may change the personality, including the avatar, being projected to the instant message recipient before, during, or after the instant message conversation with the recipient.

Alternatively, the selection of a personality also may occur automatically without sender intervention. For example, an automatic determination may be made that the sender is sending instant messages from work. In such a case, a personality to be used at work may be selected automatically and used for all communications. As another example, an automatic determination may be made that the sender is sending instant messages from home, and a personality to be used at home may be selected automatically and used for all communications. In such an implementation, the sender is not able to control which personality is selected for use. In other implementations, automatic selection of a personality may be used in conjunction with sender selection of a personality, in which case the personality automatically selected may act as a default that may be changed by the sender.

Figure 13:
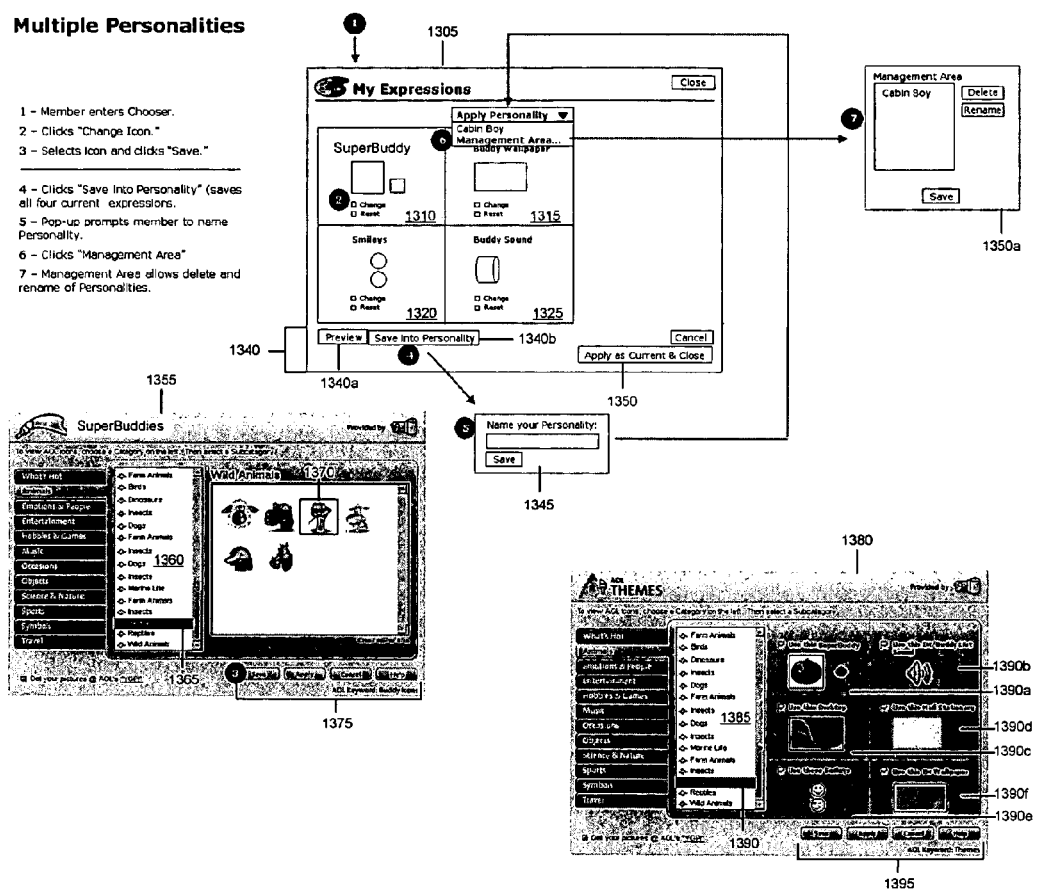
FIG. 13 is a diagram of exemplary user interfaces for enabling an instant message sender to create and store an online persona that includes an avatar for self-expression.

FIG. 13 shows a series 1300 of exemplary user interfaces for enabling an instant message sender to create and store a personality, and/or select various aspects of the personality such as avatars, buddy wallpaper, buddy sounds, and smileys. As shown, user interface 1305 enables an instant message sender to select a set of one or more self-expression items and save the set of self-expression items as a personality. The user interface 1305 also enables an instant message sender to review and make changes to an instant message personality. For example, the user interface 1305 enables an instant message sender to choose an avatar 1310 (here, referred to as a SuperBuddy), buddy wallpaper 1315, emoticons 1320 (here, referred to as Smileys), and buddy sounds 1325. A set of controls 1340 is provided to enable the instant message sender to preview 1340a the profile and to save 1340b these selected self-expression items as a personality. The instant message sender is able to name and save the personality 1345 and then is able to apply the personality 1350 to one or more individual instant message recipients or one or more groups of instant message recipients. A management area 1350a is provided to enable the instant message sender to delete, save, or rename various instant message personalities. In choosing the self-expression items, other interfaces such as user interface 1355 may be displayed to enable the instant message sender to select the particular self-expression items. The user interface 1355 includes a set of themes 1360 for avatars which enables an instant message sender to select a particular theme 1365 and choose a particular avatar 1370 in the selected theme. A set of controls 1375 is provided to assist the instant message sender in making the selection of self-expression items. Also, an instant message sender may be enabled to choose a pre-determined theme, for example, by using a user interface 1380. In user interface 1380, the instant message sender may select various categories 1385 of pre-selected themes and upon selecting a particular category 1390, a set of default pre-selected, self-expression items is displayed, 1390a, 1390b, 1390c, 1390d, 1390e, and 1390f. The set may be unchangeable or the instant message sender may be able to individually change any of the pre-selected self-expression items in the set. A control section 1395 is also provided to enable the instant message sender to select the themes.

In another implementation, the features or functionality of the instant message interface may vary based upon user-selected or pre-selected options for the personality selected or currently in use. The features or functionality may be transparent to the instant message sender. For example, when using the "Work" personality, the outgoing instant messages may be encrypted, and a copy may be recorded in a log, or a copy may be forwarded to a designated contact such as an administrative assistant. A warning may be provided to an instant message recipient that the instant message conversation is being recorded or viewed by others, as appropriate to the situation. By comparison, if the non-professional "Casual" personality is selected, the outgoing instant messages may not be encrypted and no copy is recorded or forwarded.

As a further example, if the "Work" personality is selected and the instant message sender indicates an unavailability to receive instant messages (e.g., through selection of an "away" message or by going offline), then messages received from others during periods of unavailability may be forwarded to another instant message recipient such as an administrative assistant, or may be forwarded to an e-mail address for the instant message sender. By comparison, if the non-professional "Casual" personality is selected, no extra measures are taken to ensure delivery of the message.

In one implementation, the features and functionality associated with the personality would be transparent to the instant message sender, and may be based upon one or more pre-selected profiles types when setting up the personality. For example, the instant message sender may be asked to choose from a group of personality types such as professional, management, informal, vacation, offbeat, etc. In the example above, the "Work" personality may have been be set up as a "professional" personality type and the "Casual" personality may have been set up as an "informal" personality type. In another implementation, the instant message sender may individually select the features and functionalities associated with the personality.

Referring again to FIG. 11B, the personality is then stored (step 1110). The personality may be stored on the instant message sender system, on the instant message host system, or on a different host system such as a host system of an authorized partner or access provider.

Next, the instant message sender assigns a personality to be projected during future instant message sessions or when engaged in future instant message conversations with an instant message recipient (step 1115). The instant message sender may wish to display different personalities to different instant message recipients and/or groups in the buddy list. The instant message sender may use a user interface to assign personalization items to personalities on at least a per-buddy group basis. For example, an instant message sender may assign a global avatar to all personalities, but assign different buddy sounds on a per-group basis to other personalities (e.g. work, family, friends), and assign buddy wallpaper and smileys on an individual basis to individual personalities corresponding to particular instant message recipients within a group. The instant message sender may assign other personality attributes based upon the occurrence of certain predetermined events or triggers. For example, certain potential instant message recipients may be designated to see certain aspects of the Rainy Day personality if the weather indicates rain at the geographic location of the instant message sender. Default priority rules may be implemented to resolve conflicts, or the user may select priority rules to resolve conflicts among personalities being projected or among self-expression items being projected for an amalgamated personality.

For example, a set of default priority rules may resolve conflicts among assigned personalities by assigning the highest priority to personalities and self-expression items of personalities assigned on an individual basis, assigning the next highest priority to assignments of personalities and personalization items made on a group basis, and assigning the lowest priority to assignments of personalities and personalization items made on a global basis. However, the user may be given the option to override these default priority rules and assign different priority rules for resolving conflicts.

Next, an instant message session between the instant message sender and the instant message recipient is initiated (step 1120). The instant message session may be initiated by either the instant message sender or the instant message recipient.

An instant message user interface is rendered to the instant message recipient, configured to project the personality, including the avatar, assigned to the instant message recipient by the instant message sender (step 1125), as illustrated, for example, in the user interface 100 in FIG. 1. The personality, including an avatar associated with the personality, chosen by an instant messaging recipient may be made perceivable upon opening of a communication window by the instant message sender for a particular instant message recipient but prior to initiation of communications. This may allow a user to determine whether to initiate communications with instant message recipient. For example, an instant message sender may notice that the instant message recipient is projecting an at-work personality, and the instant message sender may decide to refrain from sending an instant message. This may be particularly true when the avatar of the instant message recipient is displayed on a contact list. On the other hand, rendering the instant message recipient avatar after sending an instant message may result in more efficient communications.

The appropriate personality/personalization item set for a buddy is sent to the buddy when the buddy communicates with the instant message sender through the instant messaging client program. For example, in an implementation which supports global personalization items, group personalization items, and personal personalization items, a personal personalization item is sent to the buddy if set, otherwise a group personalization item is sent, if set. If neither a personal nor a group personalization item is set, then the global personalization item is sent. As another example, in an implementation that supports global personalization items and group personalization items, the group personalization item for the group to which the buddy belongs is sent, if set, otherwise the global personalization item is sent. In an implementation that only supports group personalization items, the group personalization item for the group to which the buddy belongs is sent to the buddy.

An instant message session between the instant message sender and another instant message recipient also may be initiated (step 1130) by either the instant message sender or the second instant message recipient.

Relative to the second instant message session, a second instant message user interface is rendered to the second instant message recipient, configured to project the personality, including the avatar, assigned to the second instant message recipient by the instant message sender (step 1135), similar to the user interface illustrated by FIG. 1. The personality may be projected in a similar manner to that described above with respect to step 1125. However, the personality and avatar projected to the second instant message recipient may differ from the personality and avatar projected to the first instant message recipient described above in step 1125.

Figure 14:
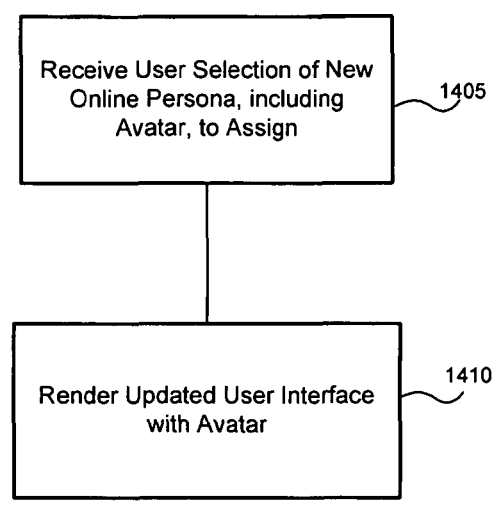
FIG. 14 is a flow chart of a process for enabling a user to change an online persona that includes an avatar for self-expression.

Referring to FIG. 14, an exemplary process 1400 enables an instant message sender to change a personality assigned to an instant message recipient. In process 1400, a user selection of a new online persona, including an avatar, to be assigned to the instant message recipient is received (step 1405). The change may be received through an instant message chooser 1200, such as that discussed above with respect to FIG. 12, and may include choosing self-expression items and/or features and functionality using such as interface or may include "snagging" an online persona or an avatar of the buddy using such an interface. Snagging an avatar refers to the appropriation by the instant message sender of one or more personalization items, such as the avatar, used by the instant message recipient. Typically, all personalization items in the online persona of the instant message recipient are appropriated by the instant message sender when "snagging" an online persona.

Next, the updated user interface for that instant message recipient is rendered based on the newly selected personality (step 1410).

Figure 15:
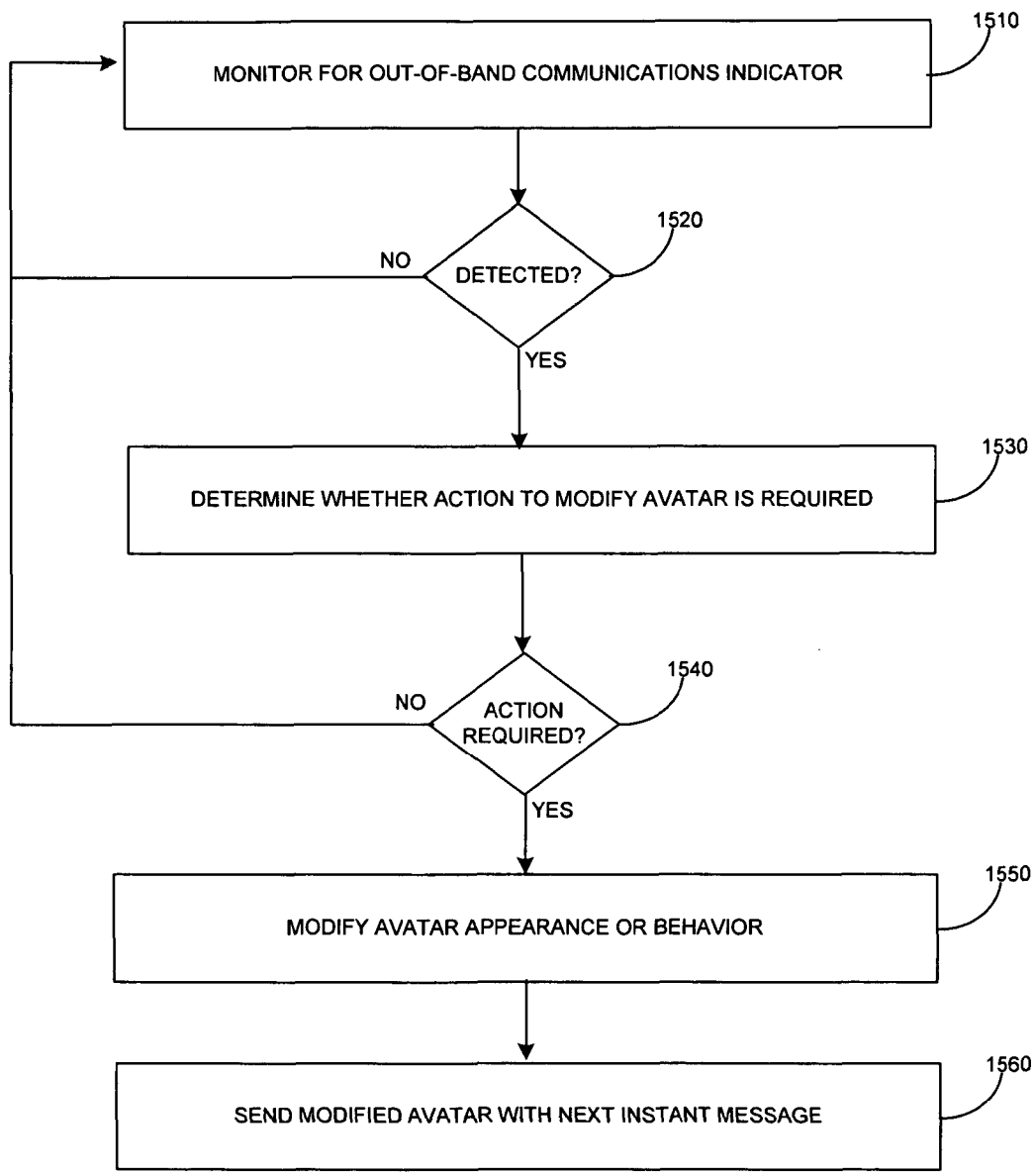
FIG. 15 is a flow chart of a process for using an avatar to communicate an out-of-band message to an instant message recipient.

FIG. 15 illustrates an example process 1500 for modifying the appearance, or the behavior, of an avatar associated with an instant message sender to communicate an out-of-band message to an instant message recipient. The process may be performed by an instant messaging system, such as communications systems 1600, 1700, and 1800 described with respect to FIGS. 16, 17, and 18, respectively. An out-of-band message refers to sending a message that communicates context out-of-band—that is, conveying information independent of information conveyed directly through the text of the instant message itself sent to the recipient. Thus, the recipient views the appearance and behavior of the avatar to receive information that is not directly or explicitly conveyed in the instant message itself. By way of example, an out-of-band communication may include information about the sender's setting, environment, activity or mood, which is not communicated and part of a text message exchanged by a sender and a recipient.

The process 1500 begins with the instant messaging system monitoring the communications environment and sender's environment for an out-of-band communications indicator (step 1510). The indicator may be an indicator of the sender's setting, environment, activity, or mood that is not expressly conveyed in instant messages sent by the sender. For example, the out-of-band indicator may be an indication of time and date of the sender's location, which may be obtained from a clock application associated with the instant messaging system or with the sender's computer. The indicator may be an indication of the sender's physical location. The indicator may be an indication of an indication of weather conditions of the sender's location, which may be obtained from a weather reporting service, such as a web site that provides weather information for geographic locations.

In addition, the indicator may indicate the activities of the sender that take place at, or near, the time when an instant message is sent. For example, the indicator may determine from the sender's computer other applications that are active at, or near, the time that an instant message is sent. For example, the indicator may detect that the sender is using a media-playing application to play music, so the avatar associated with the sender may appear to be wearing headphones to reflect that the sender is listening to music. As another example, the indicator may detect that the sender is working with a calculator application, so the avatar may appear to be wearing glasses to reflect that sender is working.

The activities of the sender also may be monitored through use of a camera focused on the sender. Visual information taken from the camera may be used to determine the activities and mood of the sender. For example, the location of points on the face of the sender may be determined from the visual information taken from the camera. The position and motion of the facial points may be reflected in the avatar associated with the sender. Therefore, if the sender were to, for example, smile, then the avatar also smiles.

The indicator of the sender's mood also may come from another device that is operable to determine the sender's mood and send an indication of mood to the sender's computer. For example, the sender may be wearing a device that monitors heart rate, and determines the sender's mood from the heart rate. For example, the device may conclude that the sender is agitated or excited when an elevated heart rate is detected. The device may send the indication of the sender's mood to the sender's computer for use with the sender's avatar.

The instant messaging system makes a determination as to whether an out-of-band communications indicator has been detected (step 1520). When an out-of-band communications indicator is detected, the instant messaging system determines whether the avatar must be modified, customized, or animated to reflect the detected out-of-band communications indicator (step 1530); meanwhile or otherwise, the instant messaging system continues to monitor for out-of-band communications indicators (step 1510). To determine whether action is required, the instant messaging system may use a data table, list or file that includes out-of-band communications indicators and an associated action to be taken for each out-of-band communications indicator. Action may not be required for each out-of-band communications indicator detected. For example, action may only be required for some out-of-band communications indicators when an indicator has changed from a previous indicator setting. By way of example, the instant messaging system may periodically monitor the clock application to determine whether the setting associated with the sender is daytime or nighttime. Once the instant messaging system has taken action based on detecting an out-of-band communications indicator having a nighttime setting, the instant messaging system need not take action based on the detection of a subsequent nighttime setting indicator. The instant messaging system only takes action based on the nighttime setting after receiving an intervening out-of-band communications indicator for a daytime setting.

When action is required (step 1540), the appearance and/or behavior of the avatar is modified in response to the out-of-band communications indicator (step 1550).

In one example, when an out-of-band communications indicator shows that the sender is sending instant messages at night, the appearance of the avatar is modified to be dressed in pajamas. When the indicator shows that the sender is sending instant messages during a holiday period, the avatar may be dressed in a manner illustrative of the holiday. By way of example, the avatar may be dressed as Santa Claus during December, a pumpkin near Halloween, or Uncle Sam during early July.

In another example, when the out-of-band indicator shows that the sender is at the office, the avatar may be dressed in business attire, such as a suit and a tie. The appearance of the avatar also may reflect the weather or general climate of the geographic location of the sender. For example, when the out-of-band communications indicator shows that it is raining at the location of the sender, the wallpaper of the avatar may be modified to include falling raindrops or display an open umbrella and/or the avatar may appear to wear a rain hat.

As another example, when the out-of-band communications indicator shows that the sender is listening to music, the appearance of the avatar may be changed to show the avatar wearing headphones. Additionally or alternatively, the appearance of the avatar may be changed based on the type of music to which the sender is listening. When the indicator indicates that the sender is working (at the sender's work location or at another location), the avatar may appear in business attire, such as wearing a suit and a tie. As indicated by this example, different out-of-band communications indicators may trigger the same appearance of the avatar. In particular, both the out-of-band communications indicator of the sender being located at work and the out-of-band communications indicator of the sender performing a work activity causes the avatar to appear to be wearing a suit and tie.

In yet another example of an out-of-band communications indicator, the mood of the sender may be so indicated. In such a case, the appearance of the avatar may be changed to reflect the indicated mood. For example, when the sender is sad, the avatar may be modified to reflect the sad state of the sender, such as by animating the avatar to frown or cry. In another example, based on the detected activity of the sender, a frazzled, busy or pressed mood may be detected and the avatar animated to communicate such an emotional state.

After the avatar appearance and/or behavior has been modified to reflect the out-of-band indicator (step 1550), the updated avatar, or an indication that the avatar has been updated, is communicated to the recipient (step 1560). Generally, the updated avatar, or indication that the avatar has been changed, is provided in association with the next instant message sent by the sender; however, this is not necessarily so in every implementation. In some implementations, a change in the avatar may be communicated to the recipient independently of the sending of a communication. Additionally or alternatively, when a buddy list of the instant message user interface includes a display of a sender's avatar, the change of the avatar appearance may be communicated to each buddy list that includes the sender. Thus, the recipient is made able to perceive the updated avatar, the behavior and/or appearance providing an out-of-band communication to the sender.

Figure 16:
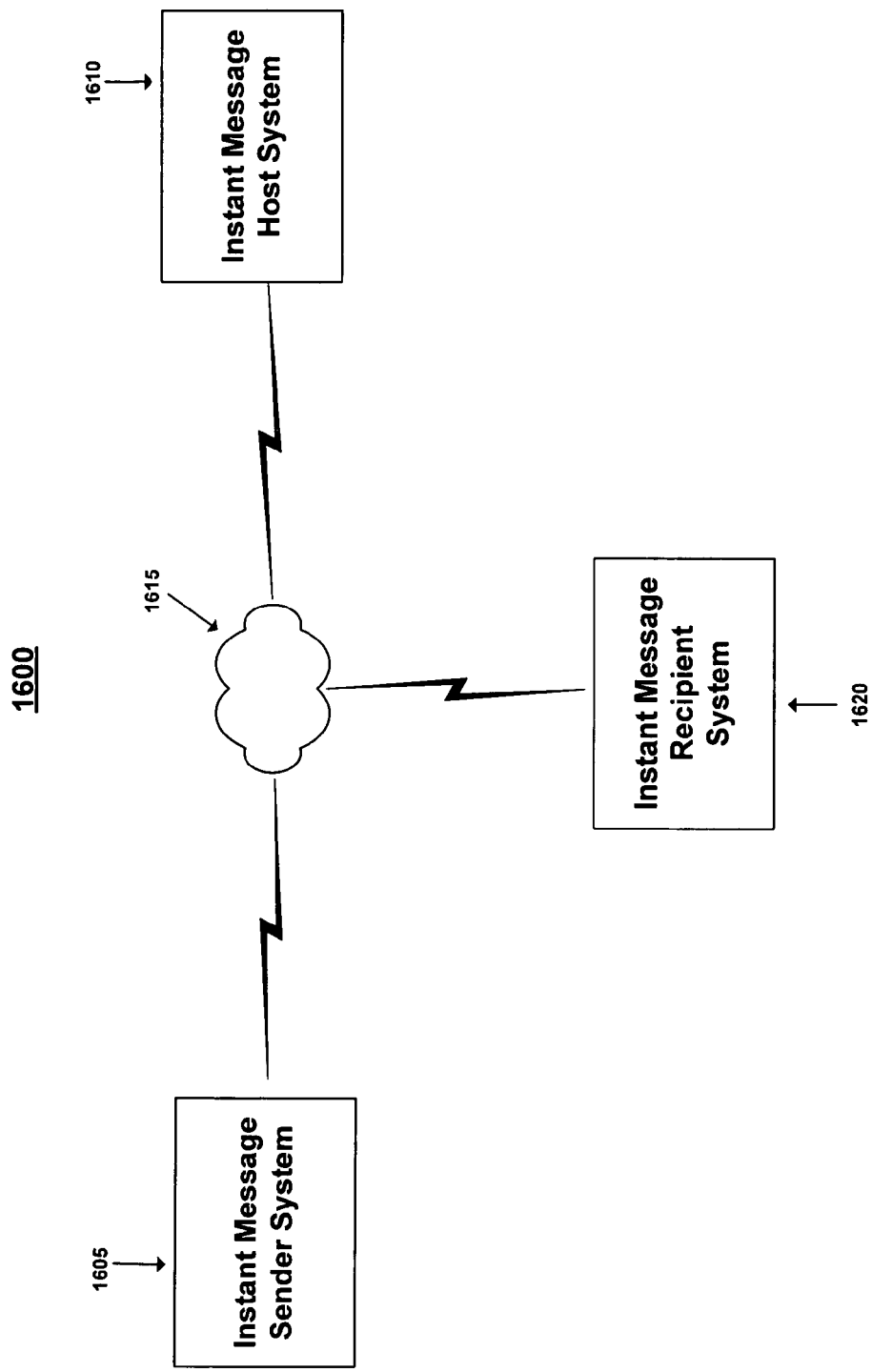
FIGS. 16, 17 and 18 are diagrams of exemplary communications systems capable of enabling an instant message user to project an avatar for self-expression.

FIG. 16 illustrates a communications system 1600 that includes an instant message sender system 1605 capable of communicating with an instant message host system 1610 through a communication link 1615. The communications system 1600 also includes an instant message recipient system 1620 capable of communicating with the instant message host system 1610 through the communication link 1615. Using the communications system 1600, a user of the instant message sender system 1605 is capable of exchanging communications with a user of the instant message recipient system 1620. The communications system 1600 is capable of animating avatars for use in self-expression by an instant message sender.

In one implementation, any of the instant message sender system 1605, the instant message recipient system 1620, or the instant message host system 1610 may include one or more general-purpose computers, one or more special-purpose computers (e.g., devices specifically programmed to communicate with each other), or a combination of one or more general-purpose computers and one or more special-purpose computers. By way of example, the instant message sender system 1605 or the instant message recipient system 1620 may be a personal computer or other type of personal computing device, such as a personal digital assistant or a mobile communications device. In some implementations, the instant message sender system 1605 and/or the instant message recipient 1620 may be a mobile telephone that is capable of receiving instant messages.

The instant message sender system 1605, the instant message recipient system 1620 and the instant message host system 1610 may be arranged to operate within or in concert with one or more other systems, such as, for example, one or more LANs ("Local Area Networks") and/or one or more WANs ("Wide Area Networks"). The communications link 1615 typically includes a delivery network (not shown) that provides direct or indirect communication between the instant message sender system 1605 and the instant message host system 1610, irrespective of physical separation. Examples of a delivery network include the Internet, the World Wide Web, WANs, LANs, analog or digital wired and wireless telephone networks (e.g., Public Switched Telephone Network (PSTN), Integrated Services Digital Network (ISDN), and various implementations of a Digital Subscriber Line (DSL)), radio, television, cable, or satellite systems, and other delivery mechanisms for carrying data. The communications link 1615 may include communication pathways (not shown) that enable communications through the one or more delivery networks described above. Each of the communication pathways may include, for example, a wired, wireless, cable or satellite communication pathway.

The instant message host system 1610 may support instant message services irrespective of an instant message sender's network or Internet access. Thus, the instant message host system 1610 may allow users to send and receive instant messages, regardless of whether they have access to any particular Internet service provider (ISP). The instant message host system 1610 also may support other services, including, for example, an account management service, a directory service, and a chat service. The instant message host system 1610 has an architecture that enables the devices (e.g., servers) within the instant message host system 1610 to communicate with each other. To transfer data, the instant message host system 1610 employs one or more standard or proprietary instant message protocols.

To access the instant message host system 1610 to begin an instant message session in the implementation of FIG. 16, the instant message sender system 1605 establishes a connection to the instant message host system 1610 over the communication link 1615. Once a connection to the instant message host system 1610 has been established, the instant message sender system 1605 may directly or indirectly transmit data to and access content from the instant message host system 1610. By accessing the instant message host system 1610, an instant message sender can use an instant message client application located on the instant message sender system 1605 to view whether particular users are online, view whether users may receive instant messages, exchange instant messages with particular instant message recipients, participate in group chat rooms, trade files such as pictures, invitations or documents, find other instant message recipients with similar interests, get customized information such as news and stock quotes, and search the Web. The instant message recipient system 1620 may be similarly manipulated to establish contemporaneous connection with instant message host system 1610.

Furthermore, the instant message sender may view or perceive an avatar and/or other aspects of an online persona associated with the instant message sender prior to engaging in communications with an instant message recipient. For example, certain aspects of an instant message recipient selected personality, such as an avatar chosen by the instant message recipient, may be perceivable through the buddy list itself prior to engaging in communications. Other aspects of a selected personality chosen by an instant message recipient may be made perceivable upon opening of a communication window by the instant message sender for a particular instant message recipient but prior to initiation of communications. For example, animations of an avatar associated with the instant message sender only may be viewable in a communication window, such as the user interface 100 of FIG. 1.

In one implementation, the instant messages sent between instant message sender system 1605 and instant message recipient system 1620 are routed through the instant message host system 1610. In another implementation, the instant messages sent between instant message sender system 1605 and instant message recipient system 1620 are routed through a third party server (not shown), and, in some cases, are also routed through the instant message host system 1610. In yet another implementation, the instant messages are sent directly between instant message sender system 1605 and instant message recipient system 1620.

The techniques, processes and concepts in this description may be implemented using communications system 1600. One or more of the processes may be implemented in a client/host context, a standalone or offline client context, or a combination thereof. For example, while some functions of one or more of the processes may be performed entirely by the instant message sender system 1605, other functions may be performed by host system 1610, or the collective operation of the instant message sender system 1605 and the host system 1610. By way of example, in process 300, the avatar of an instant message sender may be respectively selected and rendered by the standalone/offline device, and other aspects of the online persona of the instant message sender may be accessed or updated through a remote device in a non-client/host environment such as, for example, a LAN server serving an end user or a mainframe serving a terminal device.

Figure 17:
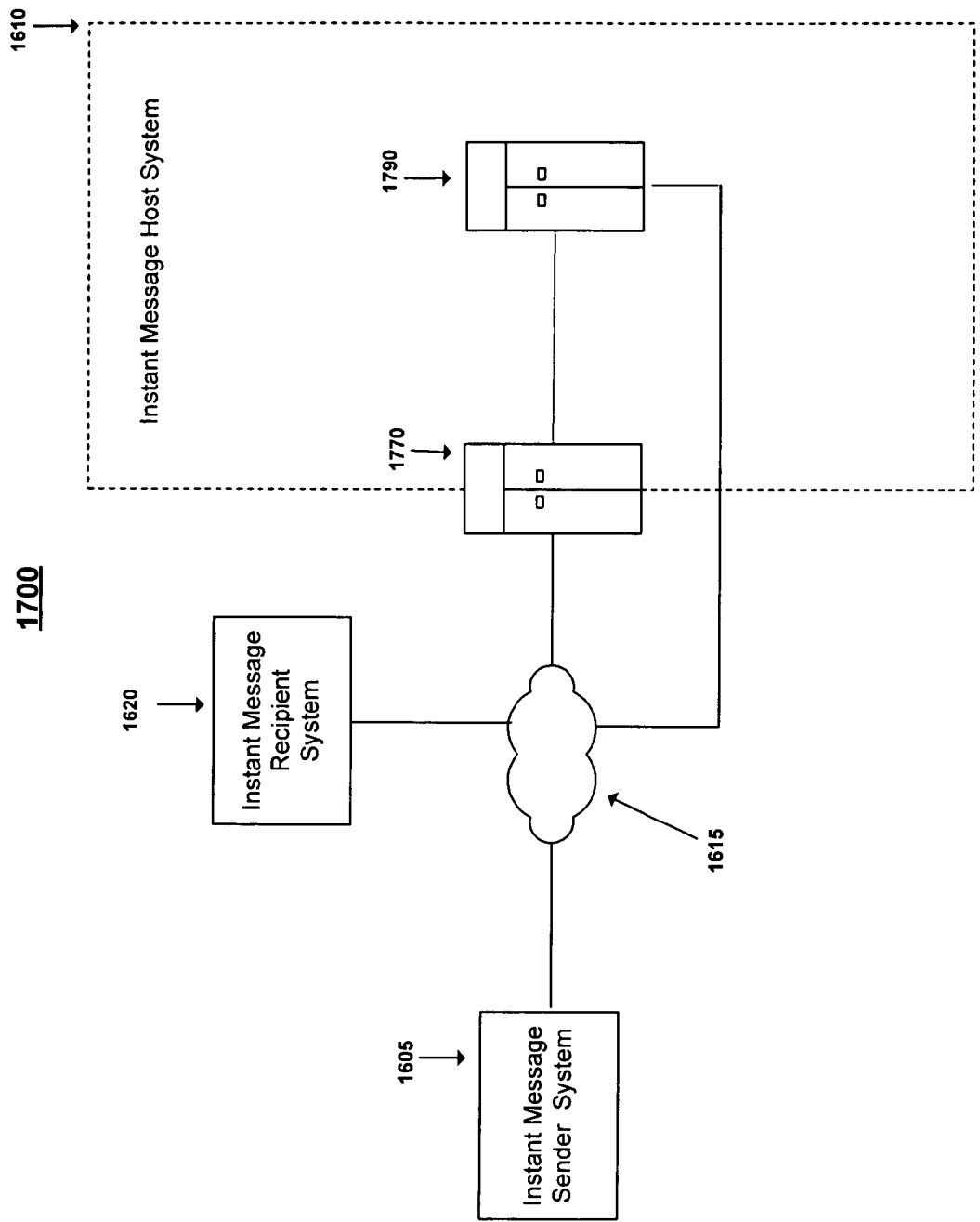

FIG. 17 illustrates a communications system 1700 that includes an instant message sender system 1605, an instant message host system 1610, a communication link 1615, and an instant message recipient 1620. System 1700 illustrates another possible implementation of the communications system 1600 of FIG. 16 that is used for animating avatars used for self-expression by an instant message sender.

In contrast to the depiction of the instant message host system 1610 in FIG. 16, the instant message host system 1610 includes a login server 1770 for enabling access by instant message senders and routing communications between the instant message sender system 1605 and other elements of the instant message host system 1610. The instant message host system 1610 also includes an instant message server 1790. To enable access to and facilitate interactions with the instant message host system 1610, the instant message sender system 1605 and the instant message recipient system 1620 may include communication software, such as for example, an online service provider client application and/or an instant message client application.

In one implementation, the instant message sender system 1605 establishes a connection to the login server 1770 in order to access the instant message host system 1610 and begin an instant message session. The login server 1770 typically determines whether the particular instant message sender is authorized to access the instant message host system 1610 by verifying the instant message sender's identification and password. If the instant message sender is authorized to access the instant message host system 1610, the login server 1770 usually employs a hashing technique on the instant message sender's screen name to identify a particular instant message server 1790 within the instant message host system 1610 for use during the instant message sender's session. The login server 1770 provides the instant message sender (e.g., instant message sender system 1605) with the Internet protocol ("IP") address of the instant message server 1790, gives the instant message sender system 1605 an encrypted key, and breaks the connection. The instant message sender system 1605 then uses the IP address to establish a connection to the particular instant message server 1790 through the communications link 1615, and obtains access to the instant message server 1790 using the encrypted key. Typically, the instant message sender system 1605 will be able to establish an open TCP connection to the instant message server 1790. The instant message recipient system 1620 establishes a connection to the instant message host system 1610 in a similar manner.

In one implementation, the instant message host system 1610 also includes a user profile server (not shown) connected to a database (not shown) for storing large amounts of user profile data. The user profile server may be used to enter, retrieve, edit, manipulate, or otherwise process user profile data. In one implementation, an instant message sender's profile data includes, for example, the instant message sender's screen name, buddy list, identified interests, and geographic location. The instant message sender's profile data may also include self-expression items selected by the instant message sender. The instant message sender may enter, edit and/or delete profile data using an installed instant message client application on the instant message sender system 1705 to interact with the user profile server.

Because the instant message sender's data are stored in the instant message host system 1610, the instant message sender does not have to reenter or update such information in the event that the instant message sender accesses the instant message host system 1610 using a new or different instant message sender system 1605. Accordingly, when an instant message sender accesses the instant message host system 1610, the instant message server can instruct the user profile server to retrieve the instant message sender's profile data from the database and to provide, for example, the instant message sender's self-expression items and buddy list to the instant message server. Alternatively, user profile data may be saved locally on the instant message sender system 1605.

Figure 18:
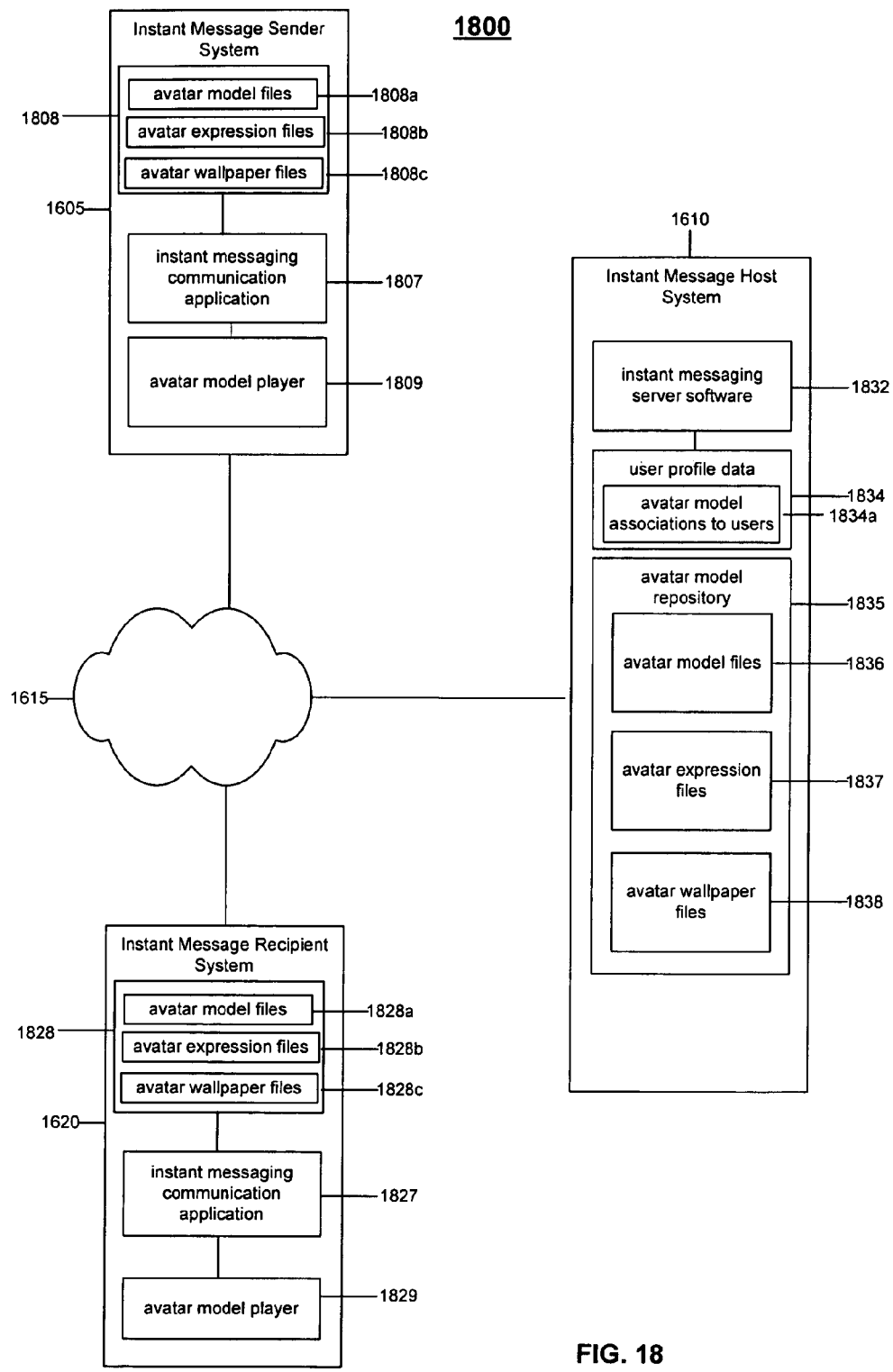

FIG. 18 illustrates another example communications system 1800 capable of exchanging communications between users that project avatars for self-expression. The communications system 1800 includes an instant message sender system 1605, an instant message host system 1610, a communications link 1615 and an instant message recipient system 1620.

The host system 1610 includes instant messaging server software 1832 routing communications between the instant message sender system 1605 and the instant message recipient system 1620. The instant messaging server software 1832 may make use of user profile data 1834. The user profile data 1834 includes indications of self-expression items selected by an instant message sender. The user profile data 1834 also includes associations 1834*a* of avatar models with users (e.g., instant message senders). The user profile data 1834 may be stored, for example, in a database or another type of data collection, such as a series of extensible mark-up language (XML) files. In some implementations, the some portions of the user profile data 1834 may be stored in a database while other portions, such as associations 1834*a* of avatar models with users, may be stored in an XML file.

One implementation of user profile data 1834 appears in the table below. In this example, the user profile data includes a screen name to uniquely identify the user for whom the user profile data applies, a password for signing-on to the instant message service, an avatar associated with the user, and an optional online persona. As shown in Table 1, a user may have multiple online personas, each associated with the same or a different avatar.

TABLE 1

| Screen Name | Password | Avatar | Online Persona |
|---|---|---|---|
| Robert_Appleby | 5846% JYNG | Clam | Work |
| Robert_Appleby | 5846% JYNG | Starfish | Casual |
| Susan_Merit | 6748#474V | Dolphin | |
| Bill_Smith | JHG7868$0 | Starfish | Casual |
| Bill_Smith | JHG7868$0 | Starfish | Family |
| Greg_Jones | 85775$#59 | Frog | |

The host system 1610 also includes an avatar model repository 1835 in which definitions of avatars that may be used in the instant message service are stored. In this implementation, an avatar definition includes an avatar model file, an avatar expression file for storing instructions to control the animation of the avatar, and wallpaper file. Thus, the avatar model repository 1835 includes avatar model files 1836, avatar expression files 1837 and avatar wallpaper files 1838.

The avatar model files 1836 define the appearance and animations of each of the avatars included in the avatar model repository 1835. Each of the avatar model files 1836 defines the mesh, texture, lighting, sounds, and animations used to render an avatar. The mesh of a model file defines the form of the avatar, and the texture defines the image that covers the mesh. The mesh may be represented as a wire structure composed of a multitude of polygons that may be geometrically transformed to enable the display of an avatar to give the illusion of motion. In one implementation, lighting information of an avatar model file is in the form of a light map that portrays the effect of a light source on the avatar. The avatar model file also includes multiple animation identifiers. Each animation identifier identifies a particular animation that may be played for the avatar. For example, each animation identifier may identify one or more morph targets to describe display changes to transform the mesh of an avatar and display changes in the camera perspective used to display the avatar.

When an instant message user projects an avatar self-expression, it may be desirable to define an avatar with multiple animations, including facial animations, to provide more types of animations usable by the user for self-expression. Additionally, it may be desirable for facial animations to use a larger number of blend shapes, which may result in an avatar that, when rendered, may appears more expressive. A blend shape defines a portion of the avatar that may be animated and, in general, the more blend shapes that are defined for an animation model, the more expressive the image rendered from the animation model may appear.

Various data management techniques may be used to implement the avatar model files. In some implementations, information to define an avatar may be stored in multiple avatar files that may be arranged in a hierarchical structure, such as a directory structure. In such a case, the association between a user and an avatar may be made through an association of the user with the root file in a directory of model files for the avatar.

In one implementation, an avatar model file may include all possible appearances of an avatar, including different features and props that are available for user-customization. In such a case, user preferences for the appearance of the user's avatar include indications of which portions of the avatar model are to be displayed, and flags or other indications for each optional appearance feature or prop may be set to indicate whether the feature or prop is to be displayed. By way of example, an avatar model may be configured to display sunglasses, reading glasses, short hair and long hair. When a user configures the avatar to wear sunglasses and have long hair, the sunglasses feature and long hair features are turned on, the reading glasses and short hair features are turned off, and subsequent renderings of the avatar display the avatar having long hair and sunglasses.

The avatar model repository 1835 also includes avatar expression files 1837. Each of the avatar expression files 1837 defines triggers that cause animations in the avatars. For example, each of the avatar expression files 1837 may define the text triggers that cause an of animation when the text trigger is identified in an instant message, as previously described with respect to FIGS. 3 and 4. An avatar expression file also may store associations between out-of-band communication indicators and animations that are played when a particular out-of-band communication indicator is detected. One example of a portion of an avatar expression file is depicted in Table 2 below.

TABLE 2

| ANIMATION TYPE | TRIGGERS | OUT-OF-BAND COMMUNICATION INDICATORS |
|---|---|---|
| SMILE | :) :-) Nice | |
| GONE AWAY | bye brb cu gtg cul bbl gg b4n ttyl ttfn | Instruction to shut down computer |
| SLEEP | zzz tired sleepy snooze | Time is between 1 a.m. and 5 a.m. |
| WINTER CLOTHES | | Date is between November 1 and March 1 |
| RAIN | | Weather is rain |
| SNOW | | Weather is snow |

In some implementations, the association between a particular animation for a particular animation identifier is indirectly determined for a particular trigger or out-of-band communication indicator. For example, a particular trigger or out-of-band communication indicator may be associated with a type of animation (such as a smile, gone away, or sleep), as illustrated in Table 2. A type of animation also may be associated with a particular animation identifier included in a particular avatar model file, as illustrated in Table 3 below. In such a case, to play an animation based on a particular trigger or out-of-band communication indicator, the type of animation is identified, the animation identifier associated with the identified type of animation is determined, and the animation identified by the animation identifier is played. Other computer animation and programming techniques also may be used. For example, each avatar may use the same animation identifier for a particular animation type rather than including the avatar name shown in the table. Alternatively or additionally, the association of animation types and animation identifiers may be stored separately for each avatar.

TABLE 3

| ANIMATION TYPE | ANIMATION IDENTIFIER | AVATAR NAME |
|---|---|---|
| SMILE | 1304505 | DOLPHIN |
| SMILE | 5858483 | FROG |
| GONE AWAY | 4848484 | DOLPHIN |

The avatar expression files 1837 also include information to define the way that an avatar responds to an animation of another avatar. In one implementation, an avatar expression file includes pairs of animation identifiers. One of the animation identifiers in each pair identifies a type of animation that, when the type of animation is played for one avatar, triggers an animation that is identified by the other animation identifier in the pair in another avatar. In this manner, the avatar expression file may define an animation played for an instant message recipient's avatar in response to an animation played by an instant message sender's avatar. In some implementations, the avatar expression files 1837 may include XML files having elements for defining the text triggers for each of the animations of the corresponding avatar and elements for defining the animations that are played in response to animations seen from other avatars.

The avatar model repository 1835 also includes avatar wallpaper files 1838 that define the wallpaper over which an avatar is drawn. The wallpaper may be defined using the same or different type of file structure as the avatar model files. For example, an avatar model file may be defined as an animation model file that is generated and playable using animation software from Viewpoint Corporation of New York, N.Y., whereas the wallpaper files may be in the form of a Macromedia Flash file that is generated and playable using animation software available from Macromedia, Inc. of San Francisco, Calif. When wallpaper includes animated objects that are triggered by an instant message, an out-of-band communication indicator or an animation of an avatar, the avatar wallpaper files 1838 also may include one or more triggers that are associated with the wallpaper animation.

Each of the instant message sender system 1605 and the instant message recipient system 1620 includes an instant messaging communication application 1807 or 1827 that capable of exchanging instant messages over the communications link 1615 with the instant message host system 1610. The instant messaging communication application 1807 or 1827 also may be referred to as an instant messaging client.

Each of the instant message sender system 1605 and the instant message recipient system 1620 also includes avatar data 1808 or 1828. The avatar data 1808 or 1828 include avatar model files 1808a or 1828a, avatar expression files 1808b or 1828b, and avatar wallpaper files 1808c or 1828c for the avatars that are capable of being rendered by the instant message sender system 1605 or the instant message recipient system 1620, respectively. The avatar data 1808 or 1828 may be stored in persistent storage, transient storage, or stored using a combination of persistent and transient storage. When all or some of the avatar data 1808 or 1828 is stored in persistent storage, it may be useful to associate a predetermined date on which some or all of the avatar data 1808 or 1828 is to be deleted from the instant message sender system 1605 or the instant message recipient system 1620, respectively. In this manner, avatar data may be removed from the instant message sender system 1605 or the instant message recipient system 1620 after the data has resided on the instant message sender system 1605 or 1620 for a predetermined period of time and presumably is no longer needed. This may help reduce the amount of storage space used for instant messaging on the instant message sender system 1605 or the instant message recipient system 1620.

In one implementation, the avatar data 1808 or 1828 is installed on the instant message sender system 1605 or the instant message recipient system 1620, respectively, with the instant messaging client software installed on the instant message sender system 1605 or the instant message recipient system 1620. In another implementation, the avatar data 1808 or 1828 is transmitted to the instant message sender system 1605 or the instant message recipient system 1620, respectively, from the avatar model repository 1835 of the instant messaging host system 1610. In yet another implementation, the avatar data 1808 or 1828 is copied from a source unrelated to instant messaging and stored for use as instant messaging avatars on the instant message sender system 1605 or the instant message recipient system 1620, respectively. In yet another implementation, the avatar data 1808 or 1828 is sent to the instant message sender system 1605 or the instant message recipient system 1620, respectively, with or incident to instant messages sent to the instant message sender system 1605 or the instant message recipient system 1620. The avatar data sent with an instant message corresponds to the instant message sender that sent the message.

The avatar expression files 1808*b* or 1828*b* are used to determine when an avatar is to be rendered on the instant message sender system 1605 or the instant message recipient 1620, respectively. To render an avatar, one of the avatar model files 1808*a* is displayed on the two-dimensional display of the instant messaging system 1605 or 1620 by an avatar model player 1809 or 1829, respectively. In one implementation, the avatar model player 1808 or 1829 is an animation player by Viewpoint Corporation. More particularly, the processor of the instant messaging system 1605 or 1620 calls the avatar model player 1809 or 1829 and identifies an animation included in one of the avatar model files 1808*a* or 1828*a*. In general, the animation is identified by an animation identifier in the avatar model file. The avatar model player 1809 or 1829 then accesses the avatar model file and plays the identified animation.

In many cases multiple animations may be played based on a single trigger or out-of-band communications indicator. This may occur, for example, when one avatar reacts to an animation of another avatar that is animated based on a text trigger, as described previously with respect to FIG. 6.

In the system 1800, four animations may be separately initiated based on a text trigger in one instant message. An instant message sender projecting a self-expressive avatar uses instant message sender system 1605 to sends a text message to an instant message recipient using instant message recipient system 1620. The instant message recipient also is projecting a self-expressive avatar. The display of the instant message sender system 1605 shows an instant message user interface, such as user interface 100 of FIG. 1, as does the display of instant message recipient system 1620. Thus, the sender avatar is shown on both the instant message sender system 1605 and the instant message recipient system 1620, as is the recipient avatar. The instant message sent from instant message sender system includes a text trigger that causes the animation of the sender avatar on the instant message sender system 1605 and the sender avatar on the instant message recipient system 1620. In response to the animation of the sender avatar, the recipient avatar is animated, as described previously with respect to FIG. 6. The reactive animation of the recipient avatar occurs in both the recipient avatar displayed on the instant message sender system 1605 and the recipient avatar displayed on the instant message recipient system 1620.

In some implementations, an instant messaging user is permitted to customize one or more of the animation triggers or out-of-band communications indicators for avatar animations, wallpaper displayed for an avatar, triggers or out-of-band communications indicators for animating objects of the wallpaper, and the appearance of the avatar. In one implementation, a copy of an avatar model file, an expression file or a wallpaper file is made and the modifications of the user are stored in the copy of the avatar model file, an expression file or a wallpaper file. The copy that includes the modification is then associated with the user. Alternatively or additionally, only the changes—that is, the differences between the avatar before the modifications and the avatar after the modifications are made—are stored. In some implementations, different versions of the same avatar may be stored and associated with a user. This may enable a user to modify an avatar, use the modified avatar for a period of time, and then return to using a previous version of the avatar that does not include the modification.

In some implementations, the avatars from which a user may choose may be limited by the instant message service provider. This may be referred to as a closed implementation or a locked-down implementation. In such an implementation, the animations and triggers associated with each avatar within the closed set of avatars may be preconfigured. In some closed implementations, the user may customize the animations and/or triggers of a chosen avatar. For example, a user may include a favorite video clip as an animation of an avatar, and the avatar may be configured to play the video clip after certain text triggers appear in the messages sent by the user. In other closed implementations, the user is also prevented from adding animations to an avatar.

In some implementations, the set of avatars from which a user may choose is not limited by the instant message service provider, and the user may use an avatar other than an avatar provided by the instant message service provider. This may be referred to as an open implementation or an unlocked implementation. For example, an avatar usable in an instant message service may be created by a user using animation software provided by the instant message service provider, off-the-shelf computer animation software, or software tools provided by a third-party that are specialized for the creating avatars compatible with one or more instant message services.

In some implementations, a combination of a closed-implementation and an open-implementation may be used. For example, an instant message service provider may limit the selection by users who are minors to a set of predetermined avatars provided by the instant message service provider while permitting users who are adults to use an avatar other than an avatar available from the instant message service provider.

In some implementations, the avatars from which a user may select may be limited based on a user characteristic, such as age. As illustrated in Table 4 below and using the avatars shown in FIG. 8 only as an example, a user who is under the age of 10 may be limited to one group of avatars. A user who is between 10 and 18 may be limited to a different group of avatars, some of which are the same as the avatars selectable by users under the age of 10. A user who is 18 or older may select from any avatar available from the instant message provider service.

TABLE 4

| USER AGE | AVATAR NAMES |
| --- | --- |
| Less than age 10 | Sheep, Cow, Dolphin, Happy, Starfish, Dragon, Polly |
| Age 10 to 18 | Sheep, Cow, Dolphin, Happy, Starfish, Dragon, Polly, Robot, Frog, T-Rex, Parrot, Boxing Glove, Snake, Monster, Parrot |
| Age 18 or older | Sheep, Cow, Dolphin, Happy, Starfish, Dragon, Polly, Robot, Frog, T-Rex, Parrot, Boxing Glove, Snake, Monster, Parrot, Lips, Pirate Skull |

Figure 19:
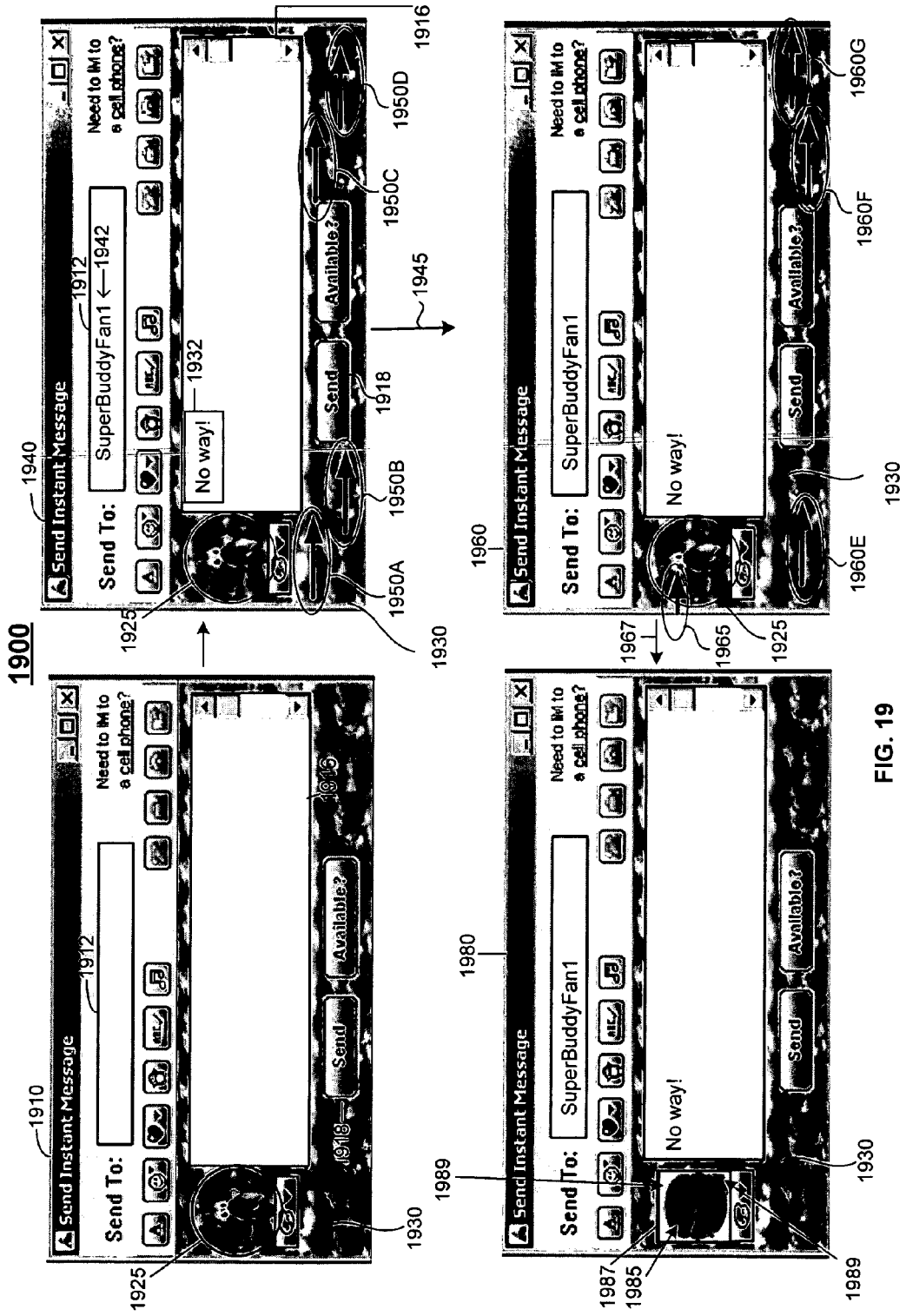
FIGS. 19-21B are diagrams of user interfaces for an instant messaging service capable of enabling a user to project a customized or personalized animated avatar and animated wallpaper for self-expression.

FIG. 19 shows a series 1900 of exemplary user interfaces 1910, 1940, 1960 and 1980 that illustrate wallpaper object animations that are performed in response a wallpaper trigger related to content of an instant message. This is in contrast to a wallpaper object animation that occurs in response detection of an out-of-band condition or information, as described more fully later. Content of an instant message may include a topic communicated by, or discussed within, an instant message. Content of an instant message also may include the subject matter of an instant message. Content of an instant message also may include text, or portion thereof, communicated in the instant message.

The series 1900 includes an exemplary interface 1910 for sending messages to an instant message recipient. The interface 1910 may be viewed by a user who is an instant message sender and whose instant messaging communications program is configured to project an avatar associated with and used as an identifier for the user to an instant message recipient. The interface 1910 also may be referred to as the sender portion of an instant message interface, such as sender portion 130 of the interface 100 described previously with respect to FIG. 1.

More particularly, the interface 1910 includes a recipient indicator 1912 that indicates a screen name of a recipient of the instant messages sent with the interface 1910. The screen name (or other type of identity identifier or user identifier) of the potential recipient may be identified by selecting a screen name from a buddy list, such as buddy list 175 of FIG. 1, or may be entered by the user directly in the recipient indicator 1912. As illustrated, an instant message recipient screen name has not yet been identified in the recipient indicator 1912.

A message compose text box 1916 enables text to be entered for a message and displays the text of a message to be sent from the sender to a recipient identified in the recipient indicator 1912. Once specified in the message compose text box 1916, the message may be sent by activating a send button 1918. In some implementations, the interface 1910 may include a message transcript text box (not shown) that displays the text of messages sent between the sender and/or a recipient portion (also not shown) that identifies the recipient, such as, for example, the recipient portion 110 of the instant message interface 105 of FIG. 1.

Wallpaper is applied to some or all of the window portion 1930 that is outside of the message compose area 1916. A sender avatar 1925 is displayed over, or in place of, wallpaper applied to some or all of the window portion 1930. In this example, the wallpaper appears to cover the window portion 1930 that is outside of the message compose area 1916 and appears as a background relative to the sender avatar 1925. The wallpaper defines a visually perceivable background for the sender avatar 1925. As shown, the wallpaper 1930 displays a non-uniform pattern (i.e., clouds and sky), though this need not be the case. The window portion 1930 may be referred to as chrome.

The interface 1940 includes a recipient indicator 1912 that indicates a screen name 1942 (i.e., "SuperBuddyFan1") of a recipient of an instant message sent with the interface 1940. The message compose text box 1916 includes text 1932 (i.e., "No way!") entered for a message to be sent to the indicated recipient when a send button 1918 is activated. The interfaces 1940, 1960 and 1980 show animation of wallpaper objects in response to sending the text 1932 in the instant message. In particular, the interface 1940 is transformed to interface 1960 (as shown by arrow 1945), which, in some implementations, is further transformed to interface 1980 (as shown by arrow 1967).

More particularly, after the send button 1918 is activated to send the text 1932 in an instant message to the screen name 1942, wallpaper objects 1950A-1950D resembling arrows are applied to some of the wallpaper that is presented as background relative to the avatar and relative to the wallpaper objects 1950A-1950D. In some implementations, all or some of the objects 1950A-1950D are hidden in the interface 1910 and are made perceivable during the animation shown in the interface 1940. Alternatively or additionally, all or some of the objects 1950A-1950D are not present in a hidden form in the interface 1910 and are added to the portion of the window 1930 in the interface 1940.

In the transformation to the interface 1960, the wallpaper objects 1950A-1950D are removed from user perception and wallpaper objects 1960E-1960G are made perceivable. The wallpaper objects 1960E-1960G, like the wallpaper objects 1950A-1950D, represent arrows. To accomplish the transformation from the interface 1940 to the interface 1960, the wallpaper objects 1950A-1950D may be deleted from the display or hidden, and the wallpaper objects 1960E-1960G may be added or unhidden. The transformation from the interface 1940 to the interface 1960 illustrates animation of arrows to portray arrows flying by the turkey avatar 1925.

The wallpaper objects 1960E-1960G have the appearance (i.e., same color and shape) as the wallpaper objects 1950A-1950D and represent the same arrows as the objects 1950A-1950D. The position of the objects 1960E-1960G on the window portion 1930 of interface 1960, however, is different than the position of the objects 1950A-1950D on the window portion 1930 of the interface 1940. This helps to portray that the arrows are flying across the clouds-and-sky background of the wallpaper applied to the window portion 1930.

In this example, the text 1932 of the instant message triggers the animation of the wallpaper objects 1950A-1960G. In the transformation from interface 1940 to interface 1960, the turkey avatar 1925 does not change appearance or behavior—that is, the turkey avatar is not animated.

In these or other implementations, wallpaper objects adjacent to the avatar may be animated in lieu of, or in addition to, wallpaper objects that are animated in the lower region of window portion 1930, as illustrated in interface 1940. As shown wallpaper object 1965 represents an arrow that is adjacent to the turkey avatar 1925. In these or still other implementations, wallpaper object animations may appear to interact with an avatar, as illustrated by the transformation from interface 1960 to interface 1980. The transformation illustrates that periodically one flying arrow may appear to shoot the turkey avatar, which then transforms into a turkey burger. In some implementations, the turkey avatar may be replaced so as to appear to be transformed into a roasted turkey on a dinner plate.

In particular, the interface 1960 also includes the wallpaper object 1960A that represents an arrow striking the turkey avatar 1925. In the transformation to the interface 1980, a wallpaper object 1985 representing a turkey burger is displayed over, or in place of, the turkey avatar 1925. A boundary 1987 (here, a box) is displayed around the wallpaper object 1985, and a different wallpaper is presented as background to the wallpaper object 1985 (i.e., inside the boundary 1987) than the wallpaper applied as background to the rest of the window portion 1930. This need not necessarily be the case. For example, a wallpaper object without a boundary may be displayed over, or in place of, the turkey avatar 1925 and the wallpaper background of clouds and sky may be visible as background to the wallpaper object.

In these or other implementations, sound effects may be played in addition to, or in lieu of, ambient animations independently of instant message communications.

Figure 20:
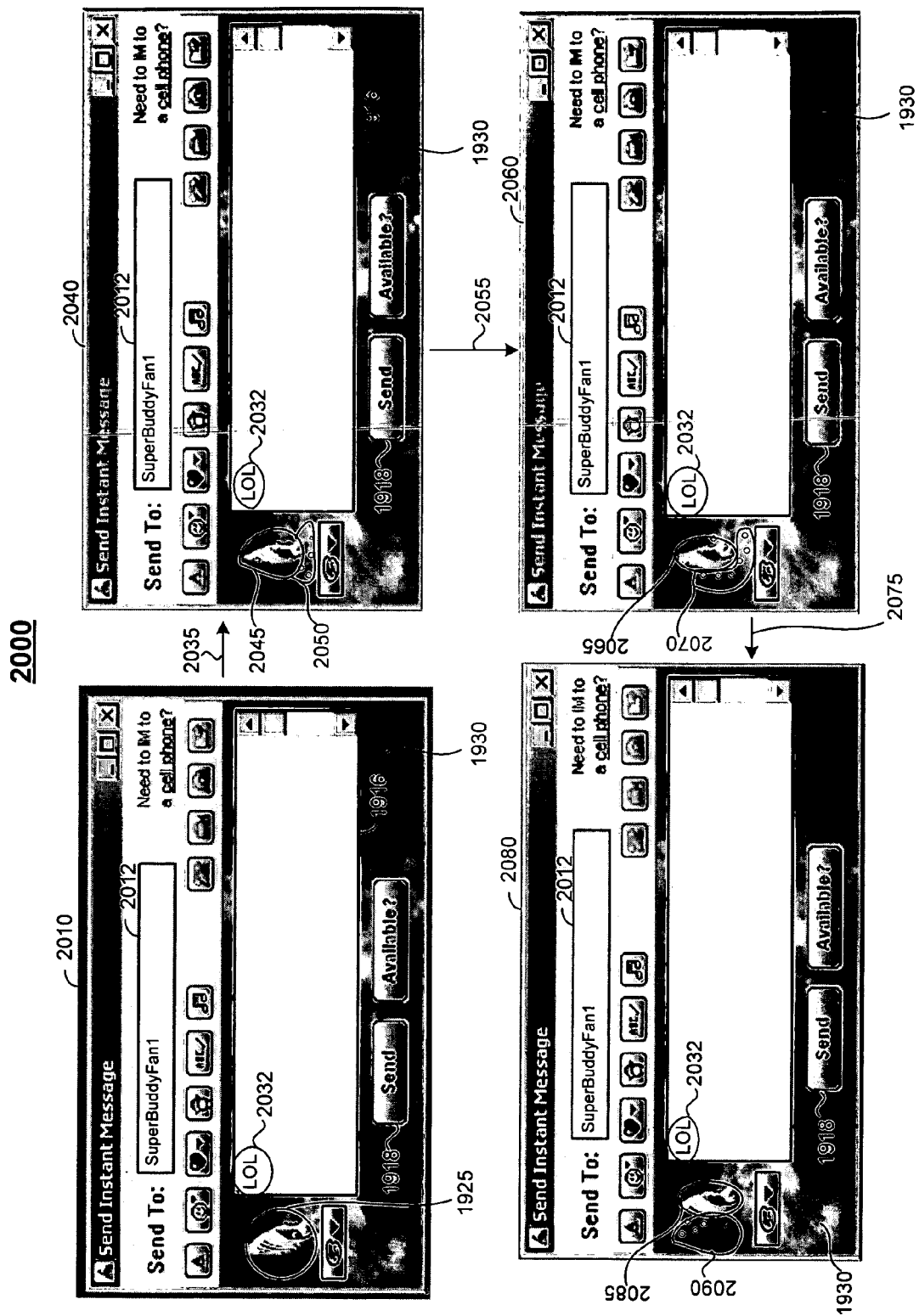

FIG. 20 shows a series 2000 of exemplary user interfaces 2010, 2040, 2060 and 2080 that illustrate avatar and wallpaper object animations that are performed in response to the same text trigger in an message sent using the interface 2010. In this manner, the avatar and wallpaper objects may appear to interact. For brevity, the structure and arrangement of FIG. 20 is based on the structure and arrangement of the interface 1910 of FIG. 19. As would be recognized by one skilled in the art, however, the interfaces of FIG. 20 need not be the same as those described with respect to FIG. 19, nor are the techniques described with respect to FIG. 20 limited to being performed by the structure and arrangement illustrated by the interfaces in FIG. 20.

More particularly, the interface 2010 includes a recipient indicator 2012 that indicates a screen name (i.e., "SuperBuddyFan1") of a recipient of the instant message sent with the interface 2010. The message compose text box 1916 includes text 2032 (i.e., "LOL" that is an abbreviation for laughing out loud) entered for a message and sent to the indicated recipient when a send button 1918 is selected. The interfaces 2010, 2040, 2060 and 2080 show the animation of the sender avatar 1925 and wallpaper objects in response to sending the text 2032 in the instant message. In particular, the interface 2010 is transformed to interface 2040 (as shown by arrow 2035), which, in turn, is transformed to interface 2060 (as shown by arrow 2055), which, in turn, is transformed into interface 2080, as shown by arrow 2075. In general, the interfaces 2010, 2040, 2060 and 2080 show the animation of a fish avatar to portray that the fish is tickled by bubbles on the wallpaper.

More particularly, when the interface 2040 is displayed, objects 2050 representing bubbles are added to the wallpaper, and the avatar 1925 is transformed to the avatar 2045 to give the appearance that the fish avatar is moving slightly, e.g., wiggling, in response to objects 2050 that are perceivable on the wallpaper. In the transformation to the interface 2060, the objects 2050 are replaced with objects 2070 which also represent bubbles and the avatar 2045 is transformed to the avatar 2065 to give the appearance that the bubbles are floating upward in the water and the fish avatar is moving slightly, e.g., wiggling, in response to bubbles. Similarly, in the transformation to the interface 2080, the objects 2070 are replaced with objects 2090 that also represent bubbles, and the avatar 2065 is replaced with avatar 2090. As such, the interface 2080 continues the animation that the fish avatar is being tickled by bubbles on the wallpaper.

As illustrated in FIG. 20, both the wallpaper and the avatar are animated in response to the same text trigger (i.e., "LOL" text 2032) in an instant message sent with the instant message interface 2010. By using a trigger to animate both objects (i.e., bubbles) on the wallpaper and an avatar (i.e. fish), the objects on the wallpaper may appear to interact with the avatar and/or the wallpaper objects may appear to interact with the avatar in an instant messaging application. In particular, the bubbles 2050, 2070 and 2090 displayed on the wallpaper in the window portion 1930 appear to interact with (e.g., tickle) the fish avatar.

In another example, a wallpaper trigger (such as text in an instant message) may control the wallpaper (rather than only a portion of the wallpaper or objects that appear on the wallpaper). For example, in response to a text trigger "sad" sent in an instant message, the color of the wallpaper may change so as to make the wallpaper appear to dim, whereas a text trigger of "happy" may cause the wallpaper to appear to brighten or light up.

In some implementations, a sound effect may be used in addition to, or in lieu of, the animated wallpaper to give the appearance that the avatar reacts to, or causes, the sound effect. In one example, an avatar of an instant message sender is a dinosaur and the wallpaper depicts a jungle of trees. In response to sending the text trigger of "Hey" in an instant message, the dinosaur avatar appears to yell (e.g., a sound effect of a dinosaur roaring is played) and leaves on the trees depicted on the wallpaper appear to vibrate. This creates the appearance that the leaves on the tree are vibrating in response to the dinosaur's yell.

Figure 21A:
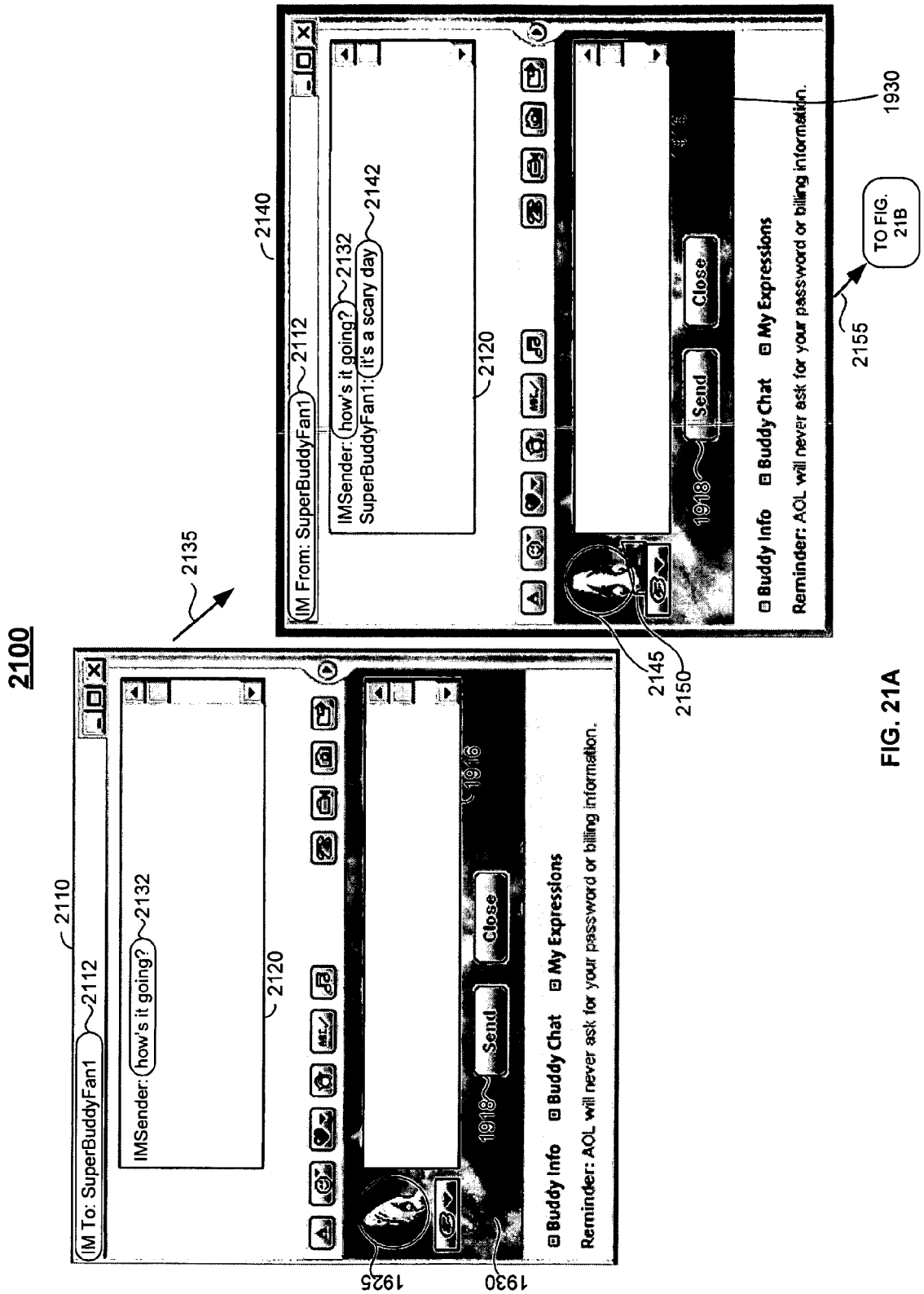
Figure 21B:
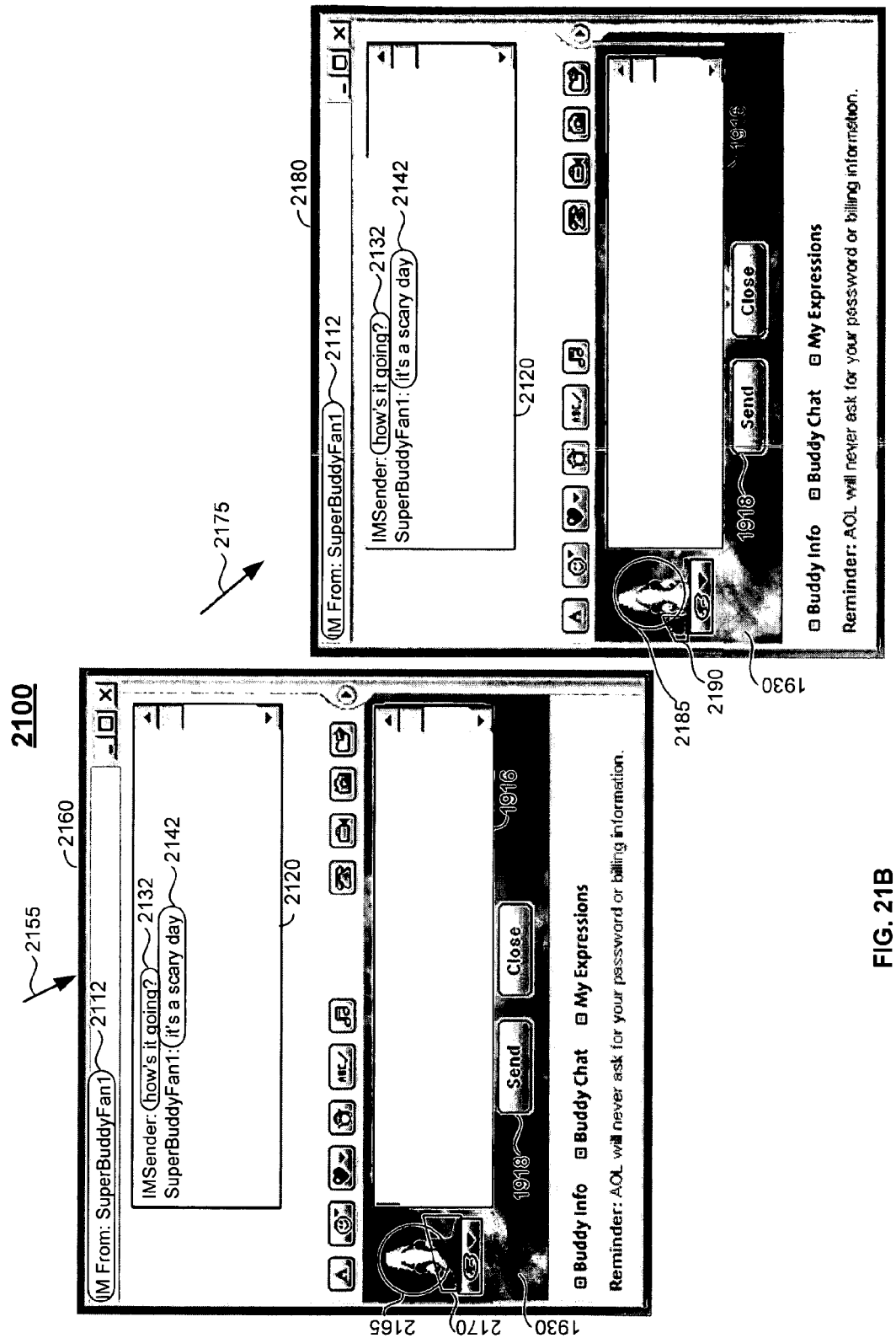

FIGS. 21A and 21B illustrate a series 2100 of interfaces 2110, 2140, 2160 and 2180 that shows aspects of animation of wallpaper objects and an avatar in response to a received text message. The series 2100 includes an exemplary interface 2110, that may be an implementation of interface 1910 of FIG. 19, for sending messages to an instant message recipient. The interface 2110 includes a recipient indicator 2112 that indicates a screen name of a recipient (i.e., "SuperBuddyFan1") of the instant messages sent with the interface 2010. The interface includes a message compose text box 1916 that enables text to be entered for a message and sent by activating a send button 1918. The interface 2110 also includes a message transcript text box 2120 that displays the text of messages sent between the sender. As illustrated, text 2132 (i.e., "how's it going?") appears in the message transcript text box 2120 to represent text that has been sent to the recipient identified in the recipient indicator 2112 and text 2142 (i.e., "it's a scary day") to represent text that has been sent in a message from the recipient to the sender. The interface 2110 includes a sender avatar 1925 chosen by the instant message sender and displayed over, or in place of, wallpaper applied to the window portion 1930.

The interfaces 2140, 2160 and 2180 illustrate aspects of an animation that is played based on a text trigger received in a instant message received by the sender. In general, in response to the text trigger "scary" in the instant message received by the sender, the fish avatar of the sender appears to watch a shark swim by on the wallpaper.

More particularly, the interface 2140 is displayed in response to a received text message 2142 displayed in the message transcript text box 2120. The transformation of the interface 2110 to the interface 2140 is shown by arrow 2135. The interface 2140 includes an avatar 2145 representing the fish avatar associated with the sender. The interface 2140 also includes an object 2150 representing a shark fin that is displayed over, or in place of, wallpaper on the window portion 1930. The object 2150 is not visible on the interface 2110.

Referring also to FIG. 21B, the interface 2160 is displayed as the animation continues, as shown by arrow 2155. The interface 2160 includes an avatar 2165 representing the fish avatar associated with the sender. The interface 2160 also includes an object 2170 that replaces 2150 of FIG. 21A that also represents a shark fin, to continue the animation that the fish avatar is watching a shark swim by on the wallpaper. The object 2170 has a similar appearance (i.e., similar color and shape) as the object 2150 and represents the same shark as the object 2150. The position of the object 2170 on the window portion 1930, however, is different than the position of the object 2150 of the interface 2140. The object 2150 is not visible on the interface 2160. This helps to portray that the shark is swimming across the wallpaper applied to the window portion 1930.

The interface 2180 is displayed as the animation continues, as shown by arrow 2175. The interface 2180 includes an avatar 2185 representing the fish avatar associated with the sender. The interface 2180 also includes an object 2190 that replaces 2150 of FIG. 21A that also represents a shark fin, to continue the animation that the fish avatar is watching a shark swim by on the wallpaper. The object 2190 has a similar appearance (i.e., similar color and shape) as the object 2190 and represents the same shark as the objects 2150 and 2170. The position of the object 2190 on the window portion 1930, however, is different than the position of the objects 2150 and 2170. The objects 2150 and 2170 are not visible on the interface 2180. This helps to portray that the shark is swimming across the wallpaper applied to the window portion 1930.

The series 2100 depict an example of an object (i.e., the objects 2150 and 2170 representing a shark) on wallpaper to appear to be animated in response to a received text message.

In some implementations, the eyes of the fish avatar 2145, 2165 and 2185 may be animated to track the movement of the shark object 2150, 2170 and 2190 to give the appearance that the fish avatar is watching the shark swim by the fish avatar. In such a case, the animation of the avatar and animation the wallpaper object give the appearance that the fish avatar is interacting with the shark object.

In some implementations, an avatar and/or wallpaper may be animated based on a parameter of a received instant message. For example, the shark animation described above may be displayed in response to the receipt of an instant message in which a parameter of the instant message indicates that all of, or a portion of, the text the message is to be displayed using red text. More particularly, an instant message may be received where the text "Aren't you ready yet?" is to be displayed in red and using a bold font. Upon receipt of such a message, the shark animation described above may be displayed.

In some implementations, wallpaper object animations and avatar animations may be coordinated such that the avatar and wallpaper appear to interact.

Figure 22:
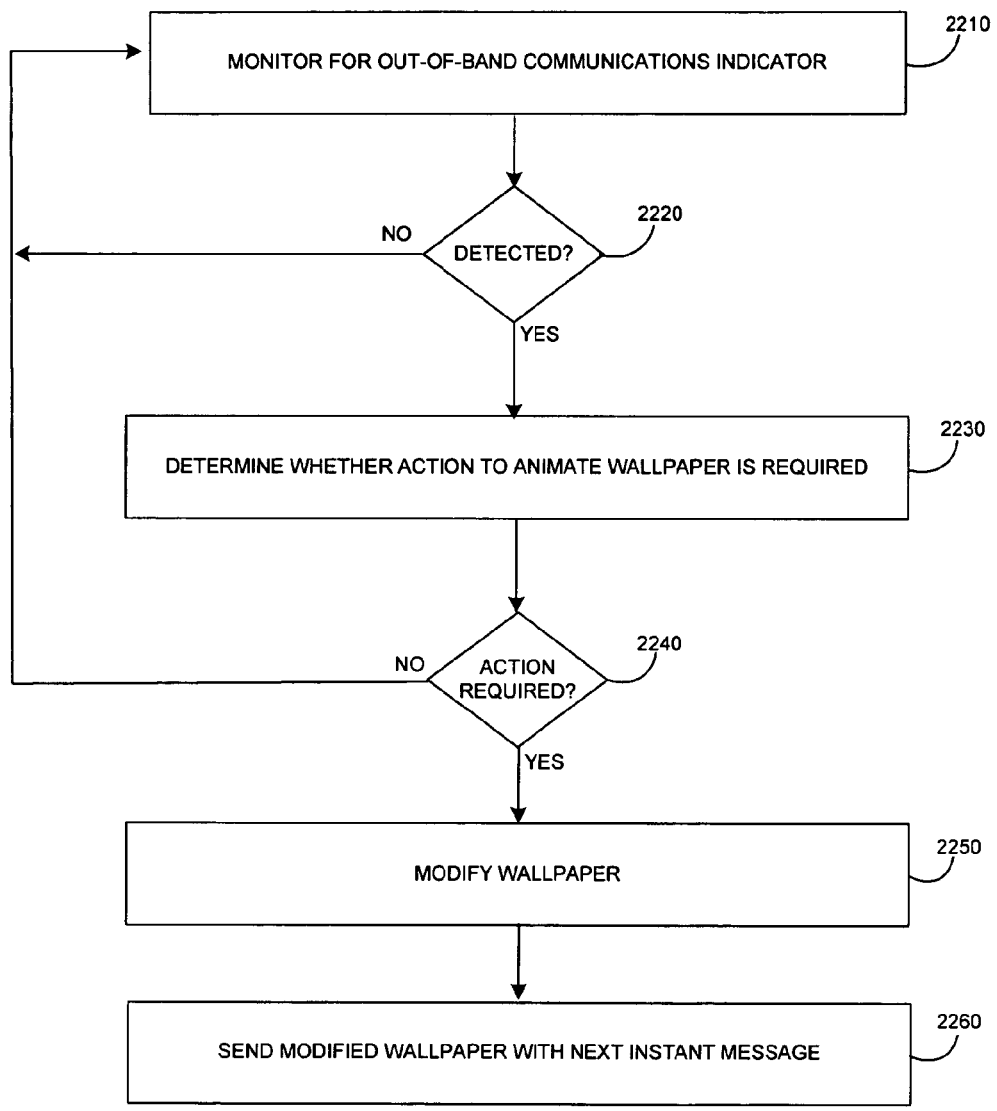
FIG. 22 is a flow chart of a process for animating an avatar and wallpaper in response to a detected state of instant messaging activity or inactivity.

FIG. 22 illustrates an example process 2200 for animating wallpaper to communicate out-of-band information to an instant message recipient. The process may be performed by an instant messaging system, such as communications systems 1600, 1700, and 1800 described with respect to FIGS. 16, 17, and 18, respectively. Out-of-band information may also be referred to as an out-of-band message, which refers to sending a message that communicates context out-of-band— that is, conveying information independent of information conveyed directly through the text of the instant message itself sent to the recipient. Thus, the recipient views the wallpaper animations to receive information that is not directly or explicitly conveyed in the instant message itself. By way of example, an out-of-band communication may include information about the sender's setting, environment, activity or mood, which is not communicated and part of a text message exchanged by a sender and a recipient.

The process 2200 begins with the instant messaging system monitoring the communications environment and sender's environment for an out-of-band communications indicator (step 2210). The indicator may be an indicator of the sender's setting, environment, activity, or mood that is not expressly conveyed in instant messages sent by the sender. For example, the out-of-band indicator may be an indication of time and date of the sender's location, which may be obtained from a clock application associated with the instant messaging system or with the sender's computer. The indicator may be an indication of the sender's physical location. The indicator may be an indication of an indication of weather conditions of the sender's location, which may be obtained from a weather reporting service, such as a web site that provides weather information for geographic locations.

In addition, the indicator may indicate the activities of the sender that take place at, or near, the time when an instant message is sent, as described previously with respect to FIG. 15.

The indicator of the sender's mood may come from one or more devices that are operable to determine the sender's mood and send an indication of mood to the sender's computer, as described previously with respect to FIG. 15. For example, the sender may be wearing a device that monitors heart rate, and determines the sender's mood from the heart rate. For example, the device may conclude that the sender is agitated or excited when an elevated heart rate is detected. The device may send the indication of the sender's mood to the sender's computer for use with the sender's avatar.

The instant messaging system makes a determination as to whether an out-of-band communications indicator has been detected (step 2220). When an out-of-band communications indicator is detected, the instant messaging system determines whether the wallpaper must be modified, customized, or animated to reflect the detected out-of-band communications indicator (step 2230); meanwhile or otherwise, the instant messaging system continues to monitor for out-of-band communications indicators (step 2210). To determine whether action is required, the instant messaging system may use a data table, list or file that includes out-of-band communications indicators and an associated action to be taken for each out-of-band communications indicator. Action may not be required for each out-of-band communications indicator detected. For example, action may only be required for some out-of-band communications indicators when an indicator has changed from a previous indicator setting. By way of example, the instant messaging system may periodically monitor the clock application to determine whether the setting associated with the sender is daytime or nighttime. Once the instant messaging system has taken action based on detecting an out-of-band communications indicator having a nighttime setting, the instant messaging system need not take action based on the detection of a subsequent nighttime setting indicator. The instant messaging system only takes action based on the nighttime setting after receiving an intervening out-of-band communications indicator for a daytime setting.

When action is required (step 2240), the instant messaging system causes the wallpaper to be animated in response to the out-of-band communications indicator (step 2250). In one example, when an out-of-band communications indicator shows that the sender is sending instant messages at night, the appearance of the wallpaper is dimmed to convey darkness or night. Similarly, when an out-of-band communications indicator later shows that the sender is sending instant messages during the day, the appearance of the wallpaper is brightened to, or maintained as, daylight. In another example, when the indicator shows that the sender is sending instant messages during a snowstorm, the wallpaper may include wallpaper objects that are animated to portray falling snow.

As yet another example, when the out-of-band communications indicator shows that the sender is listening to music, wallpaper objects representing musical notes may be made perceivable and animated to portray dancing musical notes. Additionally, the animation of the musical notes may be changed based on the tempo of music to which the sender is listening.

In still another example of an out-of-band communications indicator, the mood of the sender may be so indicated. In such a case, the appearance of the wallpaper may be changed to reflect the indicated mood. For example, when the sender is sad, the wallpaper may be modified to reflect the sad state of the sender, such as by dimming the wallpaper. The user may manually specify the out-of-band communications indicator (which in this example is a mood indicator). For example, a user may select one of multiple emoticons that are presented, where each emoticon graphically represents an emotion, mood or feeling. A user also may select one of multiple checkboxes that are presented, where each checkbox represents an emotion, mood or feeling. A user may enter, type or key on a keyboard or another type of data entry device a mood indicator, such as "I'm sad" or "happy". An out-of-band communications indicator or a mood indicator may be determined based on sources other than manual user input. In one example, a mood may be determined based on evaluating user behavior. Examples of user behavior include the duration of a communications session (e.g., duration of the user's online presence) and intensity or amount of activity during a communications session. Another example of user behavior is the activity performed during a communications session, such as the type of music that a user is playing. A mood of "tired" may be determined based on a user being signed-on and working online for a long period of time, such as 12 or more hours, or a user selecting a genre of music that connotes a mood, such as playing "Blues" melodies rather than more upbeat jazz tunes.

In some implementations, a user mood, such as being flirtatious, may be communicated to a subset of identities with whom the user communicates. For example, the user's mood may be communicated only to identities who are included in one or more categories of identities in the user's buddy list. The user's mood may be communicated to identities who are included in the category of Buddies 182 or Family 186 but not to identities who are included in the category of Co-Workers 184, all of FIG. 1. In some implementations, different moods of a user may be communicated to identities based on the category with which an identity is associated. For example, an energetic mood may be communicated to identities who are co-workers, while a flirtatious mood is communicated to identities who are associated with a buddy category.

After the wallpaper has been modified to reflect the out-of-band indicator (step 2250), the updated wallpaper, or an indication that the wallpaper has been updated, is communicated to the recipient (step 2260). Generally, the updated wallpaper, or indication that the wallpaper has been changed, is provided in association with the next instant message sent by the sender; however, this is not necessarily so in every implementation. In some implementations, a change in the wallpaper may be communicated to the recipient independently of the sending of a communication. Thus, the recipient is made able to perceive the updated wallpaper, where the changed wallpaper provides an out-of-band communication to the recipient.

Figure 23:
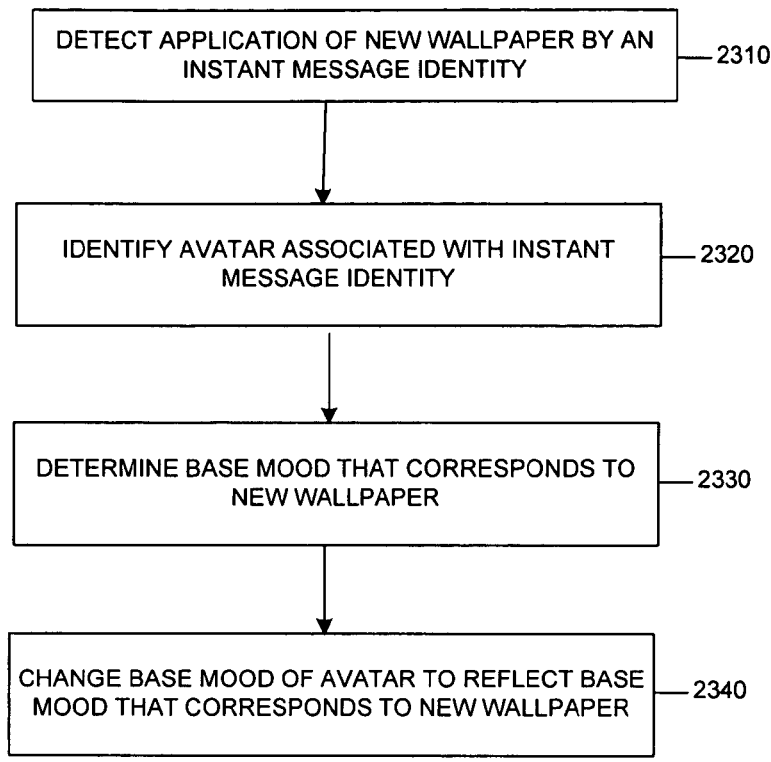
FIG. 23 is a flow chart of a process for changing animations for an avatar in response to selection of a new wallpaper by an instant messaging sender.

FIG. 23 depicts a process 2300 for changing animations for an avatar in response to selection of a new wallpaper by an instant messaging sender. The process 2300 is performed by a processor executing an instant messaging communications program. The process 2300 begins when the processor detects application of new wallpaper by an instant message identity (step 2310). In one example, in response to the selection of a new wallpaper by an instant message sender, the processor may detect the application of a new wallpaper. The processor identifies an avatar that is associated with the instant message identity (step 2320).

The processor then determines a base mood that corresponds to the new wallpaper (step 2330). This may be accomplished, for example, by accessing a table, list or other type of data store that associates a wallpaper and a base mood. A base mood may correspond to the appearance of the avatar and/or animations for representing particular behaviors that convey a particular mood (e.g., flirty, playful, happy, or sad) that are presented for an avatar.

In some implementations, a criterion or criteria other than selection of a new wallpaper may be used to detect and then inspire a change in an avatar and/or a change in wallpaper. For example, the base mood of an avatar may be altered, for example, in response to text triggers or out-of-band conditions.

The processor then changes the base mood of the avatar to the identified base mood that corresponds to the new wallpaper (step 2340) and the process 2400 ends. To change the base mood, a change or changes in the behavior and/or appearance of the avatar are made to reflect the base mood that corresponds to the wallpaper. The changes in the appearance and/or behavior are characterizations of the changed base mood. For example, a different animation may be played in response to a trigger than the animation that was played in response to the trigger when the avatar portrayed a different mood. Also, some animations may be available only when an avatar is portraying a particular mood.

Figure 24:
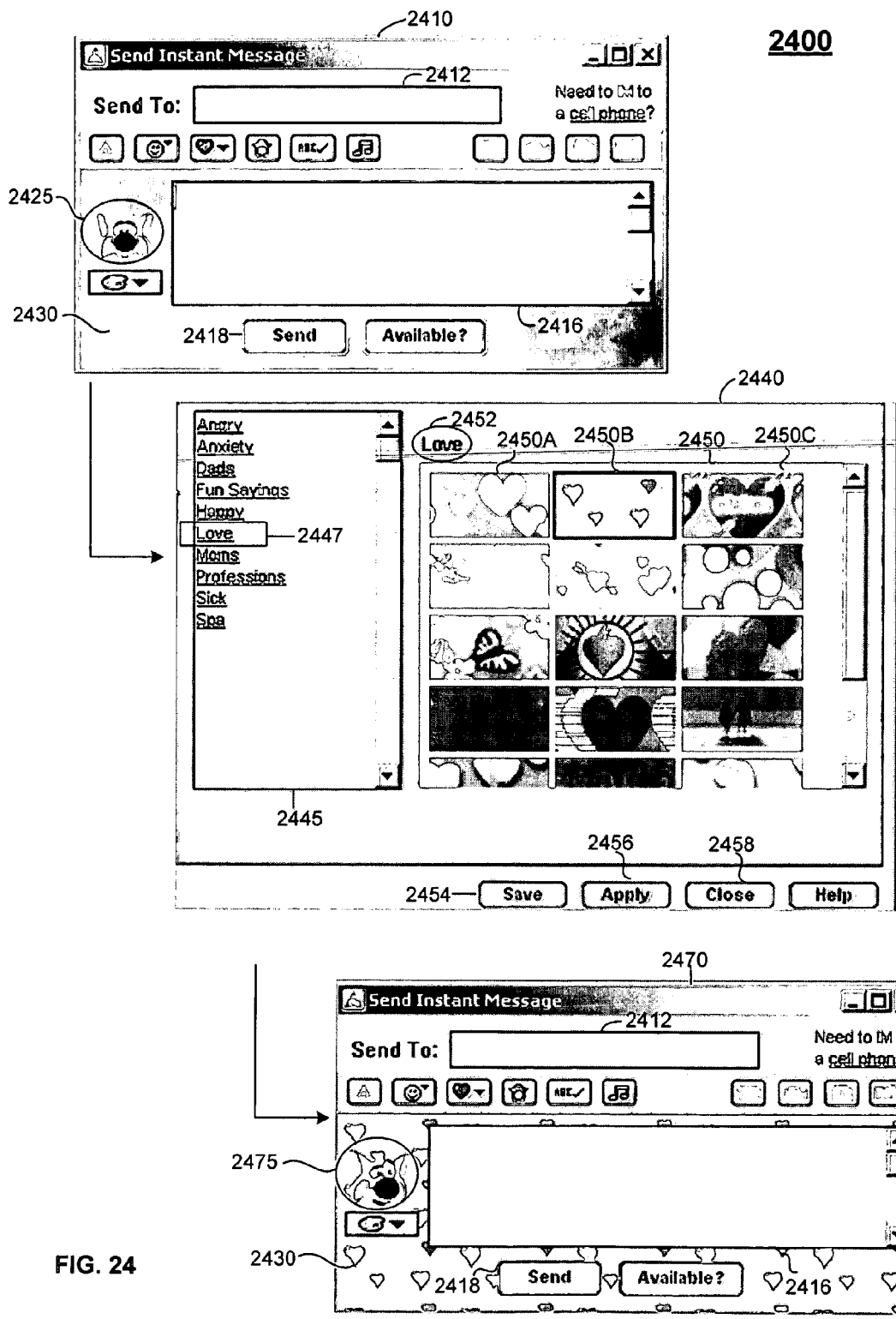
FIG. 24 is a diagram of a user interface for an instant messaging service capable enabling a user to project an avatar for self-expression where the base mood projected by the avatar is changed in response selection of wallpaper by an instant messaging sender.

FIG. 24 shows a series 2400 of user interfaces 2410, 2440 and 2470 for an instant messaging service where the base mood projected by an avatar is changed in response selection of a new wallpaper by an instant messaging identity.

The series 2400 includes an exemplary interface 2410 for sending instant messages, that may be an implementation of interface 1910 of FIG. 19, for sending messages to an instant message recipient. The interface 2410 includes a recipient indicator 2412 to indicate a screen name of a recipient of instant messages sent with the interface 2410. The interface 2410 includes a message compose text box 2416 that enables text to be entered for a message and sent by activating a send button 2418. The interface 2410 includes a sender avatar 2425 chosen by the instant message sender and displayed over, or in place of, wallpaper applied to the window portion 2430. The interface shows the sender avatar having an expression that reflects a base mood corresponding to and defining/dictating the wallpaper applied to the window portion 2430.

The interface 2440 enables the instant message identity to select a new wallpaper to be displayed in an instant message sender interface used by the instant message identity. The interface 2440 includes a wallpaper category list 2445 that identifies multiple categories by which wallpapers are grouped. The interface 2440 also includes a wallpaper selection window 2450 that displays a subset of available wallpapers that correspond to a category selected in the wallpaper category list 2445. In the example of the interface 2440, a category 2447 is selected from the wallpaper category list 2445. The wallpaper selection window 2450 includes a title 2452 that identifies the category 2447 selected from the wallpaper category list 2445 and the wallpapers from which the instant message identity may select. Examples of the wallpapers include wallpapers 2450A-2450C. The wallpaper selection window 2440 indicates that the wallpaper 2450B is selected, as shown by a solid, dark box around the outside of the wallpaper 2450B.

The interface 2440 also includes a save control 2454 that is operable to associate the wallpaper selected in the wallpaper selection window 2450 (i.e., wallpaper 2450B) with the instant message identity and remove the interface 2440 from display. The interface 2440 also includes an apply control 2456 that is operable to associate the wallpaper selected in the wallpaper selection window 2450 (i.e., wallpaper 2450B) with the instant message identity (and, in contrast to the save control 2454, not remove the interface 2440 from display). The interface 2440 also includes a close control 2458 that an instant message identity may activate to end the wallpaper selection process and remove the interface 2440 from display.

In response to the instant message identity's selection of the wallpaper 2450B, the instant message sender interface 2470 is displayed with the selected wallpaper displayed on the window portion 2430 and the avatar 2475 having a base mood that corresponds to the selected wallpaper displayed in the interface 2470 on the window portion 2430. The avatar 2475 in the interface 2470 has the same general form as the avatar 2425 in the interface 2410—that is, in both cases, the avatar is a fox. However, the base mood of the avatar 2475 in interface 2470 is different than the base mood of the avatar 2425 of interface 2410. As shown by the raised eyebrows and different profile of the avatar 2475, the base mood of the avatar 2475 is more flirty and playful than the base mood of the avatar 2475. The base mood of the avatar 2475 is made in response to the selection of the hearts wallpaper 2450C associated with the "love" category 2447, as depicted in interface 2440.

Thus, the series 2400 illustrates that the base mood of the fox avatar is changed in response to the selection of a wallpaper.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America Online Instant Messenger), AOL (America Online) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and online applications. For example, the techniques and concepts may be applied to an animated avatar that acts as an information assistant to convey news, weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

For example, although the examples above are given in an instant message context, other communications systems with similar attributes may be used. For example, multiple personalities may be used in a chat room or in e-mail communications. Also, the user interface may be a viewable interface, an audible interface, a tactile interface, or a combination of these.

Generally, for convenience, the techniques and concepts have been described using the terms "user" and "identity." The term "user" has generally been applied to describe a person who is manipulating a computer device or communication device operating a client application of an instant messaging service, whereas the term "identity" has generally been applied to describe a person who is accessible through the instant message service (e.g., is a user of the instant messaging service though the person need not necessarily be signed-on to the instant message service). Both of the terms "user" and "identity" refer to a natural person who is able to access and use the instant messaging service.

In addition, the access control techniques and concepts have been described with respect to avatars capable of being animated and describing wallpaper as a visually perceivable background for an avatar. Animations of avatars, objects associated with an avatar, and wallpaper may be, or may include, playing sounds. The animation techniques and concepts may be applicable to communications that need not necessarily include an avatar capable of being animated. For example, the animation techniques may be applied to wallpaper accompanying an instant message that includes a buddy icon (e.g., a two-dimensional, non-animated icon) or to wallpaper accompanying an instant message that does not include an avatar or buddy icon. Moreover, animating wallpaper to communicate out-of-band information in a communication setting may be particularly useful in enabling a first user to communicate context information to a second user to which the context information does not apply, or to which the context information is unavailable. For example, a first instant messaging user in San Diego may communicate the weather in San Diego (e.g., through animation of wallpaper that accompanies the instant message to show sunshine) to a second instant messaging user in Chicago with whom the first instant messaging user is communicating.

Implementations of the techniques discussed above may include a method or process, a system or apparatus, computer software on a computer-accessible medium, and a computer program product capable of generating a graphical user interface for presentation on a display device. Other implementations are within the scope of the following claims.

What is claimed is:

1. A computer-implemented method for modifying an avatar associated with an identity of a user of a communications application, the method comprising:
   monitoring, by at least one processor, at least one additional application executing on a computing device associated with the user, the at least one additional application being distinct from the communications application;
   inferring, based on the monitored at least one additional application, a mood of the user of the communications application; and
   modifying the avatar based on the inferred mood of the user of the communications application.

2. The method of claim 1, further comprising presenting the modified avatar to another user of the communications application with whom the user is communicating.

3. The method of claim 1, wherein inferring the mood of the user includes determining behavior of the user from the monitored application.

4. The method of claim 3, wherein determining the behavior of the user includes determining at least one of a duration of online presence of the user, an intensity of online activity of the user, or a type of online activity of the user from the monitored application.

5. The method of claim 1, wherein modifying the avatar comprises changing an appearance of the avatar in response to the inferred mood.

6. The method of claim 1, wherein modifying the avatar comprises playing an animation of the avatar in response to the inferred mood such that the played animation is different from an animation played for the avatar when unmodified.

7. The method of claim 1, wherein modifying the avatar comprises modifying a text trigger used to animate the avatar in response to the inferred mood such that the text trigger is different from a text trigger used to animate the avatar when unmodified, the text trigger including a character string in a message sent using the communication application.

8. The method of claim 1, wherein modifying the avatar comprises modifying a wallpaper that defines a visually perceivable background for the avatar.

9. The method of claim 8, wherein modifying the wallpaper comprises animating one or more wallpaper objects of the wallpaper.

10. A system comprising:
  at least one processor;
  a memory storing instructions that, when executed by the at least one processor, cause the at least one processor to perform a method modifying an avatar associated with an identity of a user of a communications application, the method comprising:
    monitoring at least one additional application executing on a computing device associated with the user, the at least one additional application being distinct from the communications application;
    inferring, based on the monitored at least one additional application, a mood of the user of the communications application; and
    modifying the avatar based on the inferred mood of the user of the communications application.

11. The system of claim 10, the method further comprising presenting the modified avatar to another user of the communications application with whom the user is communicating.

12. The system of claim 10, wherein inferring the mood of the user includes determining behavior of the user from the monitored application.

13. The system of claim 10, wherein determining the behavior of the user includes determining at least one of a duration of online presence of the user, an intensity of online activity of the user, or a type of online activity of the user from the monitored application.

14. The system of claim 10, wherein modifying the avatar comprises changing an appearance of the avatar in response to the inferred mood.

15. The system of claim 10, wherein modifying the avatar comprises playing an animation of the avatar in response to the inferred mood such that the played animation is different from an animation played for the avatar when unmodified.

16. The system of claim 10, wherein modifying the avatar comprises modifying a text trigger used to animate the avatar in response to the inferred mood such that the text trigger is different from a text trigger used to animate the avatar when unmodified, the text trigger including a character string in a message sent using the communication application.

17. The system of claim 10, wherein modifying the avatar comprises modifying a wallpaper that defines a visually perceivable background for the avatar.

18. The system of claim 17, wherein modifying the wallpaper comprises animating one or more wallpaper objects of the wallpaper.

* * * * *